United States Patent
Morrison et al.

(10) Patent No.: US 11,594,948 B2
(45) Date of Patent: Feb. 28, 2023

(54) REDUCED POWER CONSUMPTION FOR LLC RESONANT CONVERTER UNDER LIGHT LOAD

(71) Applicant: EXCELSYS TECHNOLOGIES LTD, Cork (IE)

(72) Inventors: Richard Morrison, Cork (IE); Andrejs Gasilovs, Midleton (IE); Phelim Seamus Bradley, Carrigaline (IE)

(73) Assignee: Excelsys Tecnologies Ltd., Cork (IE)

( * ) Notice: Subject to any disclaimer, the term of this patent is extended or adjusted under 35 U.S.C. 154(b) by 132 days.

(21) Appl. No.: 17/171,527

(22) Filed: Feb. 9, 2021

(65) Prior Publication Data

US 2022/0255442 A1 Aug. 11, 2022

(51) Int. Cl.
| | | |
|---|---|---|
| H02M 3/335 | (2006.01) | |
| H02M 1/00 | (2006.01) | |
| H02M 3/00 | (2006.01) | |
| H02M 7/48 | (2007.01) | |

(52) U.S. Cl.
CPC .......... *H02M 1/0032* (2021.05); *H02M 3/01* (2021.05); *H02M 3/33569* (2013.01); *H02M 3/33571* (2021.05); *H02M 3/33573* (2021.05); *H02M 7/4815* (2021.05)

(58) Field of Classification Search
CPC ......... H02M 3/33569; H02M 3/33561; H02M 1/0032; H02M 1/008; H02M 7/4815; H02M 3/01
See application file for complete search history.

(56) References Cited

U.S. PATENT DOCUMENTS

| | | |
|---|---|---|
| 6,317,347 B1 | 11/2001 | Weng |
| 9,257,913 B1 | 2/2016 | McDonald |
| 10,693,379 B2 | 6/2020 | Moon et al. |
| 10,840,816 B2 | 11/2020 | Sakurai |
| 2006/0285370 A1 | 12/2006 | Lee et al. |
| 2013/0033903 A1* | 2/2013 | Teggatz ............... H02M 1/42 363/16 |

(Continued)

FOREIGN PATENT DOCUMENTS

| | | |
|---|---|---|
| DE | 202016102125 U1 | 5/2016 |
| JP | 2020089079 A | 6/2020 |

OTHER PUBLICATIONS

International Search Report and Written Opinion for PCT Application No. PCT/EP2022/052646, filed Feb. 3, 2022; dated May 12, 2022; 15 pages.

(Continued)

*Primary Examiner* — Alex Torres-Rivera

(57) ABSTRACT

This disclosure provides a resonant LLC power converter unit to provide a plurality of power outputs. The power converter unit includes multiple transformers arranged such that at least one primary winding of each transformer is connected in parallel and configured to provide a power output to a secondary that powers one of the plurality of outputs. One of these transformers, or a parallel choke across an output bus, can be used to provide lower power to the output bus during a standby state (i.e., during a light- or no-load condition). The power converter unit includes a first switching section for providing a first power input during normal operation and a second switching section for providing a second power input during no- or light-load conditions.

18 Claims, 31 Drawing Sheets

(56) References Cited

U.S. PATENT DOCUMENTS

| | | | |
|---|---|---|---|
| 2013/0127248 A1* | 5/2013 | Lai | H02J 9/005 307/31 |
| 2013/0293014 A1 | 11/2013 | Hart et al. | |
| 2015/0138856 A1* | 5/2015 | Huynh | H02M 1/4225 363/84 |
| 2017/0170733 A1* | 6/2017 | Ferencz | H02J 9/061 |
| 2019/0229636 A1* | 7/2019 | Xu | H02M 1/32 |
| 2021/0210008 A1* | 7/2021 | Cai | H02M 3/285 |

OTHER PUBLICATIONS

Choi, Hangseok, "Design Considerations For An LLC Resonant Converter", "Fairchild Power Seminar 2007", 2007, pp. A-1-A-9.
Pierson, Rick, "How To Exceed 98% Efficiency in a Compact 48 V To 6 V, 900 W LLC Resonant Converter Using EGAN FETS", Mar. 12, 2019, p. 16, Publisher: Retrieved from https://epc-co.com/epc/GaNTalk/Post/15230/How-to-Exceed-98-Efficiency-in-a-Compact-48-V-to-6-V-900-W-LLC-Resonant-Converter-Using-sGaN-FETs.
Walding, Carl, "LLC Resonant Topology Lowers Switching Losses, Boosts Efficiency", Aug. 28, 2008, pp. 10, Publisher: Retrieved from https://www.eetimes.com/llc-resonant-topology-lowers-switching-losses-boosts-efficiency/.

* cited by examiner

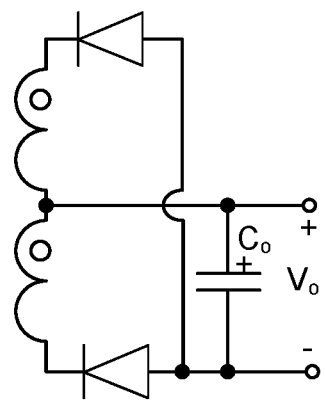
FIG. 14A
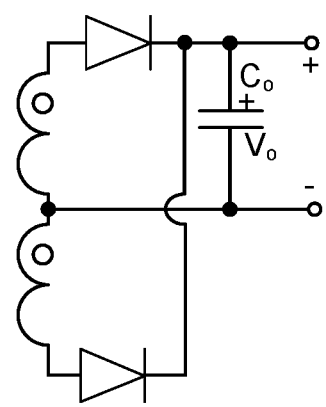
FIG. 14B
FIG. 14

1500

REDUCED POWER CONSUMPTION FOR LLC RESONANT CONVERTER UNDER LIGHT LOAD

FIELD OF THE DISCLOSURE

The disclosure relates to LLC resonant converters. In particular, the disclosure relates to an LLC resonant converter for improving a no-load state operation.

DESCRIPTION OF RELATED ART

LLC resonant converters are power supply devices that convert a DC input into an AC output. Such converters include switches coupled between a DC voltage input and an LC section that generally includes one or more inductors (L) and capacitors (C). The switches, which may be implemented using MOSFET transistors, are switched on and off at a particular switching frequency to generate a square wave that is provided as an input to the LC section (which may be referred to as an "LLC tank"). The LLC tank filters the input square wave and generates a sinusoidal output current, which is in turn provided to the primary windings of one or more transformers.

The transformers may be used for voltage scaling and signal isolation, and may produce an output signal that is provided as a power supply to a load (e.g., a circuit or device). The output power of the LLC resonant converter depends on the switching frequency of the input square wave relative to the resonant frequency of the LLC tank. The circuitry is most efficient when the switching frequency is at or near the resonant frequency. When the switching frequency is higher than the resonant frequency, the output power begins to drop. However, it may not be possible to completely turn off the LLC resonant converter by increasing the switching frequency because as the switching frequency gets significantly higher than the resonant frequency, parasitic effects become important. Such parasitic effects may become particularly significant when there is no load on the converter. That is, even when the load on the converter has been removed and it would be desirable to turn the converter off, the converter may continue to produce high output voltages and/or high input power due to high-frequency parasitic effects, causing correspondingly undesirably high power consumption under these conditions.

Some LLC resonant converters are configured to address this problem by operating in a "burst mode" under no- or light-load conditions. In burst mode, both switches may be turned off for a short period of time. Such an approach may have several disadvantages, however. For example, the use of burst mode may introduce noise into the voltage signal and may require accurate sensing of the output. Such sensing is sometimes achieved using opto-couplers (e.g., opto-isolators). If an LLC resonant converter includes post-regulation of the output, the converter may not include an opto-coupler at the output of the switches and thus the converter may not have access to accurate feedback information. In this case, implementation of burst mode may be difficult or impossible. Thus, other techniques for reducing power consumption of an LLC resonant converter under no- or light-load conditions may be desirable.

SUMMARY OF THE DISCLOSURE

It is therefore an object to provide an improved LLC resonant converter having low output under no- or light-load conditions.

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

One aspect of the disclosure describes a method of operating a series resonant LLC converter coupled via one or more transformers on an AC output bus to one or more output modules whose outputs are coupled to a load. The method can include delivering power to the AC output bus via a first switching section converting power from a high voltage input, the AC output bus configured to inductively deliver power to the one or more output modules. The method can also include monitoring current in an LLC resonant tank coupled to the AC output bus, and when the current drops below a light- or no-load threshold, then switching the first switching section off, and delivering power to the AC output bus via a second switching section receiving power at a lower voltage than the high voltage input, and delivering power via inductive coupling with the AC output bus.

Another aspect of the disclosure describes a series resonant LLC converter configured to operate in a load state and a standby state, where the standby state provides lower power to an AC output bus than the load state is capable of. The series resonant LLC converter can include a voltage input, an LC section, an AC output bus, a primary winding, a first switching section, a second voltage input, a second switching section, and a controller. The LC section can include a first capacitor and an inductor in series, and optionally a second capacitor can be arranged in series with the first capacitor with the inductor coupled to a node between the first and second capacitor. The AC output bus can be coupled to the LC section and to one or more output modules. The primary winding can be coupled across the AC output bus in parallel to primary windings of the one or more output modules. The first switching section can be coupled between the voltage input and the LC section. The second switching section can be inductively coupled to the primary winding and receiving power from the second voltage input, the second voltage input configured to deliver less power than the first voltage input. The controller can be configured to monitor current in the LC section or voltage in one of the output modules, and when the current in the LC section falls below a light- or no-load threshold or the voltage in one of the output modules rises above a light- or no-load threshold, turn the first switching section off and turn the second switching section on

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

The invention will be more clearly understood from the following description of an embodiment thereof, given by way of example only, with reference to the accompanying drawings, in which:

FIG. 14A illustrates an embodiment of an output module;

FIG. 14B illustrates an embodiment of an output module;

DETAILED DESCRIPTION

Figure 1A:
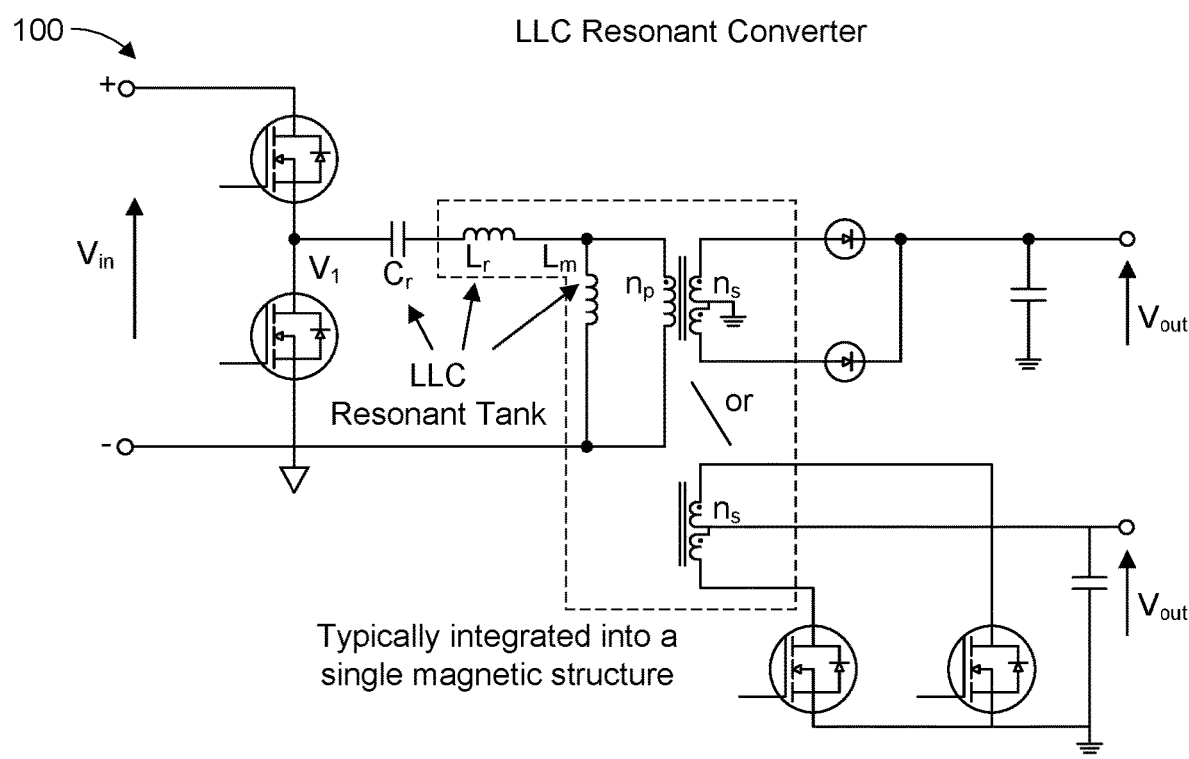
FIG. 1A illustrates a first embodiment of a known LLC resonant converter topology using half-bridge switching.

The present disclosure relates generally to LLC resonant converters used for supplying power to a load. More specifically, but without limitation, the present disclosure relates to an LLC resonant converter that includes multiple output modules coupled to an output bus via respective transformers, and uses a standby drive section to provide power to the primaries and thereby reduce the power consumption of the converter when it is under light- or no-load conditions.

The word "exemplary" is used herein to mean "serving as an example, instance, or illustration." Any embodiment described herein as "exemplary" is not necessarily to be construed as preferred or advantageous over other embodiments.

Preliminary note: the flowcharts and block diagrams in the following Figures illustrate the architecture, functionality, and operation of possible implementations of systems, methods and computer program products according to various embodiments of the present disclosure. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Intro to LLC Converters

As discussed earlier in the disclosure, a series LLC resonant converter may be used to supply power to one or more loads. In this type of converter, reactive elements (capacitors and inductors) are added around the switch to generate the sinusoidal voltage or current. The three main classes of resonant converters are series resonant converter (SRC), parallel resonant converter (PRC) and a combination of the two, the series-parallel resonant converter (SPRC).

As its name implies, in the series resonant converter (SRC), the load is connected in series with the resonant tank's inductor and capacitor. The gain from the resonant tank is <1. While the SRC can operate at no load, its output voltage cannot be regulated. For zero-voltage switching, the circuit operates above resonance in the inductive region. At low line voltage, the SRC operates closer to resonant frequency.

In the parallel resonant converter (PRC), the load is connected in parallel with the resonant capacitor. The PRC can operate at no load output and, unlike the SRC, its output voltage can be regulated at no load. For zero-voltage switching, the PRC also operates above resonance in the inductive region. Similar to the SRC, at low input voltage, the PRC operates closer to resonant frequency, however, the PRC differs by having high circulating currents. The series inductor and parallel capacitor provide inherent short-circuit protection.

In a series-parallel resonant converter (SPRC), the tank circuit is a combination of the series and parallel converters and can be either a LCC or LLC configuration (the LLC being the configuration discussed later in this disclosure). Similar to the SRC and PRC, a LCC design is difficult to optimize at high input voltage. As a result, the preferred alternative for many applications is an LLC.

The LLC converter can operate at resonance, at nominal input voltage, and is able to operate at no load. In addition, it can be designed to operate over a wide input voltage range. Both zero-voltage and zero-current switching are achievable over the entire operating range.

FIG. 1A depicts illustrates a first embodiment of an LLC resonant converter topology that uses half-bridge switching. LLC resonant converter unit 100 includes a switching section with two switches (e.g., forming a half bridge) and an LLC tank that includes a capacitor, $C_r$, and two inductors, $L_r$ and $L_m$, arranged as shown. The LLC tank may be associated with a resonant frequency that is a function of its impedance value. Accordingly, the LLC tank may also be referred to as a resonant tank. The switches may be implemented using transistors, such as FET transistors, and may be used to convert input voltage $V_{in}$ to $V_1$ by turning the transistors on or off (e.g., by applying appropriate voltages to the gates of the transistors). The input voltage, $V_{in}$, may be a DC voltage and the voltage signal, $V_1$, may be a square wave, for example. The voltage signal, $V_1$, generated by the switches may be provided to the LLC tank.

LLC resonant converter unit 100 includes two output modules each driven by a single primary side winding $n_p$, and each having a distinct secondary pair of windings $n_s$, where a magnetic core is common to both of these transformers (i.e., the output modules have a common transformer core). The secondary windings, $n_s$, may generate an output current in response to an input current flowing through the primary winding, $n_p$. The secondary windings, $n_s$, may be coupled with corresponding output nodes via diodes to provide output voltages $V_{out}$ to a load (not shown). The diodes may include Schottky diodes or rectifier diodes, for example. These outputs may be regulated (not shown) before power reaches a load. For example, see embodiments of post-regulation on an LLC resonant converter in U.S. Patent Publication No. 2020/0220469, assigned to ADVANCED ENERGY INDUSTRIES, INC. and incorporated herein by reference in its entirety.

In operation, an input voltage $V_{in}$ may be provided to the LLC resonant converter and the switches may be alternately activated and deactivated (e.g., one switch is activated while the other is deactivated) at a particular switching frequency to generate a square wave signal that alternates between $V_{in}$ and ground. The square wave signal may be provided to the LLC tank, which filters the signal as a function of the switching frequency (e.g., the frequency of the square wave) relative to the resonant frequency of the LLC tank. The filtered current may be a sinusoidal signal having the same frequency as the square wave signal, for example. The filtered current is provided to the primary winding, $n_p$, of the first transformer, inducing an output current in the secondary windings, $n_s$. The output current, in turn, generates an output voltage $V_{out}$. in both of the output modules that may be provided to one or more loads. In some embodiments, the outputs can be combined and the combined power provided to a single load. These outputs can be combined in series or in parallel depending on the application.

Figure 1B:
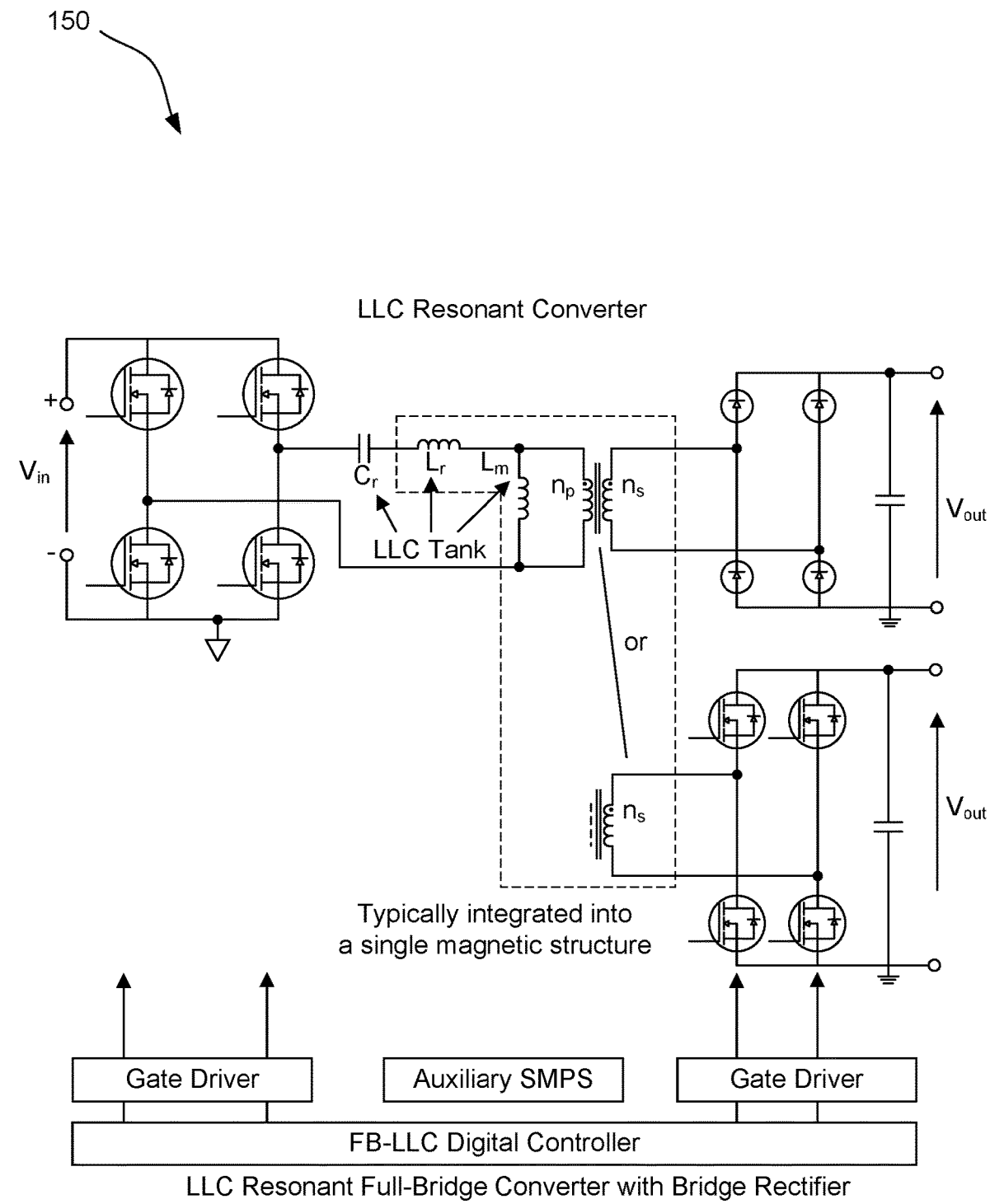
FIG. 1B illustrates a second embodiment of a known LLC resonant converter topology using full-bridge switching.

FIG. 1B depicts a second embodiment of an LLC resonant converter topology that uses full-bridge switching. LLC resonant converter unit 150 includes a switching section with four switches (e.g., forming a full bridge) and an LLC resonant tank that includes a capacitor, $C_r$, and two inductors, $L_r$, $L_m$ arranged as shown. Full-bridge switching may provide similar functionality as half-bridge switching, at a cost of additional switches and more winding coils. Full-bridge switching may use half of the current used by a half-bridge topology, however, and may therefore be preferable when conduction losses are likely to be significant.

The embodiments disclosed herein are often shown in half-bridge configurations, but those of skill in the art can apply either the half-bridge or full-bridge topologies in FIGS. 1A and 1B to the embodiments disclosed herein.

Figure 2:
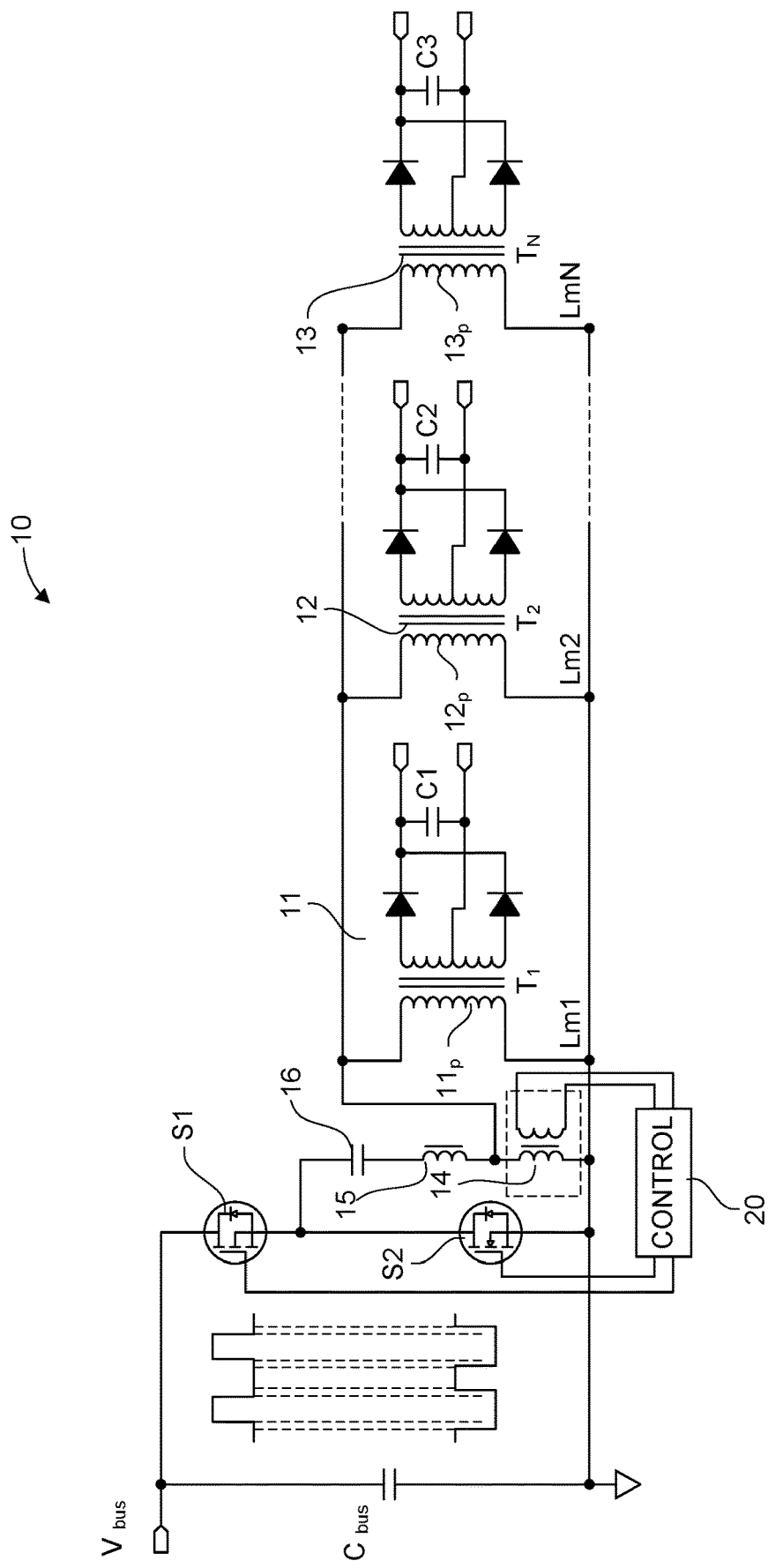
FIG. 2 illustrates a known LLC resonant converter topology where a parallel inductor of the LLC tank is used to provide feedback to switches of a switched converter.

FIG. 2 illustrates a schematic of one embodiment of a known LLC resonant converter 10 with a parallel inductive element. LLC resonant converter 10 includes a plurality of transformers 11, 12 and 13 each having a primary winding 11 $p$, 12 $p$, 13 $p$ arranged in parallel. A second inductor 14 of the LLC resonant tank can also be arranged in parallel with the primary windings 11 $p$, 12 $p$, 13 $p$, and can be part of a transformer, where the secondary of this transformer provides feedback to a control 20. The inductive element 14 can be construed to mean any element in which voltage and current are not in phase with each other.

LLC resonant converter 10 permits voltage regulation of rectified outputs from multiple transformers 11, 12, 13 during brief interruptions to the input supply, $V_{bus}$. The regulation performance of the converter 10 is aided by the addition of the parallel inductive element, 14, (i.e., the second inductor in the LLC tank) which limits variation of transformer magnetizing inductance loading the LLC tank, which increases the gain obtainable for hold-up requirements.

The second inductor 14 in the LLC tank can be arranged in parallel with primary windings 11 $p$, 12 $p$, 13 $p$ of the transformers 11, 12, 13. The inductor 14 can also serve to increase the gain which can be obtained when the control circuit 20 acts to decrease the switching frequency of S1 and S2 during hold-up.

Incorporating the parallel inductor 14 enables the design of an ac/dc converter which utilizes a single half bridge switching network, S1 and S2, and primary resonant LLC circuit to drive multiple transformers 11, 12, 13 with the primaries 11 $p$, 12 $p$, 13 $p$ connected in parallel. Each transformer secondary is rectified and filtered separately. As a result, a plurality of isolated outputs can be realized from a single half bridge and resonant circuit. This configuration allows several combinations of outputs to be realized from a single primary stage. The isolated outputs can be connected in series and parallel to achieve different total outputs for the converter 10.

In operation the supply $V_{bus}$ is switched alternately for equal lengths of time by semiconductor switches S1 & S2 with a small amount of 'dead' time between the intervals during which the switches are turned on. In other words, both switches are off for a short period between switching off of a first of the two switches and a turning on of the second of the two switches.

In a normal operating condition, the frequency of switching of S1 & S2 is equal to the series resonant frequency of the LC network made up of first inductor element 15 and capacitor 16. Under this condition the effective voltage gain of the circuit from the switching node of S1, S2 to the parallel combination of transformer primary windings 11 $p$, 12 $p$, 13 $p$ is unity and independent of the number of connected transformers.

Challenges of LLC Converters Under Light- or No-Load Conditions

During interruption or removal of the load, control circuitry 20 is used to increase the operating frequency of S1, S2 to permit a decrease in voltage gain to help reduce the output voltage to the reduced or non-existent load. The control circuit 20 will vary the operating frequency by closed loop control of the voltage appearing on the control winding of the parallel inductor 14 or by changing operating frequency to one of a range of digitally stored values as directed by a computer program.

The addition to the circuit of parallel inductor 14 limits the variation of magnetizing inductance due to number and inductance tolerance of parallel-connected transformers. However, the converter 10 still suffers from difficulty in lowering output voltages sufficiently under no- or light-load conditions since there is a limit to how high the switching frequency of S1, S2 can be set.

Figure 3:
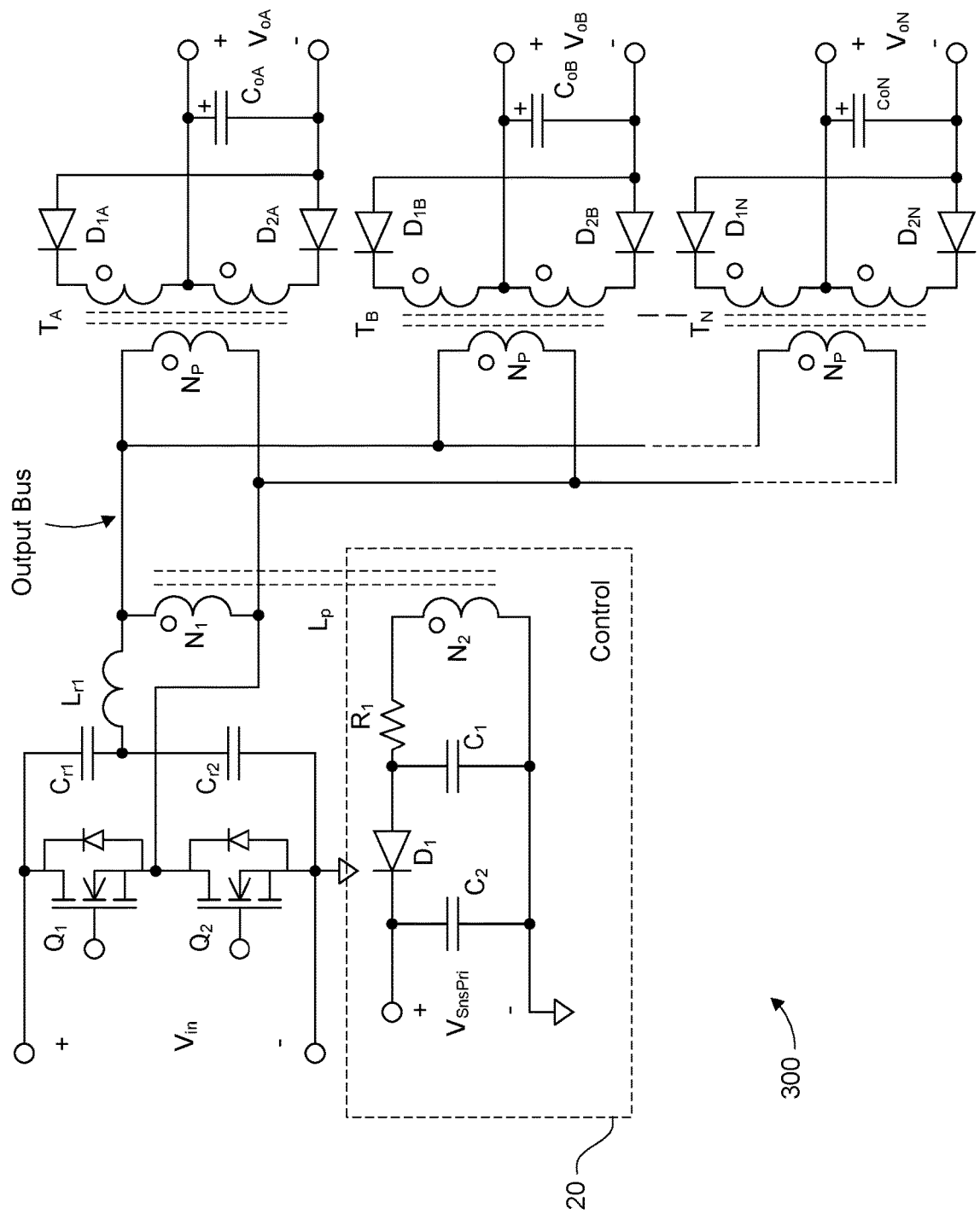
FIG. 3 illustrates a more detailed embodiment of the general LLC resonant converter topology shown in FIG. 2.

FIG. 3 illustrates a more detailed embodiment of the general LLC resonant converter topology shown in FIG. 2. The LLC resonant converter unit depicts a half-bridge topology that includes a switching section, $Q_1$ and $Q_2$, coupled through an LLC tank ($C_{r1}$, $C_{r2}$, $L_{r1}$, and the primaries on the output bus). The corresponding transformer secondaries each provide a voltage output ($V_{oa}$, $V_{ob}$, $V_{oc}$) to a load (not shown). The primary $N_1$ corresponds to the parallel inductor 14 in FIG. 2. This primary $N_1$ is coupled across the output bus and a secondary side $N_2$ of a transformer to provide feedback to a control 20. The transformer secondary $N_2$ is coupled to additional circuitry that may be used to receive a voltage representing a signal sensed through the transformer secondary $N_2$. This sensed signal can be used in a feedback loop to control switching of the switching section, $Q_1$ and $Q_2$ (control of $Q_1$ and $Q_2$ is not shown). And like the embodiment shown in FIG. 2, this converter 300 also suffers from difficulty in lowering output voltages sufficiently under no- or light-load conditions. The primary $N_1$ is an inductive element and can be construed to mean any element in which voltage and current are not in phase with each other, and this description applies to all subsequent figures where a primary $N_1$, 405, or 406 is implemented.

Providing a Standby Drive Section During Light- or No-Load Conditions

To overcome these challenges, a standby drive section on the primary or secondary side of an isolation boundary or similar topology can be used to provide an alternative power source for an output bus that can be driven during a standby state of the system (i.e., whenever a light- or no-load condition is sensed). A light- or no-load condition can be identified by measurement of output power (e.g., via output voltage and/or current on the secondary side). However, the measurement of output power is typically not directly available since the outputs reside on a secondary side of the isolation boundary, and the controller often resides on a primary side. Even when outputs are available for sensing, post regulating may prevent output voltage from following a rise that would indicate a light- or no-load condition. Therefore, it is convenient to use other measurements which are indicative of the output power and these pseudo signals differ depending on the mode (load or no-load) and whether the controller is arranged on the primary or secondary side of the isolation boundary.

Yet, sensing when to enter a standby mode on the primary side can be challenging due to leakage inductance inherent in the transformers used to distribute power from the output bus to the output modules. This leakage inductance is parasitic, and while relatively insignificant at load, during light- or no-load conditions, this leakage disrupts the correlation between output voltages from the output modules and the voltage that can be sensed on a primary side of the isolation boundary, for instance at $V_{SnsPri}$ in FIG. 3. Thus, measurements of voltage through the primary $N_1$ and secondary $N_2$ may not provide insight as to when to enter the standby state.

Resonant tank current provides one reliable means to identify light- or no-load conditions and trigger a move to the standby state (since it is a proxy for output power). This is particularly useful when the controller is on the primary side (common where outputs are modular) and can therefor make measurements of the resonant tank current without traversing the isolation boundary. For instance, a capacitive divider can be used (see FIG. 18) or a transformer (see FIGS. 19-20). Resistive sensing methods (see FIGS. 21-22) could also be used. Where the system is in a 'standby' mode, it may be preferable to identify a time to change back to the 'load' mode by sensing when a regulator reaches its power limit, for instance by monitoring a voltage, $V_{SnsPri}$, falling below a load threshold (see FIGS. 9, 11, and 25).

Where the controller is situated on the secondary side (e.g., see FIGS. 6, 12, 13, 29) and in 'load' mode, resonant tank current is more difficult to monitor, so the controller may look at an operating frequency of the LLC converter. At light- or no-load, this frequency dramatically increases, and this increase can be used as a trigger for the controller to put the system into a standby state (e.g., an operating frequency threshold). The controller being situated on the secondary side is unlikely for modular power supplies but likely for single output power supplies or non-modular multiple output power supplies where the other outputs are very low power and post-regulated.

Alternatively, the controller can monitor output power from the output modules, for instance by taking output current (often sensed using a resistor on the negative output line) when a single output module is used. For multiple output modules, output current for each of the output modules can be summed after scaling by output voltage, $V_{OA}$, $V_{OB}$, $V_{ON}$.

Regardless of the location of the controller, when already in the standby mode, power can be determined from a $V_{SnsPri}$ on the primary side (see FIG. 11) or a $V_{SnsSec}$ on the secondary side (see FIG. 13) since it would be challenging to measure low levels of current, and thus power, at the output modules.

In summary, to determine when to switch between load and standby states, it is preferable to measure $V_{SnsPri}$ or $V_{SnsSec}$ when in the 'standby' state, and to measure resonant tank current (primary side controller) or $V_{OA}$ (secondary side controller) when in the 'load' state.

It is also possible to monitor for state changes based on a single measurement point (e.g., $V_{SnsPri}$ or $V_{SnsSec}$ or resonant tank current). However, this may also lead to instability, so it may be desirable to use one sensing node when in the 'load' state and another sensing node when in the 'standby' state.

Figure 4:
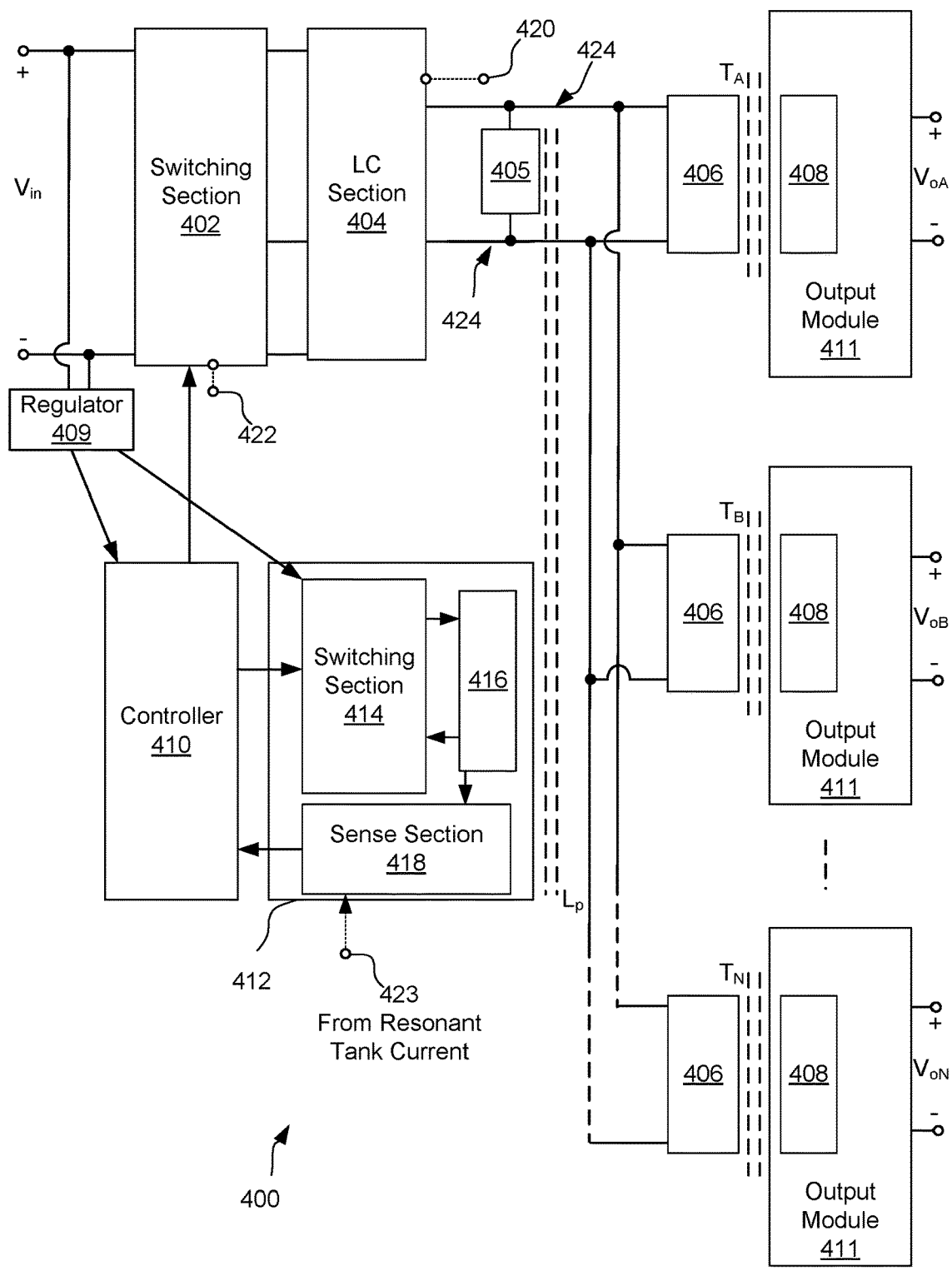
FIG. 4 illustrates an embodiment of a series resonant LLC power converter unit in which a standby driving section and a sensing section are coupled to a primary AC output bus via the same transformer.
Figure 5:
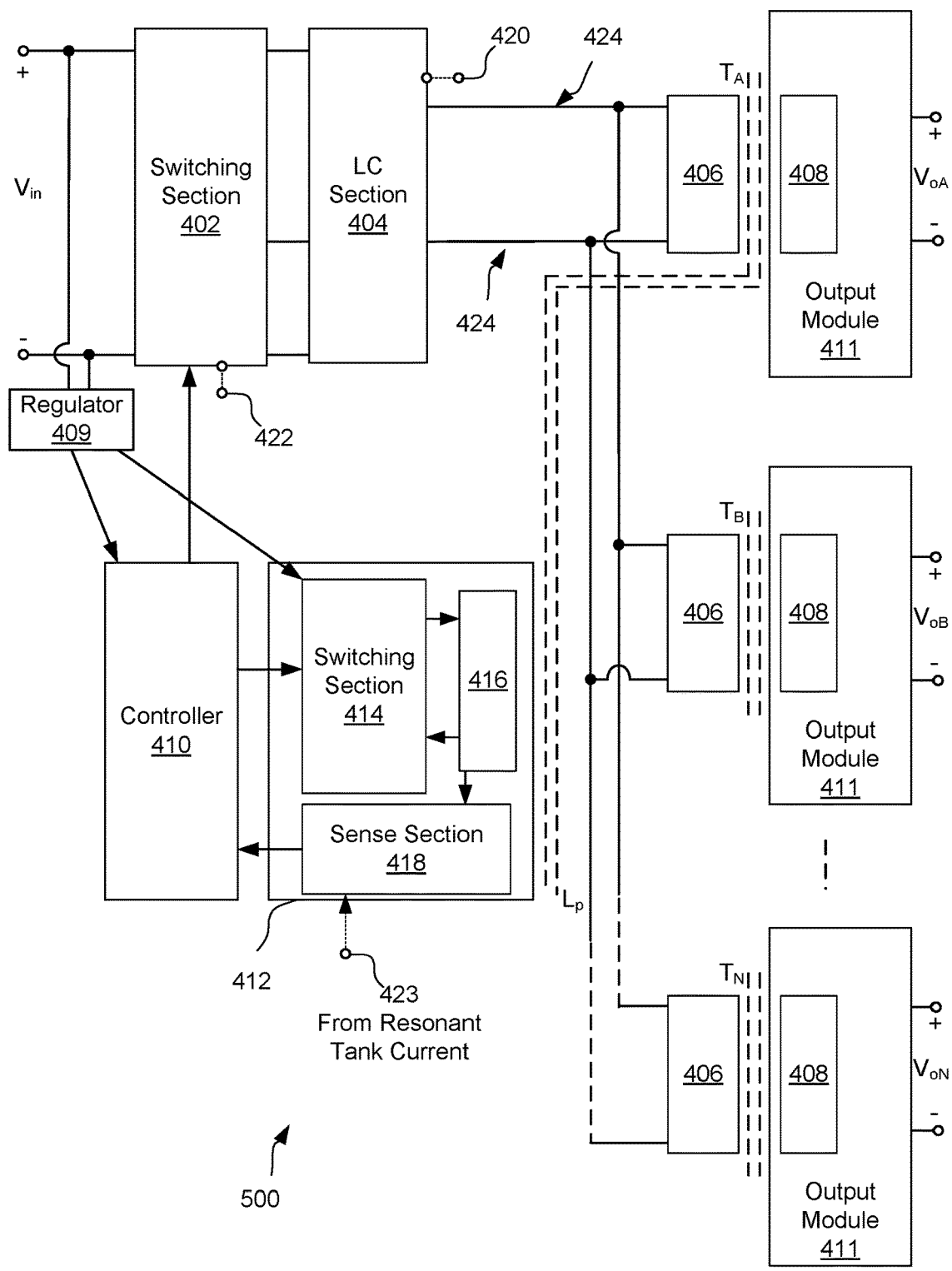
FIG. 5 illustrates an embodiment of a series resonant LLC power converter unit in which a standby driving section and a sensing section are coupled to a primary side of an output module via the same transformer.
Figure 6:
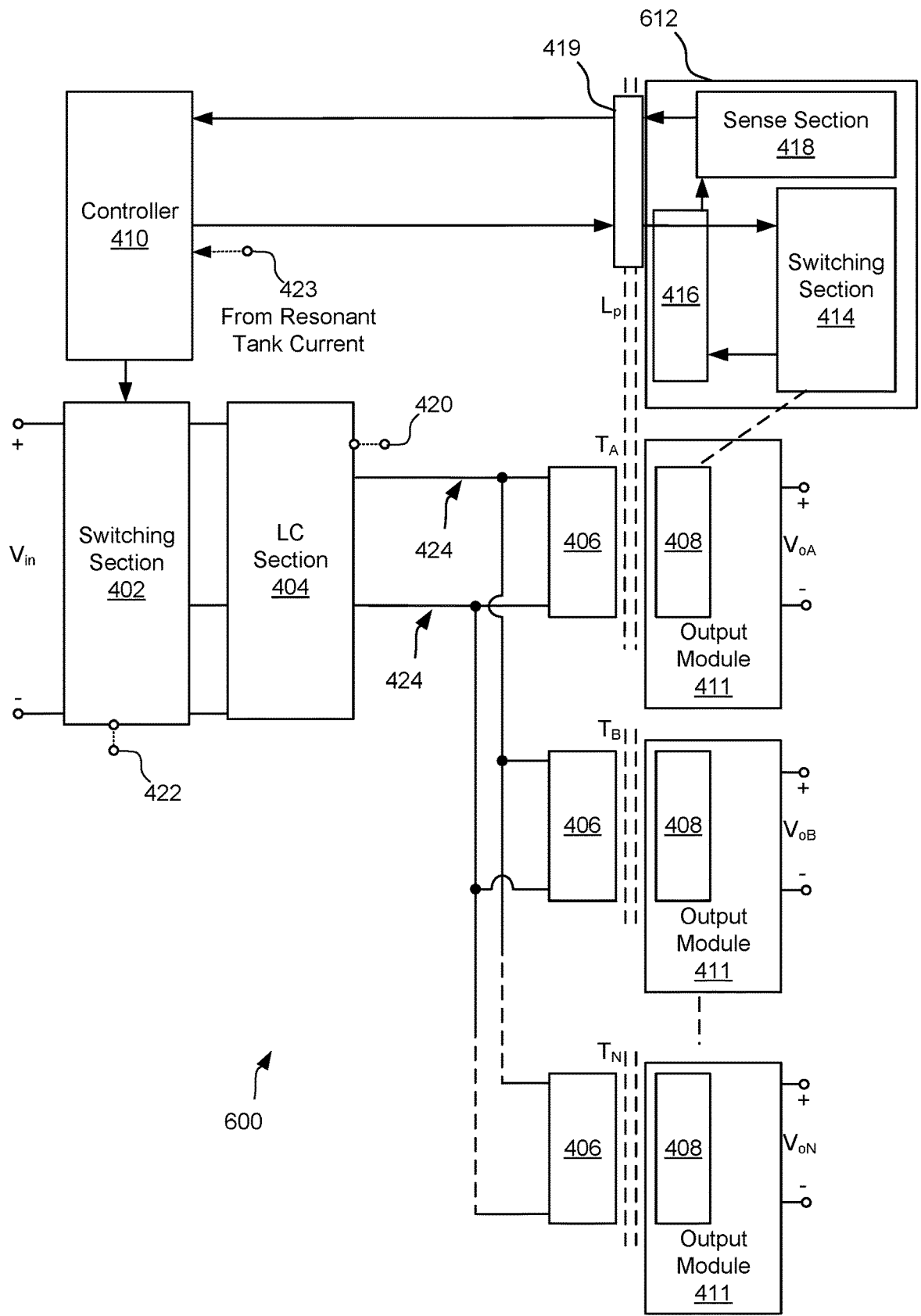
FIG. 6 illustrates an embodiment of a series resonant LLC power converter unit where a standby driving section and a sensing section couple to a secondary side of an output module via the same transformer.

However, other sensing mechanisms can also be utilized. For instance, when a sum of output voltages from the output modules rise above a threshold, this can indicate a light- or no-load condition. In contrast, if a voltage on the output bus rises above threshold, then this also can indicate a light or no-load condition. Whatever means is used to detect this state, the controller puts the converter into a standby state in response by turning a first switching section off and turning a second switching section on, where the second switching section delivers lower power than the first switching section and uses smaller and faster switches. For instance, the second switching section may be driven by downconverted power from the main input. The second switching section can turn the downconverted power into a square wave and deliver it through a push-pull pair of transformer secondaries coupled to a primary winding spanning the output bus, and thereby deliver power during the standby state to the output bus. The primary winding on the output bus can be arranged in parallel with parallel primaries that are also on the output bus, and these in turn can provide power to the output modules. FIGS. 4-6 provide high level views of different standby sections arranged on either the primary or secondary side of an isolation boundary. FIGS. 6-13 provide more detailed embodiments of the generalized topologies of FIGS. 4-6. FIGS. 14-17 show some non-limiting examples of output module topologies and FIGS. 18-22 illustrate some non-limiting resonant tank current sensing topologies.

For the purposes of this disclosure, resonant tank current is a series current in the resonant tank of a series resonant LLC power converter. For instance, resonant tank current may be a current through an LC section of a series resonant LLC power converter (e.g., in LC section 404 of FIGS. 4-6). In another example, resonant tank current may be a current through a capacitor and an inductor of an LC section of a series resonant LLC power converter (e.g., between $C_{r1}$ and $L_{r1}$ in FIGS. 7-13, 18-20, 25, and 29). Resonant tank current can be measured as a proxy for a load versus no-load (or light-load) determination. When resonant tank current drops below a threshold this can indicate that a light- or no-load condition exists. Resonant tank current can be derived from voltage measurements.

The resonant tank can comprise the LLC combination of $C_{r1}$, $L_{r1}$, and ($N_1$-$N_N$) where the third inductor in the resonant tank is effectively the parallel combination of all primary windings coupled to the output bus 424.

FIG. 4 illustrates an embodiment of a series resonant LLC power converter unit in which a standby driving section and a sensing section are coupled to an output bus via the same transformer. Power converter unit 400 includes a first switching section 402 and an LC section 404, which may be examples of switching sections and LC sections described with reference to FIG. 1A through FIG. 3.

First switching section 402 may be a half-bridge switching section (e.g., including two switches) or a full-bridge switching section (e.g., including four switches). LC section 404 may include one or more inductive elements and one or more capacitors in series. First switching section 402 may be configured to convert a DC input (e.g., voltage $V_{in}$) into an alternating current square wave. First switching section 402 may be coupled with LC section 404 and configured to provide the square wave to LC section 404. The LC section 404 may be configured to convert the received square wave to a sinusoidal AC waveform (e.g., by filtering or smoothing the square wave). The DC power input $V_{in}$ may be derived from a PFC boost converter in some embodiments (not shown), and in some embodiments DC input, $V_{in}$, can be between 300V and 500V, or between 350V and 450V, or between 375V and 425V, or between 385V and 405V.

Power converter unit 400 includes M transformer primaries connected in parallel, including the transformer primary 405 and transformer primaries 406. The M transformer primaries 405, 406 are each coupled in parallel with LC section 404 and configured to receive the AC waveform from LC section 404 via output bus 424. Each of the M transformer primaries 405, 406 also helps to filter or smooth the AC waveform en route to secondaries of each of the M transformers. Transformer primary 405 can also act as a parallel choke through magnetization of the core Lp.

Figure 18:
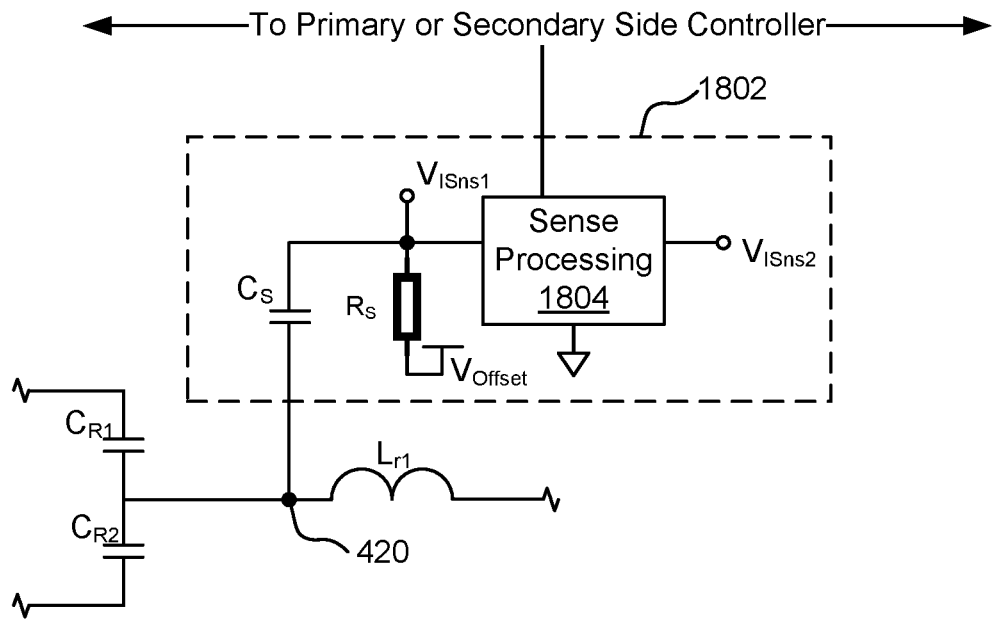
FIG. 18 illustrates a resonant tank current sensor that may be used in a sense section.
Figure 19:
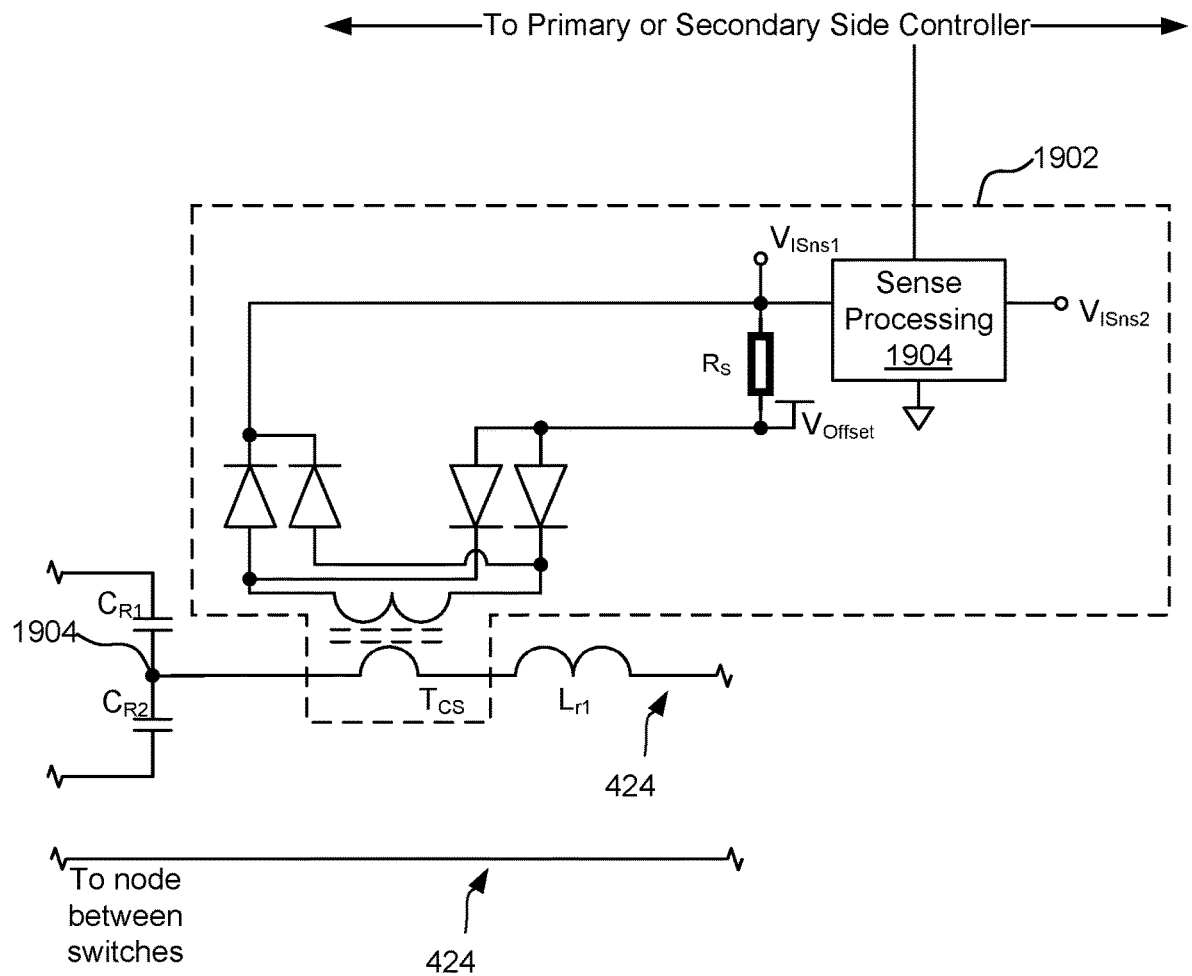
FIG. 19 illustrates a resonant tank current sensor that may be used in a sense section.
Figure 20:
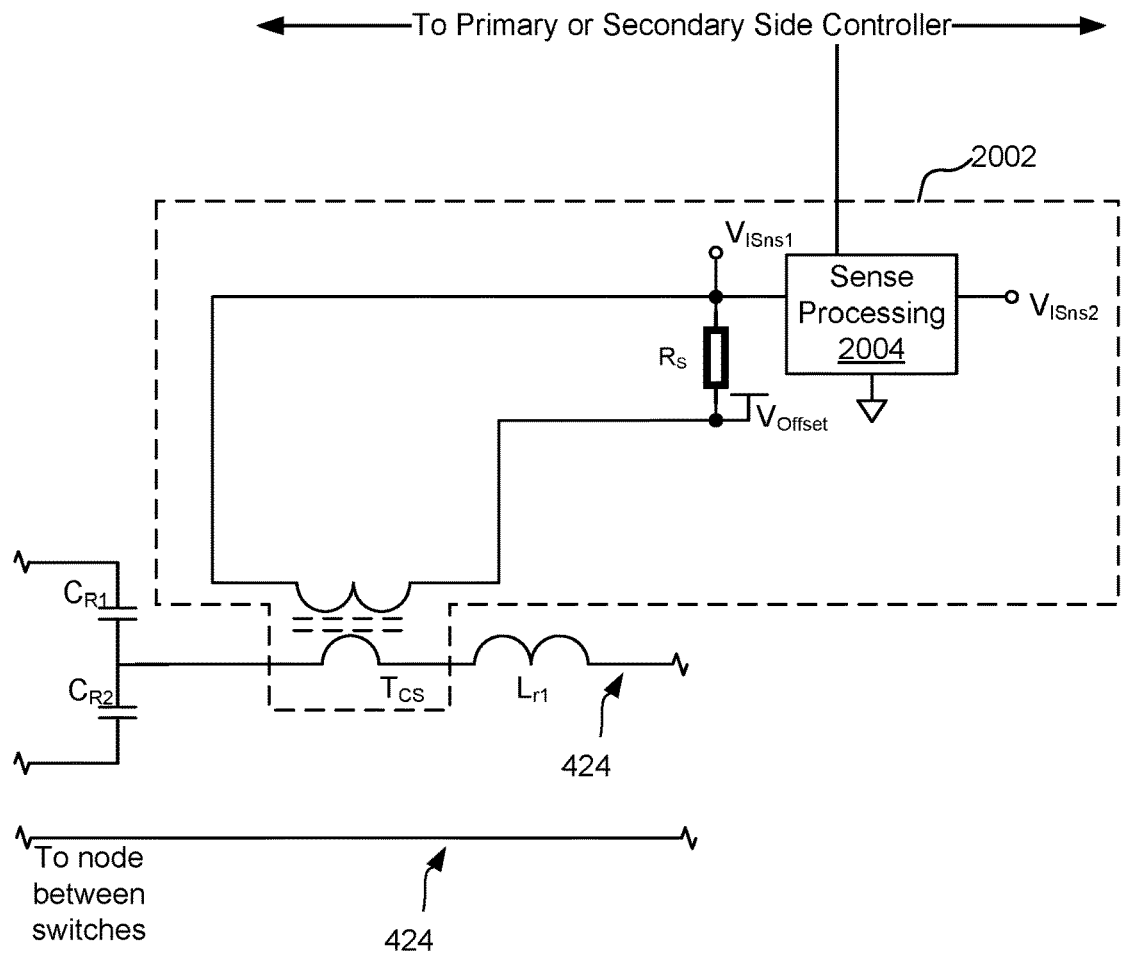
FIG. 20 illustrates a resonant tank current sensor that may be used in a sense section.

In some embodiments, output node 420 may be used to measure (e.g., sense) a resonant tank current in the LC section 404, such as using voltage detection circuitry shown in FIGS. 18-20 ($V_{ISns2}$). In some embodiments, input node 422 may be used to indirectly measure (e.g., sense) resonant tank current, such as using voltage detection circuitry shown in FIGS. 21-22 ($V_{ISns}$). Sensed resonant tank current can be provided to the controller 410, for instance, via sense section 418, and used in a feedback loop to control the switching section 402. For instance, the resonant tank current sensed at 420 or 422 can be input to the controller 410 via the sense section at input 423. In an embodiment, the controller 410 can use a combination of output bus 424 voltage measured through a secondary winding 416 and resonant tank current measured at 420 or 422 to determine when to detect a light- or no-load condition and hence when to switch from the load to the standby state. In some embodiments, the input 423 can be arranged directly to the controller 410 rather than first passing through a sense section 418. Further, in some embodiments, a sense section 418 may not be used, and instead, voltage sensed across the secondary winding 416 can be provided directly to the controller 410.

Figure 16:
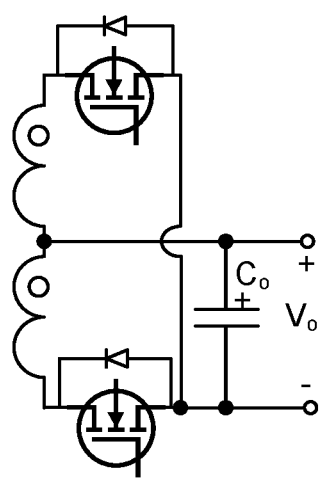
FIG. 16 illustrates an embodiment of an output module.
Figure 17:
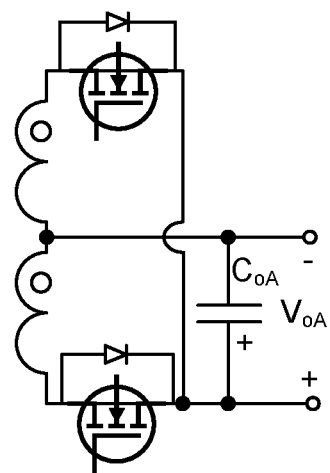
FIG. 17 illustrates an embodiment of an output module.

Power converter unit 400 includes N output modules 411 that each have a transformer secondary 408 coupled to a corresponding transformer primary 406 via a transformer core $T_A$, $T_B$, ..., $T_N$. Each output module 411 may provide a corresponding output voltage $V_{OA}$, $V_{OB}$, ..., $V_{ON}$ to a load (typically after post-regulation for instance by means of a buck converter), for example, and these voltages can be coupled in series, parallel, or some combination thereof to provide a variety of customized outputs. The output modules 411 have been illustrated in a simplified form, and in practice the transformer secondaries 408 can comprise a pair of push-pull transformer secondaries, each push-pull pair sharing a common core with a corresponding one of the primaries 406. The pair of push-pull transformer secondaries may include a tap between them that provides a positive or high voltage leg of the output voltage, $V_o$, and may include rectified legs coupled to opposing ends of the pair of push-pull transformer secondaries, where the two rectified legs are coupled to form the negative or low voltage leg of the output voltage $V_{OA}$, $V_{OB}$, ..., $V_{ON}$. FIG. 14 provides an example of one such implementation. In another, the rectifiers can be flipped in polarization and the negative or low voltage leg of the output $V_{OA}$, $V_{OB}$, ..., $V_{ON}$ can be pulled from the tap between the two push-pull transformer secondaries, as seen in FIG. 14B. In this embodiment, the rectified legs can be joined to form the positive or high voltage leg of the output $V_{OA}$, $V_{OB}$, ..., $V_{ON}$. In yet other examples, the rectifiers can be implemented as switches, for instance as MOSFETs as shown in FIGS. 16 and 17.

Power converter unit 400 includes a standby drive section 412 for driving a voltage on the output bus 424 during noor light-load conditions. Standby drive section 412 includes a second switching section 414, at least one transformer "secondary" 416, and a sense section 418. Transformer secondary 416 may be coupled to transformer primary 405 via transformer core $L_P$. In some embodiments, transformer core $L_P$ may include an air gap. It should be appreciated that since the transformer primaries 405, 406 are arranged in parallel on the output bus 424, they all see the same voltage, and accordingly, the secondaries 408, 416 all see the same voltage (output current will depend on the load on each output module 411). Thus, transformer secondary 416 provides an isolated sensing mechanism of voltage on the output modules 411 that can be monitored for feedback to the controller to control switching of the first switching section 402. Typically, insight into these outputs uses a sensor at the output modules that communicates back to the switching section 402 via an opto-isolator that can communicate across the isolation boundary formed by the transformers. However, the illustrated standby drive section 412 allows output module 411 voltages to be known without the use of an opto-coupler.

The transformer core $L_p$ is symbolic of the isolation boundary and primaries 405 and 406 as well as secondary 416 can be considered to be on a "primary side" and secondaries 408 can be considered to be on a "secondary side". It should be noted however, that a secondary 416 will be referenced despite its location sometimes being on the primary side of the isolation boundary (e.g., FIGS. 4-5) and sometimes on the secondary side of the isolation boundary (e.g., FIG. 6).

Along these same lines, the secondary 416 is arranged on the primary side of the isolation boundary, and thus the term "secondary" with reference to element 416 takes on a unique meaning in this disclosure. Further, and as will be discussed below, the secondary 416 is also used to drive voltage onto the output bus 424 during light- or no-load situations. Typically, a primary winding refers to a winding that passes voltage or current to a secondary winding in a transformer. This definition still applies relative to the primaries 406 and the secondaries 408. However, in the case of primary 405 and secondary 416, the primary 405 performs a driving function for the purposes of sensing voltage on the output bus 424, but the secondary 416 drives voltage and current to the primary 405 when the standby state is engaged. Thus, "primary" and "secondary" are used in atypical fashion with reference to windings 405 and 416.

Power converter unit 400 includes regulator 409, which may be configured to supply a regulated voltage(s) to a controller 410 and switching section 414. Regulator 409 may be a regulated bias supply, for example. In some embodiments, the regulator 409 can take the form of a flyback converter or other step-down converter. The flyback converter can provide voltage $V_{cc}$ to the standby drive section 412 without a linear or switch mode post regulation. If the power limit of Regulator 409 is adjusted to correspond to the maximum output power for standby mode then the output voltage of 409 dropping below a threshold could dictate the exit from standby mode. More specifically, the second switching section 414 in standby mode can be set to circulate a level of power just below a power limit of the regulator 409, which also means that the regulator power is close to a threshold for leaving standby mode. Thus, when the regulator 409 reaches its power limit, $V_{CC}$ drops and this drop in voltage across a standby threshold can be used as a trigger to return to the load mode.

The regulator 409 may provide less than 15V, while $V_{in}$ tends to be on the order of hundreds of volts.

Second switching section 414 may be similar in topology and operation to switching section 402, but using lower-power switches. For instance, Diodes Inc., DMG7430LFG-7, 11 mΩ, 30V, 3.3 mm×3.3 mm. That is, second switching section 414 may be a push-pull (having two switches) or half-bridge section (having two switches) or a full-bridge section (having four switches) and may be used, under no- or light-load conditions, to generate a square wave based on a DC input voltage received from the regulator 409. The DC input voltage from the regulator 409 can be down converted from $V_{in}$ such that lower power is dissipated in the standby mode. Because the power from the regulator 409 is lower than that seen by the first switching section 402, devices in the second switching section 414 can be lower power and thus able to switch faster than those in the first switching section 402. Correspondingly, this also means that the second switching section 414 can effect a lower output square wave than the first switching section 402 thereby achieving lower output power at the output modules 411 (e.g., <15V) than is possible when the first switching section 402 is engaged. The second switching section's 414 faster switches also allows it to drive a lower power on the output bus 424 since output power is inversely related to switching speed. Duty cycle of the second switching section 414 can dictate output power, where a shorter duty cycle leads to a lower output power.

Power converter unit 400 includes a controller 410 that may be coupled with standby drive section 412 and configured to receive, from sense section 418, an indication of a voltage across the output bus 424 (i.e., a voltage across each of the primaries 405, 406), an indication of resonant tank current from node 420 or 422 via node 423, or both. Controller 410 may be configured to activate or deactivate switches in second switching section 414 based on the sensed resonant tank current, and control switching of the first switching section 402 in load mode via the voltage across the output bus 424. In other words, the controller 410 can move the power converter unit 400 from a load to a standby state (i.e., engage the second switching section 414) based on resonant tank current, and the controller 410 can move the power converter unit 400 from a standby to a load state based on a drop in regulator voltage due to the regulator exceeding its power limit, as indicated by $V_{SnsPri}$ where the standby drive section is on the primary side or $V_{SnsSec}$ where the standby drive section is on the secondary side.

In some embodiments, to determine when to switch between the load and standby states it may be preferable to consider resonant tank current as measured at node 420 or 422. In particular, the controller 410 may switch between a load state and a standby state based on the resonant tank current falling below a threshold. Accordingly, the sense section 418 may optionally determine the resonant tank current via a voltage measurement at node 420 or at node 422, both of which are proportional to current and hence power. Although an explicit measurement scheme of resonant tank current is not shown in FIG. 4, resonant tank voltage can be measured at node 420 or 422 and provided to the sense section 418 via input 423, which can infer current and power. More specifically, measurements of voltage at node 420 can be made via a variety of implementations including, but not limited to, those illustrated in FIGS. 18-20 and from this it should be appreciated that node 420 can, in some embodiments, represent a direct measurement (e.g., FIG. 18) or an inductively-coupled measurement (e.g., FIGS. 19-20), to name two non-limiting examples. Indirect measurements of current at node 422 can be made via a variety of implementations including, but not limited to, those illustrated in FIGS. 21-22 and from this it should be appreciated that node 422 can, in some embodiments, represent different parallel voltage measurements below a second switch in the first switching section 402. Output bus 424 voltage may also be used in a feedback loop through sense section 418 and controller 410 to control the first switching section 402 in the load state to keep the output bus 424 voltage constant. This output bus 424 voltage monitoring can be performed via the secondary winding 416 and can be distinct from the controller's 410 consideration of which state to engage (load or standby). From the standby state, the controller 410 may look at output power of the regulator 409 to determine when to switch back to the load state. When the output power of the regulator 409 falls below a threshold, as inferred from measuring secondary winding 416 voltage falling below a threshold, the controller 410 can move the power converter unit 400 back into the load state by engaging first switching section 402.

In operation, if controller 410 determines that the load state should be changed to the standby state (as may occur, for example, when some or all of the loads have been removed from the N output modules), controller 410 may change the state of power converter unit 400 from a load state to a standby state by turning the first switching section 402 off and turning the second switching section 414 on. While operating in the standby state, controller 410 may alternately activate switches in second switching section 414 to cause a square wave to be generated (e.g., a square wave generated by second switching section 414 based on a voltage received from regulator 409 or from a DC power input) and provided to transformer secondary 416, thereby inducing a current in transformer primary 405 and providing power to the output bus 424, but at lower voltage than what the first switching section 402 was able to provide.

As seen, the standby drive section 412 along with controller 410 can be used to not only determine when a light- or no-load condition exists, and hence when to switch into a standby state or when to return to the load state, but also to drive power from a lower-voltage source (i.e., regulator 409) to the output bus 424 in the standby state. In other words, since there is a limit to how much the output bus 424 voltage can be decreased by increasing a frequency of the switching section 402, standby drive section 412 can be used to achieve lower bus 424 voltages during light- or no-load situations than is possible in the prior art.

Although the controller 410 is shown outside of the standby drive section 412, in other embodiments the controller 410 can be part of the standby drive section 412. In other embodiments, the standby drive section 412 is not used but the controller 410, switching section 414, secondary windings 416 and sense section 418 are still implemented.

Figure 21:
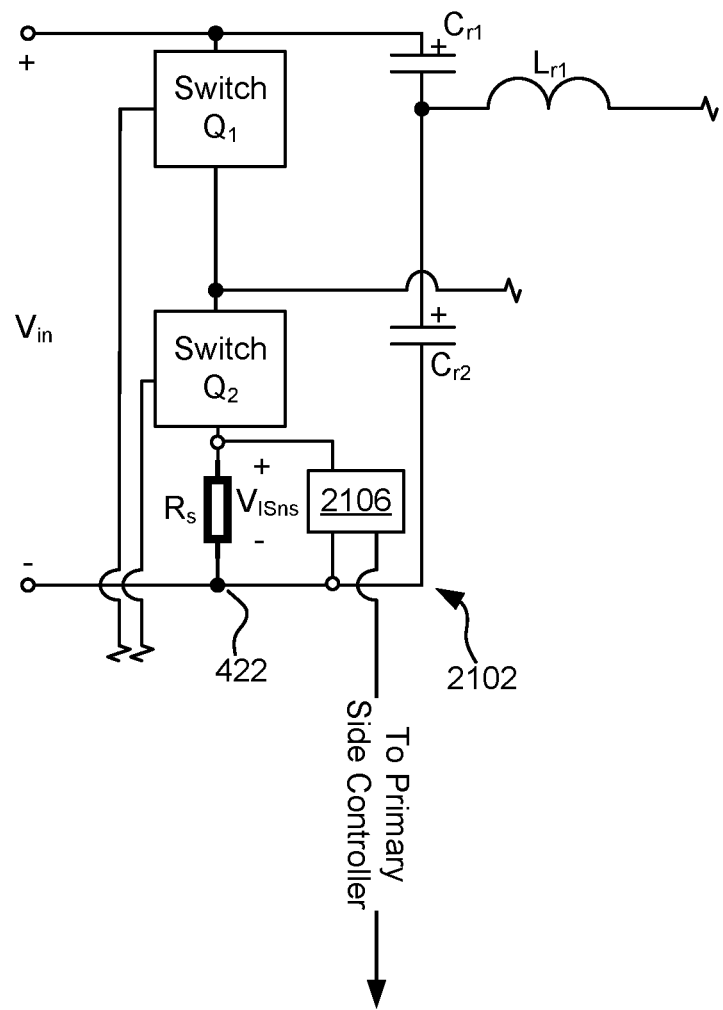
FIG. 21 illustrates a current sensor that may be used to sense an input voltage to a first switching section.
Figure 22:
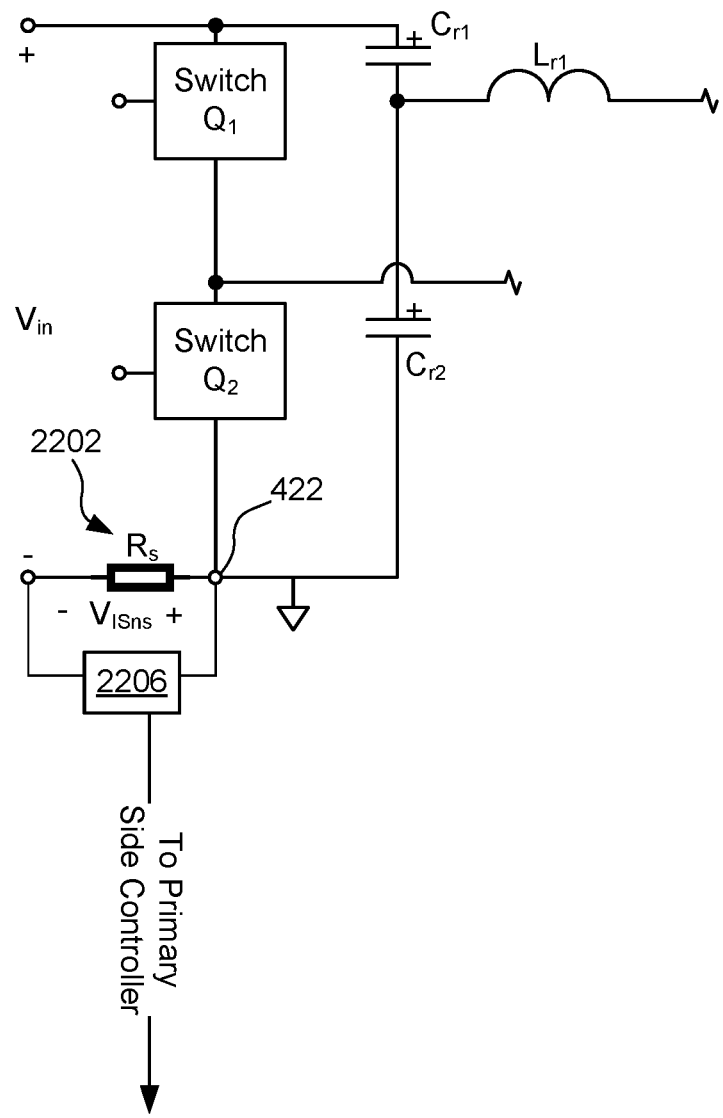
FIG. 22 illustrates circuitry a current sensor that may be used to sense an input voltage to a first switching section.

In some embodiments, the controller 410 on a primary side of an isolation boundary can be used in concert with power, voltage, or current sensing using the transformer secondary 416 on a primary side of the isolation boundary, and/or power, voltage, or current sensing via nodes 420 or 422 (e.g., the capacitive sensing of FIG. 18, the transformer-based sensing of FIGS. 19-20, or the resistive sensing of FIGS. 21-22). For instance, it may be preferable to use a resonant tank current sensor at node 420 (see FIGS. 18-20) or a resistive current sensor at node 422 (see FIGS. 21-22) to monitor for indications that power has fallen such that the standby state should be entered, while the voltage across secondary winding 416 is used to monitor regulator 409 power limit in the standby state and determine when to switch back to a load state. In some embodiments, the controller 410 on a secondary side of an isolation boundary (e.g., 1304b in FIG. 13) can be used in concert with power, voltage, or current sensing using the transformer secondary 416 on either side of the isolation boundary, and/or power, voltage, or current sensing via node 420 and transformer-based sensing (e.g., FIGS. 19-20), and/or power, voltage, or current sensing via an output of the output modules (e.g., 410). In other words, a secondary side controller can be used, but primarily where sensing is performed via transformer on the primary side of the isolation boundary, or is performed on the secondary side of the isolation boundary (e.g., at the output modules).

While three transformers (406/408) and three output modules 411 are illustrated, one of skill will appreciate than any number of one through N transformers can be utilized. For instance, N can equal 2 in some embodiments.

The outputs $V_{oA}$, $V_{oB}$, $V_{oC}$ can be coupled together in any combination of series and parallel connections to achieve a desired total output, thus allowing more modular and low-cost solutions for a custom output.

Figure 7:
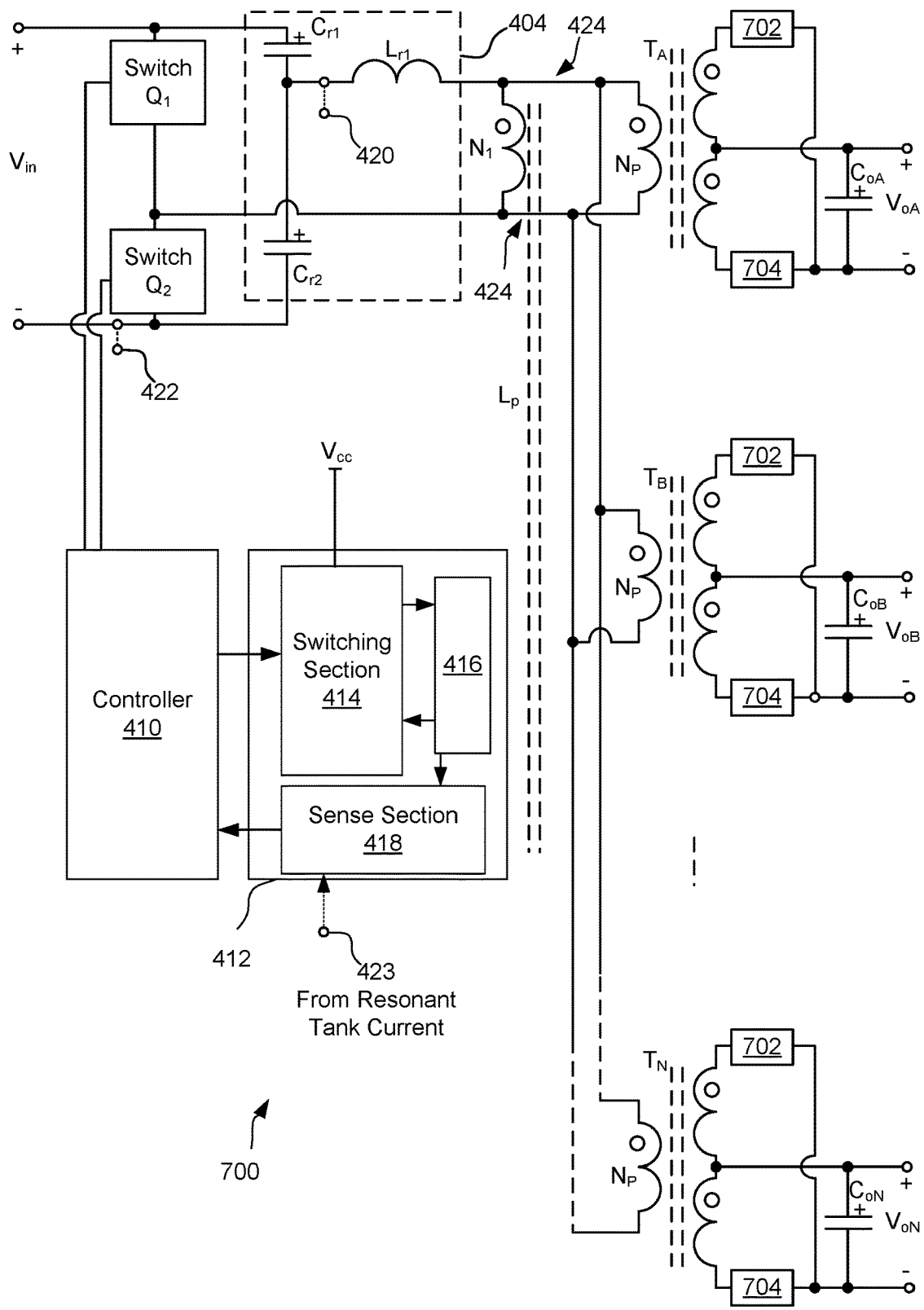
FIG. 7 illustrates a more detailed embodiment of the LLC power converter unit shown in FIG. 4.
Figure 8:
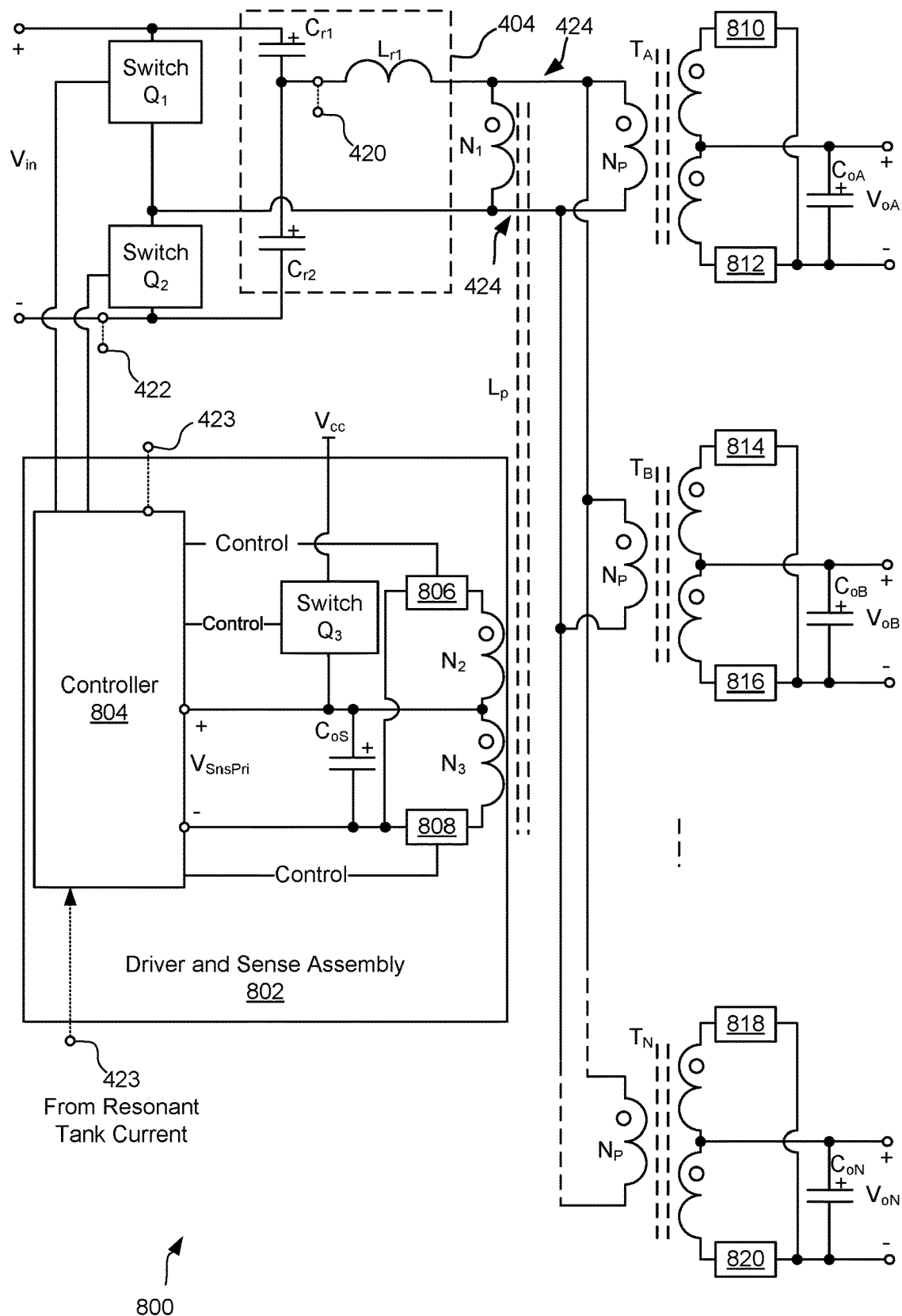
FIG. 8 illustrates an embodiment of a series resonant LLC power converter unit in which a driver and sense assembly section are coupled to an output bus via the same transformer.
Figure 9:
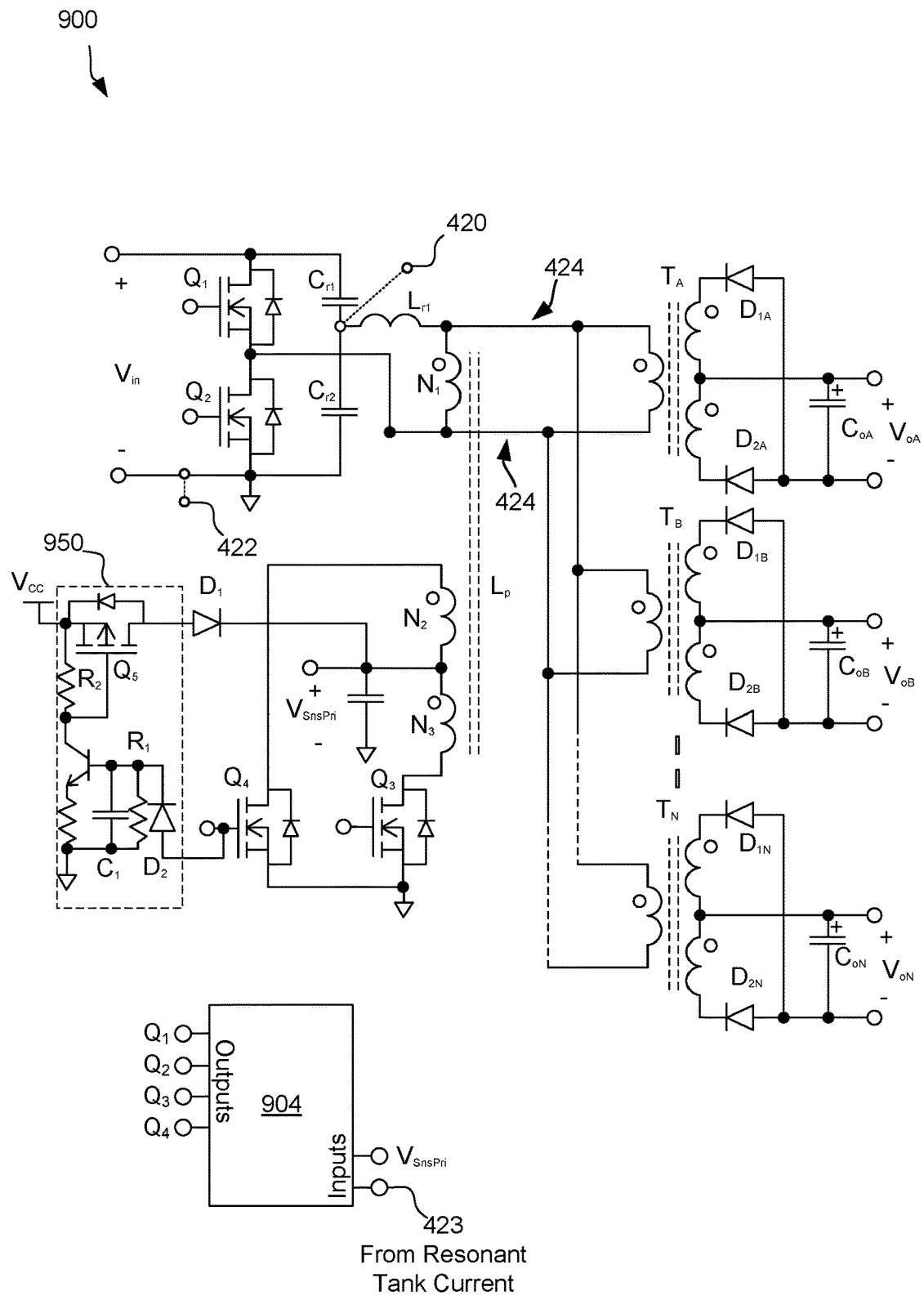
FIG. 9 illustrates a more detailed embodiment of the LLC power converter units shown in FIGS. 4 and 8.

Further details of possible implementations of FIG. 4 can be seen in FIGS. 7-9.

FIG. 5 illustrates an embodiment of a series resonant LLC power converter unit in which a standby driving section and a sensing section are coupled to a primary side of an output module via the same transformer.

Power converter unit 500 is similar to power converter unit 400 but omits transformer primary 405 across the output bus 424. Instead, transformer secondary 416 of standby drive section 412 is coupled with transformer primary 406 of transformer $T_A$ via a common core of the transformer $T_A$. As described with reference to power converter unit 400, the controller 410 in the load state may monitor resonant tank current at 420, 422 or output voltage, $V_{oA}$, and when the current falls below a light- or no-load threshold or the output voltage rises above a light- or no-load threshold, the controller 410 cause power converter unit 500 to enter the standby state. This may involve the controller 410 turning the first switch section 402 off and turn the second switching section 414 on. This in turn causes the output bus 424 to be biased by the regulator 409 through the standby drive section 412 rather than the input voltage $V_{in}$ through the first switching section 402 and the LC section 404. Specifically, power can be applied to the secondary 416 via the second switching section 414 and derived from regulator 409, which downconverts the input voltage $V_{in}$. Current in the secondary winding 416 can induce current in the primary 406 and the secondary 408, and the induced current in the primary 406 can bias the output bus 424 and generate current in the other primaries 406, thereby driving all N output modules 411 at a lower voltage than is possible via the input voltage $V_{in}$ through the second switching section 402 and the LC section 404.

In the standby state, the controller 410 can monitor transformer secondary 416, or the output voltage of regulator 409, as a sensing mechanism for power from the regulator 409. When this begins to fall, it can indicate that the regulator 409 power limit has been reached, and the controller 410 can return the converter 400 to the load state by turning second switching section 414 off and turning first switching section 402 on.

Current and voltage on the output bus 424 and the primary 406 are the same and thus either can be said to relate to current on the secondaries 408 and hence outputs from the output modules 411. Similarly, current and voltage in the secondary 416 controls current and voltage on the output bus 424 and the primary 406 in the standby state. Similarly, current and voltage on the secondary 416 controls voltage on the output modules 411 through the secondaries 408.

Although the primary 405 has been removed in this embodiment, the first transformer $T_A$ can perform the function of the parallel choke by magnetizing the core $L_p$.

As in FIG. 4, the controller 410 can determine when to switch from a load state to a standby state and back again, and engage either the first switching section 402 (load state) or the second switching section 414 (standby state). This determination can be based on a resonant tank current or output module voltage in the load state or power limit of the regulator 409 in standby. Resonant tank current can be measured at node 420 or 422 and provided to the controller 410 via input 423. In an example, in the load state, the controller 410 may look at resonant tank current via current sensed at node 420 or 422 and provided to the controller via input 423 and the sense section 418. When the resonant tank current falls below a threshold, the controller 410 can turn off the first switching section 402 and turn on the second switching section 414. In this standby state, the controller 410 may look at output power of the regulator 409 to determine when to switch back to the load state. When the regulator reaches its power limit, and as inferred from a voltage drop seen at secondary winding 416, or regulator 409 output voltage as it reaches its power limit, the controller 410 can move the power converter unit 500 back into the load state by engaging first switching section 402.

Output bus 424 voltage may also be used in a feedback loop through secondary winding 416, sense section 418, and controller 410 to control the first switching section 402 in the load state to keep the output bus 424 voltage constant. This output bus 424 voltage monitoring can be performed via the secondary winding 416 and can be distinct from the controller's 410 consideration of which state to engage (load or standby).

FIG. 6 illustrates an embodiment of a series resonant LLC power converter unit in which a standby driving section is on a secondary side and a controller is on the primary side. Power converter unit 600 is similar to power converter unit 500, but in this embodiment, transformer secondary 416 of standby drive section 612 is coupled with transformer primary 406 of transformer $T_A$ and the transformer secondary 408 of transformer $T_A$. Operation of the standby drive section 612 is similar to that seen in FIG. 5, but here the sense section 418 and the second switching section 414 communicate with controller 410 across an isolation boundary formed by the transformers $T_A$, $T_B$, $T_N$. In other words, the standby drive section 612 is arranged on a secondary side of the isolation boundary and the controller 410 is arranged on the primary side of the isolation boundary. To communicate across this boundary and maintain isolation, a bi-directional optocoupler 419, pulse transformer, or similar isolation-hopping mechanism may be used. In other words, the controller 410 receives signals from the sense section 418 via the opto-coupler 419 and sends instructions to the second switching section 414 via the opto-coupler 419. A variation on this topology can be seen in FIG. 29.

Also, and as seen in FIG. 6, the standby drive section 612 drives the output bus 424 when the controller 410 puts the system into a standby state, and this driving is performed via the secondary winding 416 and the primary 406 of the first transformer $T_A$. The voltage on the output bus 424, or magnetization of the core $T_A$, can then drive the primaries 406 of the N transformers.

Current and voltage on the output bus 424 and the primary 406 are the same and thus either can be said to relate to current on the secondaries 408 and hence outputs from the output modules 411. Similarly, current and voltage in the secondary 416 controls current and voltage on the output bus 424 and the primary 406 in the standby state. Similarly, current and voltage on the secondary 416 controls voltage on the output modules 411 through the secondaries 408. Although the primary 405 has been removed in this embodiment, the first transformer $T_A$ can perform the function of the parallel choke by magnetizing the core $L_p$.

Figure 13:
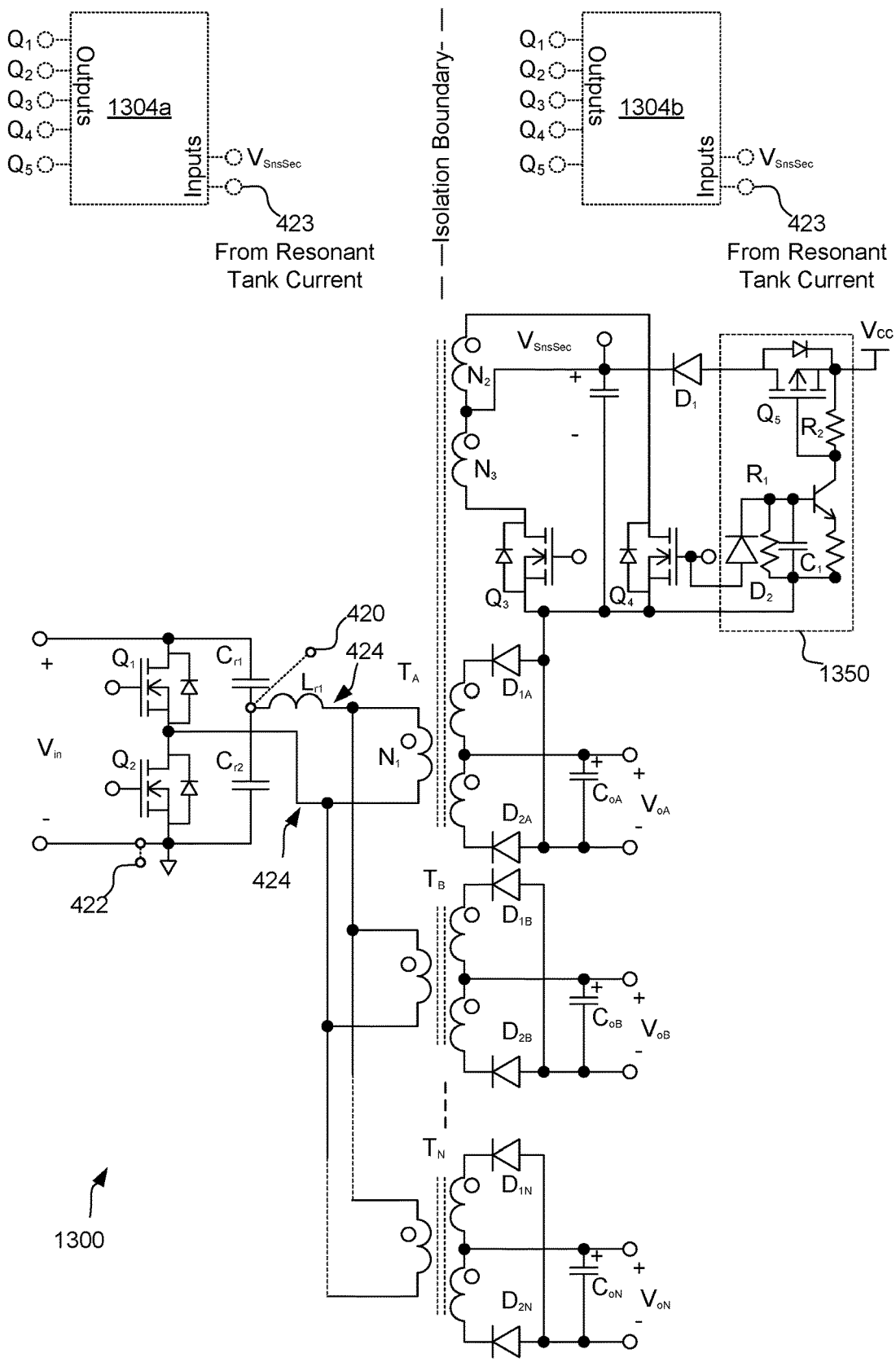
FIG. 13 illustrates a more detailed embodiment of the LLC power converter units shown in FIGS. 6 and 12.

While the controller 410 is illustrated on the primary side of the isolation boundary, it could also be arranged on the secondary side and control the first switching section 402 via an opto-coupler or pulse transformer. FIG. 13 illustrates a variation where the controller is 1304b is optionally arranged on the secondary side.

Although output bus 424 voltage in FIG. 6 is still measured via sense section 418 in the standby drive section 612, resonant tank current can be measured at node 420 or 422 and provided to the controller 410 via input 423 or via sense section 418 via optocouplers. Alternatively, the topologies of FIGS. 19 and 20 could be used to measure resonant tank current and provide the same to the secondary side of the isolation boundary without an optocoupler for this portion of data transfer. Alternatively, power can be measured on the secondary side and when it drops below a threshold in the load state, a logic signal can be passed via optocoupler 419 to the controller 410.

As in FIG. 4, the controller 410 can determine when to switch from a load state to a standby state and back again, and engage either the first switching section 402 (load state) or the second switching section 414 (standby state). This determination can be based on a resonant tank current (load state), output module voltage, $V_{OA}$ (load state), or the regulator (not shown) reaching its power limit (standby state). Resonant tank current can be sensed at node 420 or 422 and provided to the controller 410 via input 423. Output bus 424 voltage can be measured via voltage across secondary winding 416 and can be a proxy for voltage $V_{OA}$, $V_{OB}$, ... , $V_{ON}$ at the output modules 411. In an example load state, the controller 410 may look at resonant tank current via current sensed at node 420 or 422 and provided to the controller 410 via input 423. When the resonant tank current falls below a threshold, the controller 410 can turn off the first switching section 402 and turn on the second switching section 414. In the standby mode, the controller 410 may look at output power of the regulator to determine when to switch back to the load state. When the output power of the regulator 409 reaches its limit, the voltage delivered to the secondary winding 416 falls, and this fall can be used to trigger a return to the load state by engaging the first switching section 402 and disengaging the second switching section 414.

Optionally, output bus 424 voltage may also be used in a feedback loop through sense section 418 and controller 410 to control the first switching section 402 in the load state to keep the output bus 424 voltage constant. This output bus 424 voltage monitoring can be performed via the secondary winding 416 and can be distinct from the controller's 410 consideration of which state to engage (load or standby).

For converters with a single output module, control, sensing and standby drive functionality could reside on the secondary side of the isolation boundary, for instance as illustrated in FIG. 6, but also with a controller on the secondary side. The controller could send gate drive signals back to the first switching section 402 via an opto-coupler or pulse transformer.

In some embodiments, the secondaries 408, 416 can be implemented as a pair of push-pull windings, for instance, as shown in FIGS. 7 and 8, respectively.

FIG. 7 illustrates a more detailed embodiment of the series resonant LLC power converter unit 400 shown in FIG. 4. As shown in FIG. 7, switching section 402 may include two switches, Q1 and Q2, that may be configured to receive a DC power input and generate a square wave. LC section 404 may include two capacitors ($C_{r1}$, $C_{r2}$), and a discrete inductor ($L_{r1}$). A transformer primary $N_1$ can be coupled between an output of the inductor ($L_{r1}$) and a node between the two switches $Q_1$, $Q_2$. The output modules may each include a push-pull pair of transformer secondaries, two rectifiers 702, 704, and a capacitor $C_O$ to provide an DC output voltage $V_O$ to a load based on the rectangular input voltage provided to the transformer primaries $N_P$. The rectifiers 702, 704 can take a variety of forms as will be shown in non-limiting examples in FIGS. 14-17. Outputs of the rectifiers 702, 704 can be joined to a single output leg of each output module (e.g., the negative leg of output voltage $V_o$) and the positive leg can be tapped from between the two push-pull transformer secondaries. The capacitor $C_o$ can be coupled between these two legs.

Figure 11:
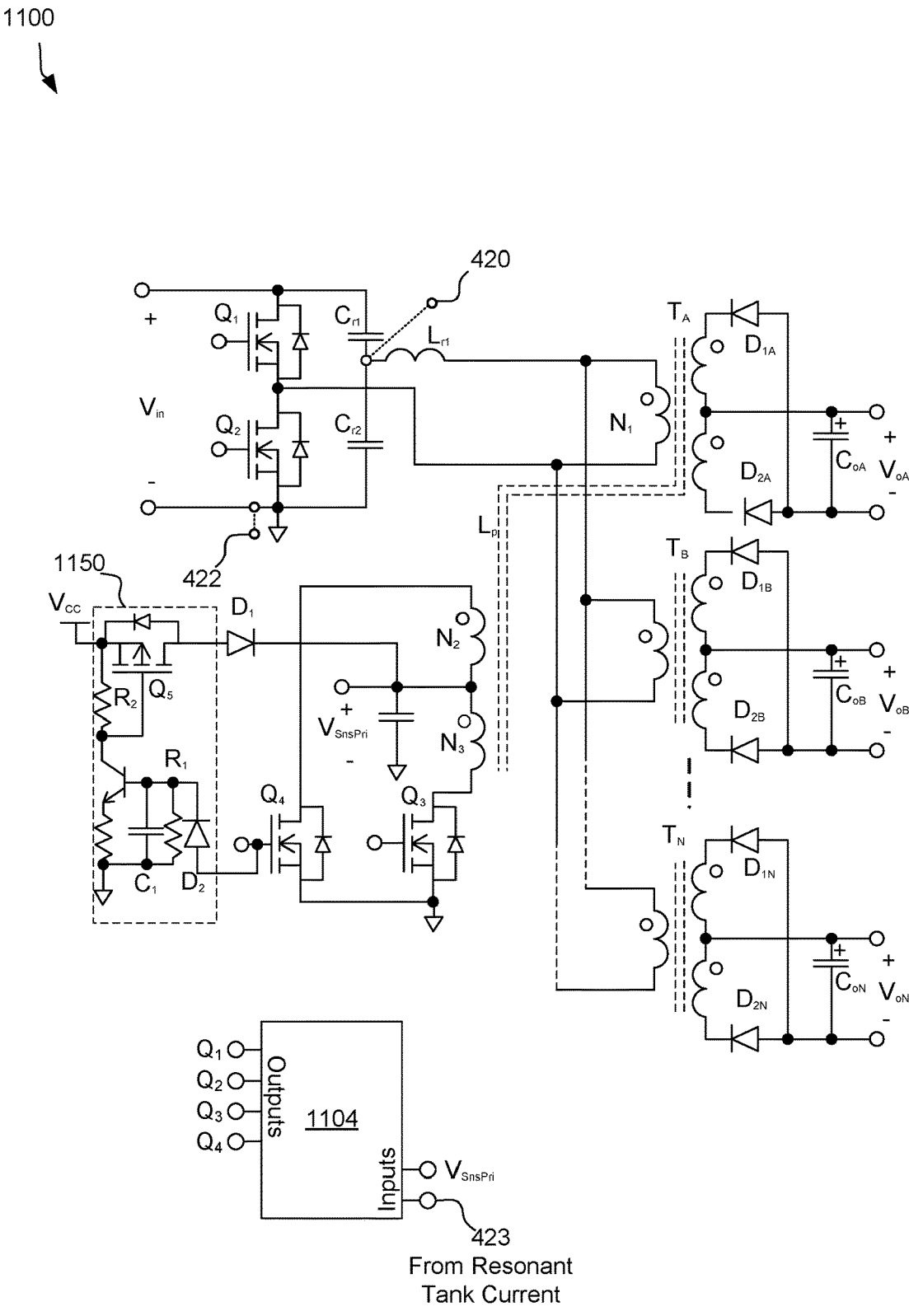
FIG. 11 illustrates a more detailed embodiment of the LLC power converter units shown in FIGS. 5 and 10.
Figure 29:
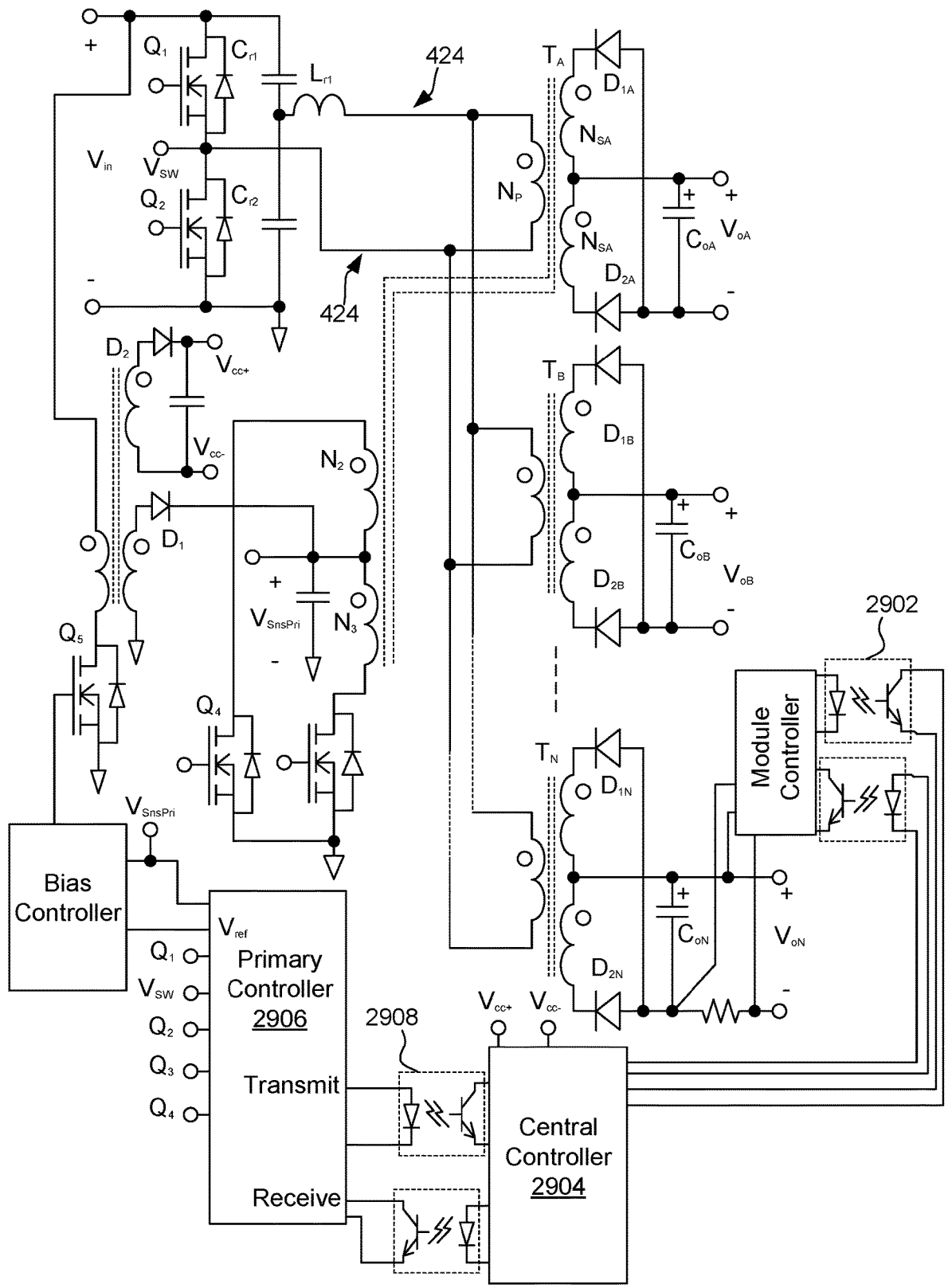
FIG. 29 illustrates another embodiment of a series resonant LLC power converter unit having sensing means on a secondary side and a controller on the primary side and using one or more opto-couplers to communicate across the isolation boundary.

Although not shown, a regulator (e.g., 409) can be implemented to provide power to at least the switching section 414 at a lower voltage than the input voltage $V_{in}$. FIGS. 11 and 29 show example details of such a regulator, though other regulator topologies can also be used.

In some embodiments, return or ground connections of the controller 410 may be at the same potential as the negative leg of the input voltage $V_{in}$.

Also, and as seen in previous figures such as FIG. 4, the standby drive section 412 drives the output bus 424 when the controller 410 puts the system into a standby state, and this driving is performed via the secondary winding 416 and the transformer primary $N_1$ and drawing power from the regulated voltage, $V_{cc}$ The voltage on the output bus 424, or magnetization of the core $L_p$, can then drive the primaries $N_P$ of the N transformers.

As in FIG. 4, the controller 410 can determine when to switch from a load state to a standby state and back again, and engage either the first pair of switches $Q_1$, $Q_2$ (load state) or the second switching section 414 (standby state). This determination can be based on a resonant tank current (load state), output module voltage, $V_{OA}$ (load state), or the regulator (not shown) reaching its power limit. Resonant tank current can be sensed at node 420 or 422 and provided to the controller 410 via input 423. Output bus 424 voltage can be measured via voltage across secondary winding 416 and can be a proxy for voltage $V_{OA}$, $V_{OB}$, . . . , $V_{ON}$ at the output modules 411. In an example load state, the controller 410 may look at resonant tank current via current measured at node 420 or 422 and provided to the controller 410 via input 423. When the resonant tank current falls below a threshold, the controller 410 can turn off the first pair of switches $Q_1$, $Q_2$ and turn on the second switching section 414. In the standby mode, the controller 410 may look at output power of a regulator (e.g., $V_{cc}$), to determine when to switch back to the load state. When the output power of the regulator reaches its limit, as inferred from measuring a voltage drop at the secondary winding 416 or the output voltage of the regulator 409, the controller 410 can move the power converter unit 700 back into the load state by engaging the first pair of switches $Q_1$, $Q_2$ and disengaging the second switching section 414.

Optionally, output bus 424 voltage may also be used in a feedback loop through sense section 418 and controller 410 to control the first pair of switches $Q_1$, $Q_2$ in the load state to keep the output bus 424 voltage constant. This output bus 424 voltage monitoring can be performed via the secondary winding 416 and can be distinct from the controller's 410 consideration of which state to engage (load or standby).

In some embodiments, the secondary winding 416 can be implemented as a pair of push-pull secondary windings, for instance, as shown in FIG. 8.

FIG. 8 illustrates an embodiment of a series resonant LLC power converter unit in which a driver and sense assembly 802 takes the place of the controller 410 and standby drive section 412 in FIG. 7. Driver and sense assembly 802 includes controller 804 that is coupled to and controls a switch Q3, switches 806, 808 (during operation in the standby state), a pair of push-pull transformer secondaries $N_2$, $N_3$, and switches Q1 and Q2 (during operation in the load state). The pair of push-pull transformer secondaries $N_2$, $N_3$ are coupled to transformer primary $N_1$ via a common core $L_p$. Switch $Q_3$ can control power delivery to a tap in between the pair of push-pull transformer secondaries $N_2$ and $N_3$, where the power is drawn from a regulated voltage source $V_{cc}$ that may be a power regulator such as 409 in FIG. 4, but could take other forms as well.

The driver and sense assembly 802 can monitor voltage on the output bus 424 via a voltage $V_{SnsPri}$ taken across two leads—a higher voltage lead tapped from between the pair of push-pull transformer secondaries $N_2$ and $N_3$ and referenced to ground. The lower voltage lead can be a ground potential and can be coupled to a ground potential terminal of the switch 808. Resonant tank current can be sensed via voltages at 420 or 422 and provided to the controller 804 via input 423.

As in FIG. 4, the controller 410 can determine when to switch from a load state to a standby state and back again, and engage either the first pair of switches $Q_1$, $Q_2$ (load state) or the second pair of switches 806, 808 (standby state). This determination can be based on a resonant tank current, output bus 424 voltage, or both. This determination can be based on a resonant tank current (load state), output module voltage, $V_{OA}$ (load state), or the regulator (not shown) reaching its power limit. Resonant tank current can be sensed at node 420 or 422 and provided to the controller 410 via input 423. Output voltage on the output bus 424 can be monitored via $V_{SnsPri}$, or the voltage tapped from between the pair of push-pull transformer secondaries $N_2$ and $N_3$, and can be a proxy for output voltage $V_{OA}$, $V_{OB}$, . . . , $V_{ON}$, from the output modules. In an example load state, the controller 410 may look at resonant tank current via current measured at node 420 or 422 and provided to the controller 410 via input 423. When the resonant tank current falls below a threshold, the controller 410 can turn off the first pair of switches $Q_1$ and $Q_2$ and turn on the second pair of switches 806, 808 and provide power to the pair of push-pull transformer secondaries $N_2$ and $N_3$. Power delivery to the output bus 424 in the standby state can be controlled by the controller 804 controlling a switching frequency or duty cycle of the switches 806 and 808. Switch $Q_3$ is optional, and control could be enabled by $V_{SnsPri}$ being directly connected to regulated voltage $V_{cc}$. In this case, it would be beneficial for the controller 804 to have control of the level of $V_{cc}$.

In the standby state, the controller 410 may look at output power of a regulator (such as regulator 409 in FIG. 4) providing regulated voltage, $V_{cc}$, to determine when to switch back to the load state. When the output power of the regulator reaches its limit, as inferred from a voltage drop sensed at $V_{SnsPri}$, $V_{cc}$, or the voltage tapped from between the pair of push-pull transformer secondaries $N_2$ and $N_3$, the controller 410 can move the power converter unit 800 back into the load state by engaging the first pair of switches $Q_1$ and $Q_2$ and disengaging the second pair of switches 806, 808.

Optionally, output bus 424 voltage may also be used in a feedback loop through controller 804 to control the first pair of switches $Q_1$, $Q_2$ in the load state to keep the output bus 424 voltage constant. This output bus 424 voltage monitoring can be performed via measuring $V_{SnsPri}$, or the voltage tapped from between the pair of push-pull transformer secondaries $N_2$ and $N_3$, and can be distinct from the controller's 804 consideration of which state to engage (load or standby).

Also, and as seen in previous figures such as FIG. 4, the driver and sense assembly 802 drives the output bus 424 when the controller 804 puts the system into a standby state, and this driving is performed via the pair of push-pull transformer secondaries $N_2$ and $N_3$ and the transformer primary $N_1$ The voltage on the output bus 424 can then drive the primaries $N_P$ of the other transformers $T_A$ through $T_N$ and thereby control output module voltage $V_{OA}, V_{OB}, \ldots, V_{ON}$.

FIG. 9 illustrates a more detailed embodiment of the LLC power converter units shown in FIGS. 4 and 8. LLC power converter unit 900 illustrates circuit components that may be used to implement aspects of LLC power converter units 400, 800. Namely, LLC power converter unit 900 shows diodes in place of the more general rectifiers of FIGS. 4 and 8. A regulator 950 can be seen to receive voltage $V_{cc}$ that may be a regulated voltage drawn from and downconverted from the input voltage $V_{in}$, though this is not required. The voltage $V_{cc}$ is selectively, via switch $Q_5$, applied to the tap between a pair of push-pull transformer secondaries $N_2$ and $N_3$. Diode $D_1$ can be arranged between switch $Q_5$ and the push-pull transformer pair $N_2$ and $N_3$ to prevent voltage and current from being driven back into the power supply providing the voltage $V_{cc}$. A voltage $V_{SnsPri}$ tapped from between the two push-pull transformer secondaries $N_2$ and $N_3$ can be taken across a capacitor referenced to ground. A controller 904 can control gates of the switches $Q_1$, $Q_2$, $Q_3$ and $Q_4$ thereby controlling voltage on the output bus 424 in either the load or standby state. The controller 904 can include inputs 423 from the resonant tank current sensing and $V_{SnsPri}$ tapped from between the pair of push-pull secondaries $N_2$ and $N_3$.

Where $D_1$ can be reverse biased during a 'load' mode, $Q_5$ is not needed. This is guaranteed where $V_{oA}(N_p/N_{sA})(N_2/N_1) > V_{cc}$ in 'load' mode where $N_p$ are the module primary turns and $N_{sA}$ are module A secondary turns. Any module output voltage and turns could be inserted into this equation without changing the result as the output voltages are proportional to the secondary turns. Where $V_{oA}(N_p/N_{sA})(N_2/N_1) < V_{cc}$ in 'load' mode, then without $Q_5$ being turned off, $V_{SnsPri}$ would be a diode drop below $V_{cc}$ so couldn't be used for sensing the output voltage as the body diodes of $Q_3$ and $Q_4$ would be reverse biased. In 'load' mode, there is no gating of $Q_4$ so $D_2$ would stay off, the npn bipolar transistor would stay off so there would be no current in $R_2$ and the gate and source of $Q_5$ would be at the same potential keeping it off. In 'standby' mode, the voltage applied to the gate of $Q_4$ charges $C_1$ so the bipolar transistor is turned on and kept on because $R_1 C_1 \gg$ off time of the $Q_4$ gate pulse. The current through $R_2$ is sufficient to develop a potential across the gate source of $Q_5$ to keep it on. Optionally there could be a diode from the gate of $Q_3$ to the cathode of $D_2$. Alternatively, a separate logic signal (high in 'standby' mode, low in 'load' mode) could be used to turn the bipolar transistor on and off in which case $D_2$ can be excluded. An n-channel MOSFET could be used instead of the bipolar transistor and a pnp bipolar transistor could be used instead of $Q_5$. The functionality of the regulator 950 could be generalized by the statement, $Q_5$ is off in 'load' mode and on in 'standby' mode.

As in FIG. 4, the controller 904 can determine when to switch from a load state to a standby state and back again, and engage either the first pair of switches $Q_1$, $Q_2$ (load state) or the second pair of switches $Q_3$, $Q_4$ (standby state). This determination can be based on a resonant tank current (load state), output module voltage, $V_{OA}$ (load state), or the regulator (not shown) reaching its power limit. Resonant tank current can be sensed at node 420 or 422 and provided to the controller 904 via input 423. Output voltage on the output bus 424 can be monitored via $V_{SnsPri}$, or the voltage tapped from between the pair of push-pull transformer secondaries $N_2$ and $N_3$. In an example load state, the controller 904 may look at resonant tank current via current measured at node 420 or 422 and provided to the controller 904 via input 423. When the resonant tank current falls below a threshold, the controller 904 can turn off the first pair of switches $Q_1$ and $Q_2$ and turn on the second pair of switches $Q_3$, $Q_4$ and provide power to the pair of push-pull transformer secondaries $N_2$ and $N_3$ via $V_{cc}$, switch $Q_5$, and diode $D_1$. Power delivery to the output bus 424 in the standby state can be controlled by a switching frequency or duty cycle of the switches $Q_3$, $Q_4$, and where power is drawn from $V_{cc}$, optionally regulated by switching of $Q_5$. A shorter duty cycle of $Q_3$, $Q_4$ circulates less power through the primary $N_1$ and the output bus 424.

In the standby state, the controller 904 may look at output power of the regulator 950 providing power to the tap between $N_2$ and $N_3$, to determine when to switch back to the load state. When the output power of the regulator 950 reaches its power limit, as inferred from measuring $V_{SnsPri}$, or the voltage tapped from between the two push-pull transformer secondaries $N_2$ and $N_3$, falling below a threshold, the controller 904 can move the power converter unit 900 back into the load state by engaging the first pair of switches $Q_1$ and $Q_2$.

Optionally, output bus 424 voltage may also be used in a feedback loop through controller 904 to control the first pair of switches $Q_1$, $Q_2$ in the load state to keep the output bus 424 voltage constant. This output bus 424 voltage monitoring can be performed via measuring $V_{SnsPri}$, or the voltage tapped from between the two push-pull transformer secondaries $N_2$ and $N_3$, and can be distinct from the controller's 904 consideration of which state to engage (load or standby).

Although not shown, in an embodiment, switch $Q_5$ can be controlled via an additional output of the controller 904 rather than via analogue circuitry. FIG. 29 presents an example of this digital control of the regulator providing power to the pair of push-pull transformer secondaries $N_2$, $N_3$.

The inverted triangles in FIG. 9 can represent connections to the same return or negative level. In other words, the source of $Q_2$ and the sources of $Q_3$ and $Q_4$ can all be coupled together allowing these three switches to be driven from the same circuitry without level shifting or having to create additional biases.

Figure 10:
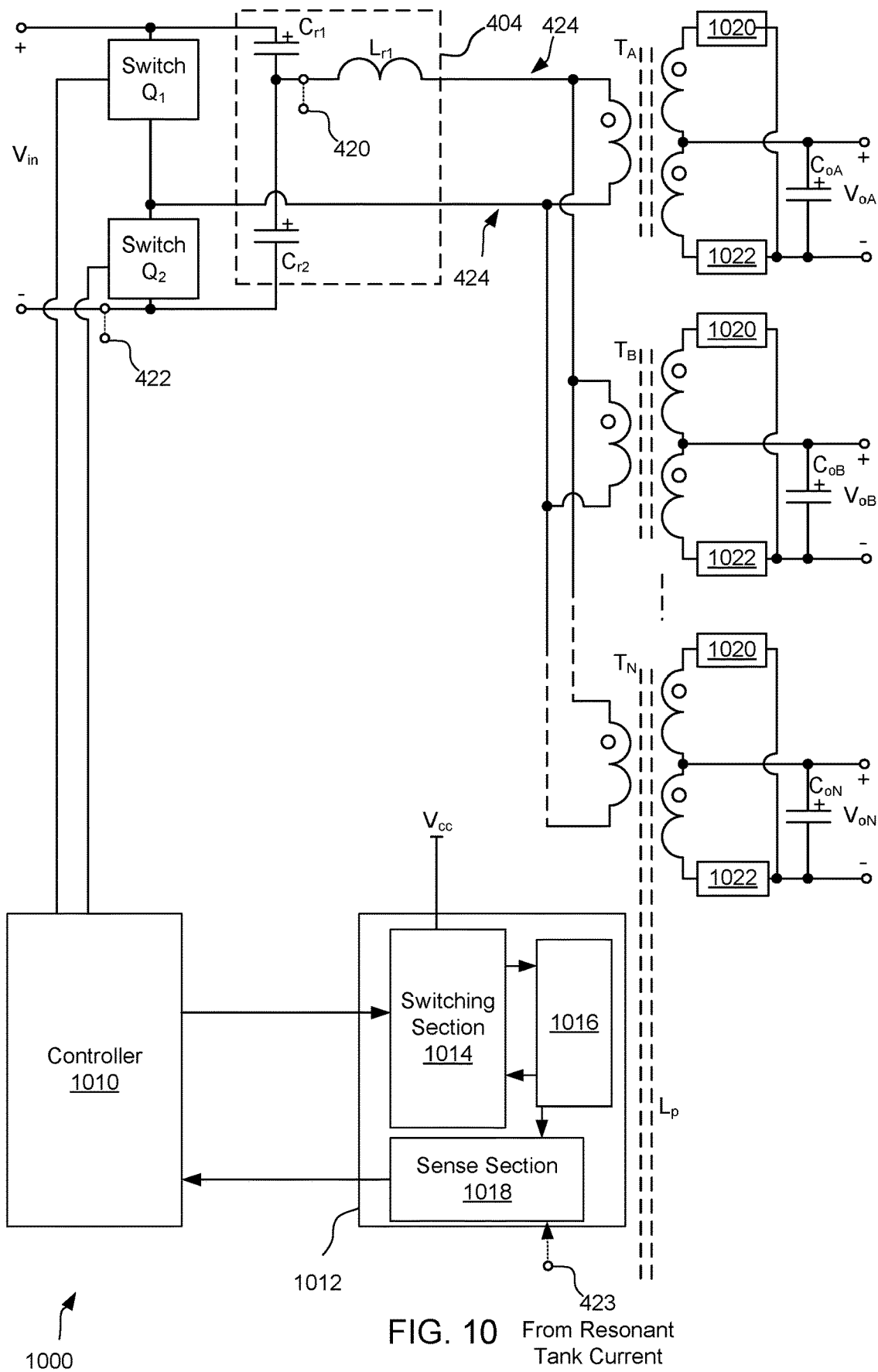
FIG. 10 illustrates a more detailed embodiment of the LLC power converter unit shown in FIG. 5.

FIG. 10 illustrates a variation of the embodiment of the LLC power converter unit shown in FIG. 5. First switching section 402 may include two switches $Q_1$, $Q_2$. LC section 404 may include two capacitors $C_{r1}$, $C_{r2}$ and an inductor $L_{r1}$. Each output module may include two rectifiers 1020, 1022 (e.g., diodes) and a capacitor $C_O$ for providing a voltage $V_O$ to a load based on a current induced in a pair of push-pull transformer secondaries. Although the standby drive section 412 in FIG. 5 coupled to the first transformer $T_A$, FIG. 10 shows that equivalent functionality can be achieved where the standby drive section 1012 is coupled to another of the transformers, such as $T_N$ in FIG. 10. Since the primaries of each transformer are coupled in parallel to the output bus 424, they all see the same voltage and current, and thus the standby drive section 1012 can be coupled to any of the N transformers.

Although the primary 405 has been removed in this embodiment, the transformer $T_N$ can perform the function of the parallel choke by magnetizing the core $L_p$.

Also, as seen in previous figures such as FIGS. 5 and 6, the standby drive section 1012 drives the output bus 424 when the controller 1010 puts the system into a standby state, and this driving is performed via the secondary winding 1016 and the transformer primary of the transformer $T_N$. The voltage on the output bus 424, or magnetization of the core $T_N$, can then drive the transformer primaries of the other transformers.

As in FIG. 4, the controller 1010 can determine when to switch from a load state to a standby state and back again, and engage either the first pair of switches $Q_1$, $Q_2$ (load state) or the second switching section 1014 (standby state). This determination can be based on a resonant tank current (load state), output module voltage, $V_{OA}$ (load state), or the regulator (not shown) reaching its power limit. Resonant tank current can be measured at node 420 or 422 and provided to the controller via input 423. Output bus 424 voltage can be measured via voltage across secondary winding 1016 and can be a proxy for voltage $V_{OA}$, $V_{OB}$, . . . , $V_{ON}$ at the output modules 411. In an example load state, the controller 1010 may look at resonant tank current via current measured at node 420 or 422 and provided to the controller 410 via input 423. When the resonant tank current falls below a threshold, the controller 1010 can turn off the first pair of switches $Q_1$, $Q_2$ and turn on the second switching section 1014. In the standby state, the controller 1010 may look at output power of a regulator (such as regulator 409 in FIG. 4) providing $V_{cc}$, to determine when to switch back to the load state. When the output power of the regulator reach's the regulator's limit, as inferred from measuring secondary winding 1016 voltage falling below a threshold, the controller 1010 can move the power converter unit 1000 back into the load state by engaging the first pair of switches $Q_1$, $Q_2$.

Optionally, output bus 424 voltage may also be used in a feedback loop through sense section 1018 and controller 1010 to control the first pair of switches $Q_1$, $Q_2$ in the load state to keep the output bus 424 voltage constant. This output bus 424 voltage monitoring can be performed via the secondary winding 1016 and can be distinct from the controller's 1010 consideration of which state to engage (load or standby).

FIG. 11 illustrates a more detailed embodiment of the LLC power converter units shown in FIGS. 5 and 10. LLC power converter unit 1100 illustrates circuit components that may be used to implement aspects of a controller 410, 1010, second switching section 414, 1014, sense section 418, 1018, and transformer secondary 416, 1016. Namely, LLC power converter unit 1100 shows diodes in place of the more general rectifiers of FIGS. 5 and 10. A controller 1150 can be seen to receive voltage $V_{cc}$ that may be a regulated voltage drawn from and downcoverted from the input voltage $V_{in}$ though this is not required. The voltage $V_{cc}$ is selectively, via switch $Q_5$, applied to the tap between a pair of push-pull transformer secondaries $N_2$ and $N_3$. Diode $D_1$ can be arranged between switch $Q_5$ and the push-pull transformer pair to prevent voltage and current from being driven back into the power supply providing the voltage $V_{cc}$. A voltage $V_{SnsPri}$ tapped from between the two push-pull transformer secondaries $N_2$ and $N_3$ can be taken across a capacitor referenced to ground. Further circuitry within the controller, such as resistor $R_2$, a capacitor $C_1$, a diode $D_2$ and other resistors can control gates of the switches $Q_3$ and $Q_4$ thereby controlling a square wave presented to the pair of push-pull transformer secondaries $N_2$ and $N_3$ when the standby state is entered.

Also, as seen in previous figures such as FIGS. 5, 6, and 10, the controller 1104 controls driving of the pair of push-pull transform secondaries $N_2$ and $N_3$, drawing power from $V_{cc}$ in the standby state, and can drive a voltage across the output bus 424 when the controller 1104 puts the LLC power converter 1100 into a standby state. The output bus 424 or the core $L_p$ between $N_1$ and $N_2/N_3$ can induce a current in the transformer secondaries and thereby drive an output power lower than is achievable via the input voltage $V_{in}$ and the first switching section $Q_1$ and $Q_2$.

As in FIG. 4, the controller 1104 can determine when to switch from a load state to a standby state and back again, and engage either the first pair of switches $Q_1$, $Q_2$ (load state) or the second pair of switches $Q_3$, $Q_4$ (standby state). This determination can be based on a resonant tank current (load state), output module voltage, $V_{OA}$ (load state), or the regulator 1150 reaching its power limit. Resonant tank current can be measured at node 420 or 422 and provided to the controller 1104 via input 423. Output voltage on the output bus 424 can be monitored via $V_{SnsPri}$, or the voltage tapped from between the two push-pull transformer secondaries $N_2$ and $N_3$. In an example load state, the controller 1104 may look at resonant tank current via current measured at node 420 or 422 and provided to the controller 1104 via input 423. When the resonant tank current falls below a threshold, the controller 1104 can turn off the first pair of switches $Q_1$ and $Q_2$ and turn on the second pair of switches $Q_3$, $Q_4$ and provide power to the pair of push-pull transformer secondaries $N_2$ and $N_3$ via $V_{cc}$, switch $Q_5$, and diode $D_1$. Power delivery to the output bus 424 in the standby state can be controlled by a switching frequency or duty cycle of the switches $Q_3$, $Q_4$.

In the standby state, the controller 1104 may look at output power of the regulator 1150 reaching the regulator's 1150 power limit to determine when to switch back to the load state. This can be inferred from measuring $V_{SnsPri}$, or the voltage tapped from between the two push-pull transformer secondaries $N_2$ and $N_3$, falling below a threshold, and as a result, the controller 1104 can move the power converter unit 1100 back into the load state by engaging the first pair of switches $Q_1$ and $Q_2$.

Optionally, output bus 424 voltage may also be used in a feedback loop through controller 1104 to control the first pair of switches $Q_1$, $Q_2$ in the load state to keep the output bus 424 voltage constant. This output bus 424 voltage monitoring can be performed via measuring $V_{SnsPri}$, or the voltage tapped from between the two push-pull transformer secondaries $N_2$ and $N_3$, and can be distinct from the controller's 1104 consideration of which state to engage (load or standby).

Although not shown, in an embodiment, switch $Q_5$ can be controlled via an additional output of the controller 1104 rather than via analogue circuitry. FIG. 29 presents an example of this digital control of the regulator providing power to the pair of push-pull transformer secondaries $N_2$, $N_3$.

The inverted triangles in FIG. 11 can all represent connections to the same return or negative level. In other words, the source of $Q_2$ and the sources of $Q_3$ and $Q_4$ can all be coupled together allowing these three four to be driven from the same circuitry without level shifting or having to create additional biases.

Figure 12:
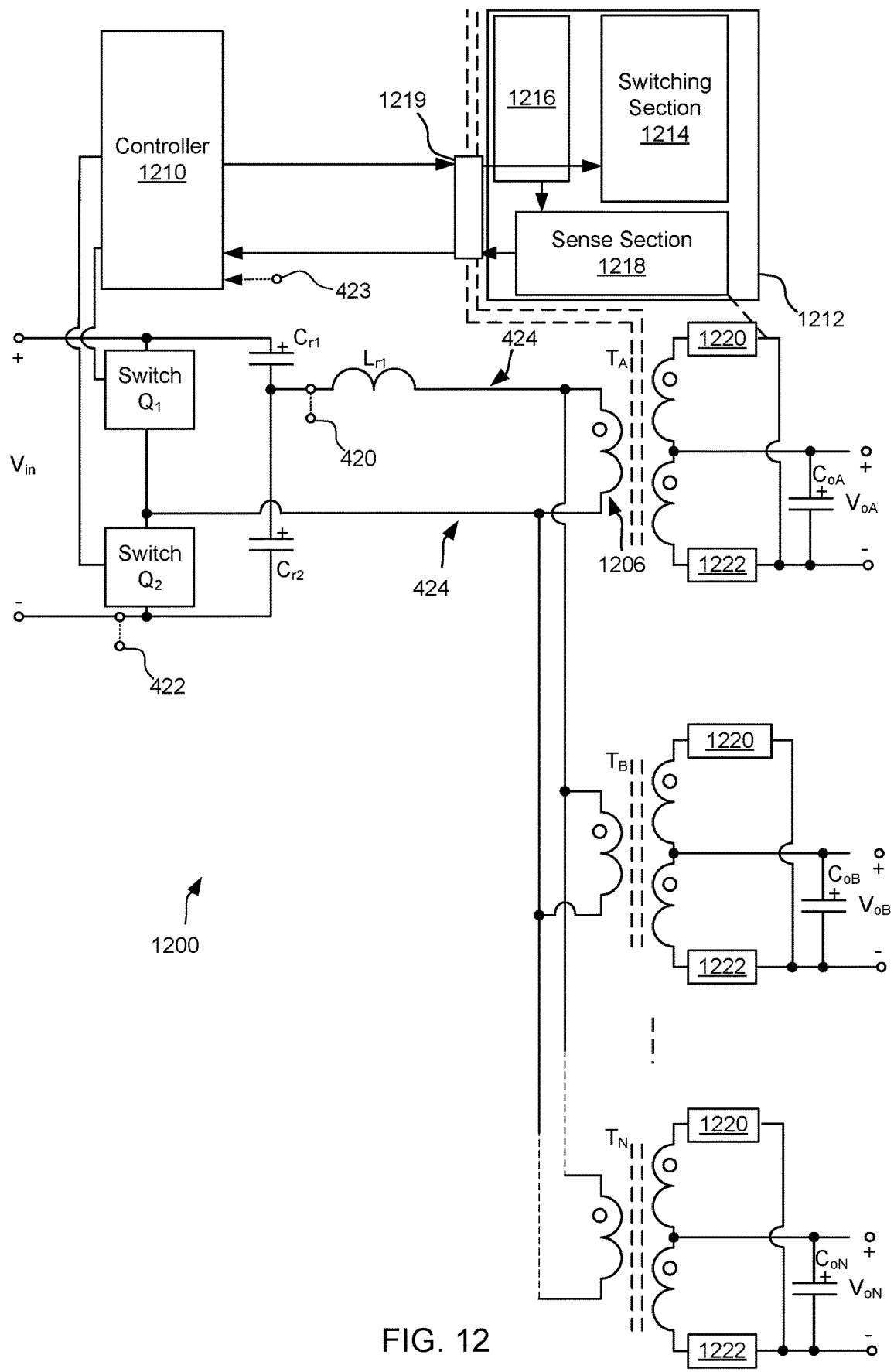
FIG. 12 illustrates a more detailed embodiment of the LLC power converter unit shown in FIG. 6.

FIG. 12 illustrates a more detailed embodiment of the LLC power converter unit shown in FIG. 6. LLC power converter unit 1200 illustrates circuit components that may be used to implement aspects of LLC power converter unit 600. For example, first switching section 402 may include two switches $Q_1$, $Q_2$. LC section 404 may include two capacitors $C_{r1}$, $C_{r2}$ and an inductor $L_{r1}$. Each output module 408 may include two rectifiers 1220, 1222 (e.g., diodes) and a capacitor $C_O$ for providing a voltage $V_O$ to a load based on a current induced in a pair of push-pull transformer secondaries. The sense section 1218 and second switching section 1214 can be arranged on a secondary side of the isolation boundary, and can communicate with a controller 1210 on the primary side via an opto-coupler 1219 or pulse transformer.

Also, and as seen in previous figures such as FIGS. 5 and 6, the standby drive section 1212 drives the output bus 424 when the controller 1210 puts the system into a standby state, and this driving is performed via the secondary winding 1216 and the primary 1206 of the first transformer $T_A$. The voltage on the output bus 424, or magnetization of the core $T_A$, can then drive the primaries 1206 of the N transformers.

Although output bus 424 voltage is measured via sense section 1218 in the standby drive section 1212, resonant tank current can be measured at node 420 or 422 and provided to controller 1210 via input 423 or to the sense section 1218 via optocoupler. Alternatively, the topologies of FIGS. 19 and 20 could be used to measure resonant tank current and provide the same to the secondary side of the isolation boundary without an optocoupler for this portion of data transfer. Alternatively, power can be measured on the secondary side and when it drops below a threshold in the load state, a logic signal can be passed via optocoupler 1219 to the controller 1210.

As in FIG. 4, the controller 1210 can determine when to switch from a load state to a standby state and back again, and engage either the first pair of switches $Q_1$, $Q_2$ (load state) or the second switching section 1214 (standby state). This determination can be based on a resonant tank current (load state), output module voltage, $V_{OA}$ (load state), or the regulator (not shown) reaching its power limit. Output module voltage, $V_{OA}$, can be measured by the sense section 1218 on the secondary side. Resonant tank current can be measured at node 420 or 422 and provided to the controller 1210 via input 423. Output bus 424 voltage can be measured via voltage across secondary winding 1216. For instance, in the load state, the controller 1210 may look at output module voltage, $V_{OA}$, and provided to the controller 1210 via optocoupler 1219. When this voltage, $V_{OA}$, rises above a light- or no-load threshold, the controller 1210 can turn off the first pair of switches $Q_1$, $Q_2$ and turn on the second switching section 1214. In this standby state, the controller 1210 may look at output power of the regulator (not shown) to determine when to switch back to the load state. When the output power of the regulator rises above a threshold, as inferred from measuring secondary winding 1216 voltage falling below a threshold, the controller 1210 can move the power converter unit 1200 back into the load state by engaging first pair of switches $Q_1$, $Q_2$.

Optionally, output bus 424 voltage may also be used in a feedback loop through sense section 1218, optocoupler 1219, and controller 1210 to control the first pair of switches $Q_1$, $Q_2$ in the load state to keep the output bus 424 voltage constant. This output bus 424 voltage monitoring can be performed via the secondary winding 1216 and can be distinct from the controller's 1210 consideration of which state to engage (load or standby).

While the controller 1210 is illustrated on the primary side of the isolation boundary, it could also be arranged on the secondary side and control the first switching section $Q_1$ and $Q_2$ via an opto-coupler or pulse transformer. For a controller located at the secondary side, sensing of $V_{OA}$ dropping below a threshold, indicating a regulator entering power limit, could be used to trigger exit from standby mode. In this case, the controller demanding frequency above a threshold or the output current dropping below a threshold could trigger entry to standby mode. FIG. 13 illustrates a variation where the controller is optionally arranged on the secondary side. In that case, a regulator would bias $V_{cc}$ from $V_{in}$ through a transformer such as the flyback converter of FIG. 28 to startup the series resonant LLC converter yet maintain primary secondary isolation.

FIG. 13 illustrates a more detailed embodiment of the sensing and standby drive circuitry shown in FIGS. 6 and 12. Series resonant LLC power converter unit 1300 illustrates circuit components that may be used to implement aspects of a controller 410, 1210, second switching section 414, 1214, sense section 418, 1218, and transformer secondary 416, 1216. In this embodiment, the controller circuitry is arranged on the secondary side of the isolation boundary and the second switching section can communicate with the controller 1304b without using an opto-coupler, pulse transformer, or similar devices, or via an opto-coupler, pulse transformer, or similar devices, if the controller 1304a is implemented on the primary side. Since the sensing is arranged on the secondary side of the isolation boundary, the voltage measured can be referred to as $V_{SnsSec}$.

As in FIG. 4, the controller 1304 can determine when to switch from a load state to a standby state and back again, and engage either the first pair of switches $Q_1$, $Q_2$ (load state) or the second pair of switches $Q_3$, $Q_4$ (standby state). This determination can be based on a resonant tank current (load state), output module voltage, $V_{OA}$ (load state), the controller demanding frequency above a threshold (load state) or the regulator (not shown) reaching its power limit. Output module voltage, $V_{OA}$, can be measured by controller 1304b on the secondary side. Resonant tank current can be measured at node 420 or 422 and provided to the controller 1304 via input 423. Output voltage on the output bus 424 can be monitored via $V_{SnsSec}$, or the voltage tapped from between the two push-pull transformer secondaries $N_2$ and $N_3$. In an example load state, the controller 1304 may look at resonant tank current via current measured at node 420 or 422 and provided to the controller 1304 via input 423. the controller 1210 may look at output module voltage, $V_{OA}$, and provided to the controller 1210 via optocoupler 1219 and input 423. When this voltage, $V_{OA}$, rises above a light- or no-load threshold, the controller 1304 can turn off the first pair of switches $Q_1$, $Q_2$ and turn on the second pair of switches $Q_3$, $Q_4$. In the standby state, the controller 1304 may look at output power of the regulator 1350 to determine when to switch back to the load state. When the output power of the regulator 1350 reaches the regulator's 1350 limit, as inferred from measuring $V_{SnsSec}$ tapped from between the push-pull secondary windings $N_2$ and $N_3$ falling below a threshold, the controller 1304 can move the power converter unit 1300 back into the load state by engaging first pair of switches $Q_1$, $Q_2$.

Optionally, output bus 424 voltage may also be used in a feedback loop through 1304 to control the first pair of switches $Q_1$, $Q_2$ in the load state to keep the output bus 424 voltage constant. This output bus 424 voltage monitoring can be performed via the secondary winding $N_3$ and can be distinct from the controller's 1304 consideration of which state to engage (load or standby).

Although not shown, in an embodiment, switch $Q_5$ can be controlled via an additional output of the controller 1304 rather than via analogue circuitry. FIG. 29 presents an example of this digital control of the regulator providing power to the pair of push-pull transformer secondaries $N_2$, $N_3$.

If the controller 1304b is implemented on the secondary side it could receive indication of the resonant tank current via optocouplers or other means (e.g., current sense transformers such as those shown in FIGS. 19 and 20) to traverse the isolation boundary. In this arrangement, the controller 1304b could monitor the output voltage of one of the output modules (e.g., $V_{OA}$, $V_{OB}$, . . . $V_{ON}$) and switch into the standby state if this voltage rises above a threshold. Similarly, the controller 1304b demanding a switching frequency of the first switching section $Q_1$, $Q_2$, above a threshold frequency or the resonant tank current dropping below a threshold could trigger the controller 1304b to move the system into the standby state. In the standby state, the controller 1304b can monitor the regulator 1350 output as inferred from $V_{SnsSec}$ and when this drops, indicating that the regulator 1350 has reached its power limit, the controller 1304b can turn the switches $Q_1$, $Q_2$ back on. For a controller 1304a implemented on the primary side, it could receive indication of the resonant tank current or output module voltage, $V_{OA}$, via input 423 and monitor output voltage via output bus 424 as measured at $V_{SnsSec}$.

The sources of the switches $Q_3$ and $Q_4$ can optionally be coupled to a low voltage output leg of one of the output modules (e.g., the first output module in the illustration). Said another way, the sources of $Q_3$ and $Q_4$ can optionally be tied to the anodes of the diodes $D_{1A}$ and $D_{2A}$ of the first output module. This may be advantageous where the diodes $D_{1A}$ and $D_{2A}$ are replaced by FETs and the common source connection allows all three switches to be driven from the same control circuit without level shifting.

What can be called the push-pull secondary rectifier configurations, FIGS. 14-17 provide some examples of the different topologies that can be used for the output rectifiers of the output modules noted throughout this disclosure.

FIGS. 14A and 14B illustrate embodiments of an output module that may be used in an LLC power converter unit, such as the LLC power converter units shown in FIGS. 4-13. For example, the output module 1400 may include a pair of push-pull transformer secondaries with a tapped leg between the pair of secondaries. Ends of the pair of secondaries can pass through rectifiers such as diodes oriented with cathodes toward the secondaries (i.e., facing left in FIG. 14A) or oriented with cathodes toward the load (i.e., facing right in FIG. 14B). The anodes of the rectifiers can be coupled to form a negative or low voltage leg of the output $V_o$ while the tapped leg can form the positive or high voltage leg of the output $V_o$ in FIG. 14A, and the opposite in FIG. 14B. A capacitor $C_O$ can be coupled across the legs of the output $V_o$ in both variations. These embodiments can be attractive for low output voltages because if the rectifiers are implemented as MOSFET's to reduce conduction losses (termed synchronous rectification) as shown in FIG. 16, then a secondary side controller can have a return or negative potential tied to the negative output of the output module and the sources of the MOSFET's, thus making it easier to drive the MOSFET's (i.e., no level shifting or having to create additional biases). In the case of FIG. 17 where the sources are at different potentials, driving the MOSFET's is slightly more challenging.

Figure 15A:
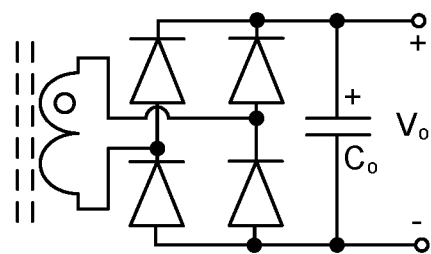
FIG. 15A illustrates an embodiment of an output module implemented as a full-bridge.

FIG. 15A illustrates an embodiment of an output module that may be used in an LLC power converter unit, such as the LLC power converter units shown in FIGS. 4-13. For example, the output module 1500 may include a transformer secondary coupled to a full-bridge rectifier. The rectified output $V_o$ can be coupled across a capacitor $C_O$.

Figure 15B:
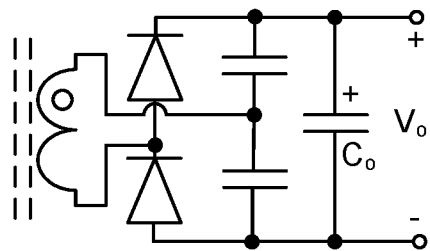
FIG. 15B illustrates an embodiment of an output module implemented as a half-bridge.

Alternatively, FIG. 15B illustrates a half-bridge variation on FIG. 15A. In this variation, two of the diodes in the full-bridge rectifier of FIG. 15A have been replaced by capacitors.

FIG. 16 illustrates an embodiment of an output module that may be used in an LLC power converter unit, such as the LLC power converter units shown in FIGS. 4-13. In this illustration, the rectifiers of FIG. 14 are replaced by a transistor (e.g., MOSFET switch) with its inherent body diode, where the drains are coupled to outer terminals of the pair of push-pull transformer secondaries. The tapped leg can form the positive or high voltage leg of the output $V_o$. A capacitor $C_O$ can be coupled across the legs of the output $V_o$.

FIG. 17 illustrates an embodiment of an output module that may be used in an LLC power converter unit, such as the LLC power converter units shown in FIGS. 4-13. In this illustration, the rectifiers of FIG. 15 are replaced by a parallel combination of a transistor (e.g., MOSFET switch) and a diode, where the anodes of the diodes are coupled to the sources of the transistors, and where the sources are coupled to outer terminals of the pair of push-pull transformer secondaries. The drains can be coupled to the cathodes of the corresponding parallel diodes and these can be coupled to form the high voltage leg of the output $V_o$. The tapped leg can form the negative or low voltage leg of the output $V_o$. A capacitor $C_O$ can be coupled across the legs of the output $V_o$.

While this disclosure has largely discussed a sense section deriving a signal from a transformer coupled to one of the primaries on the output bus, in other embodiments, a second sensing circuit or an alternative sensing circuit can be implemented. For instance, FIGS. 18-20 show examples of sense circuits that can monitor current in the resonant tank, and more specifically, in the LC section at node 420. As further examples, FIGS. 21-22 show examples of sense circuits that can monitor current in the first switching section at node 422. However, it should be appreciated that other sensing topologies may also be used. In some cases it may be desirable to use one of these sensing circuits in place of the sense section 418 (FIGS. 4-8), 1018 (FIG. 10), or 1218 (FIG. 12), while in others it may be desirable to use one of these sensing circuits as well as the sense section 418 (FIGS. 4-8), 1018 (FIG. 10), or 1218 (FIG. 12). For instance, some topologies benefit from using one or the other of these sensing circuits depending on the state. For instance, in the standby state it may be beneficial to monitor for a change back to a load state via one of the sensing circuits shown in FIGS. 18-22, while it is beneficial to monitor for a change from a load state to a standby state via the sensing sections 418 (FIGS. 4-8), 1018 (FIG. 10), or 1218 (FIG. 12). In other embodiments, it may be beneficial to monitor all state changes using just one of the sensing section 418 (FIGS. 4-8), 1018 (FIG. 10), or 1218 (FIG. 12) or the sensing circuits shown in FIGS. 18-22.

FIG. 18 illustrates a resonant tank current sensor 1802, in the form of a capacitive divider, that may be used in a sense section of an LLC power converter unit with a controller on a primary side of an isolation boundary, such as the LLC power converter units shown in FIGS. 4, 5, and 7-12. The resonant tank current sensor 1802 can be used in place of a sensing section such as sensing section 418 or can be used alongside a sensing section as previously described, for instance, to provide a resonant tank current to the sensing section. In some topologies there are advantages to using the resonant tank current sensor 1802 to monitor for light- or no-load conditions, and measuring a voltage across a secondary winding in the sense section, such as voltage, $V_{SnsPri}$, to determine when to return to load conditions. In other situations, it is advantageous to just have a sensing section or just the resonant tank current sensor 1802 monitor for both conditions.

The resonant tank current sensor 1802 may be a capacitive divider sensor and may be coupled with output node 420 of an LC section to sense a voltage or current at output node 420. Resonant tank current sensor 1802 may be used to monitor a load power through the LC section and sense a current via capacitive division, where the current through capacitor $C_s$ is proportional to the current through $C_{r1}$. In some embodiments, the sensed voltage might be offset (i.e., $V_{offset} \neq 0V$) via bias applied across a resistor $R_S$. In some embodiments, a sense processing component 1804 might filter the sensed voltage or current signal and/or rectify and clamp the signal. A series capacitor $C_S$ can be arranged between the sense processing component 1804 and the output node 420, with a first sensing node $V_{ISns1}$ taken from between the series capacitor $C_S$ and the sense processing component 1804. Assuming $R_S C_S < 1/(2\pi f_{SW})$ where $f_{SW}$ is the switching frequency, the current through $C_S$ is $C_S/(C_{r1} + C_{r2})$ allowing low power dissipation, ground referenced current sense across $R_S$ if $C_S \ll C_{r1} + C_{r2}$. A second sensing node $V_{ISns2}$ can be taken from beyond the sense processing component 1804, which would typically diode clamp and peak rectify the input signal. Where $V_{ISns2}$ is used, $V_{ISns1}$ may not be used. Resonant tank current sensor 1802 may provide feedback to a controller (e.g., controller 410) to enable the controller to detect a no- or light-load condition and enter a standby state. Resonant tank current can also be monitored via transformers as shown in FIGS. 19 and 20.

FIG. 19 illustrates a resonant tank current sensor 1902 that may be used in a sense section of an LLC power converter unit with a controller on a primary or secondary side of an isolation boundary, such as the LLC power converter units shown in FIGS. 4-13. Resonant tank current sensor 1902 can be used in place of a sensing section such as sensing section 418 or can be used alongside a sensing section as previously described. In some topologies there are advantages to using the resonant tank current sensor 1902 monitor for light- or no-load conditions, and using a sensing section, such as 418, to monitor for a return to load conditions. In other situations, it is advantageous to just have a sensing section or just the resonant tank current sensor 1902 monitor for both conditions.

The resonant tank current sensor 1902 may be coupled to an LC section via a rectified transformer $T_{CS}$ (e.g., a transformer coupled with diodes or rectifiers) to sense a voltage across capacitors $C_{R1}$ and $C_{R2}$ or a current through capacitors $C_{R1}$ and $C_{R2}$ and the inductor $L_{r1}$. The current through inductor $L_{r1}$ is proportional to the voltage across the capacitors $C_{R1}$ and $C_{R2}$. In other words, the primary side of rectified transformer $T_{CS}$ can couple to a location referred to as node 420 in FIGS. 4-13. Resonant tank current sensor 1902 may be used to monitor a load power through the LC section and sense a voltage at node 1904 between the capacitors a current through rectified transformer $T_{CS}$ via a voltage measurement across $R_s$, which is indicative of the current through capacitors $C_{R1}$ and $C_{R2}$ and the inductor $L_{r1}$. In addition, In some embodiments, the sensed voltage might be offset ($V_{Offset} \neq 0V$). In some embodiments, a sense processing component 1904 might filter the sensed voltage signal and/or rectify and clamp the signal. Resonant tank current sensor 1902 may provide current feedback to a controller (e.g., controller 410) to enable the controller to detect a light- or no-load condition and enter a standby state.

The rectified transformer $T_{CS}$ can include four diodes or other rectifiers coupled to the secondary. More specifically, two of the diodes or rectifiers can be coupled directly to the secondary, but with opposite polarities such that current in the secondary only travels in one direction and hence half of every cycle through the primary is cut off or rectified in the secondary. These same diodes or rectifiers may also be arranged on either side of a resistor $R_S$ thereby forming a current loop including the secondary, a first of the two diodes or capacitors, the resistor $R_S$, and a second of the two diodes or rectifiers. The other two diodes or rectifiers can be arranged in parallel to the first two but coupled to opposing sides of the secondary than the first two diodes or rectifiers. The offset voltage $V_{Offset}$ can be applied between the resistor $R_S$ and two of the diodes or rectifiers.

FIG. 20 illustrates a resonant tank current sensor 2002 that may be used in a sense section of an LLC power converter unit with a controller on a primary or secondary side of an isolation boundary, such as the LLC power converter units shown in FIGS. 4-13. Resonant tank current sensor 2002 can be used in place of a sensing section such as sensing section 418 or can be used alongside a sensing section as previously described. In some topologies there are advantages to using the resonant tank current sensor 2002 monitor for light- or no-load conditions, and measuring a voltage across a secondary winding in the sense section, such as voltage, $V_{SnsPri}$, to determine when to return to load conditions to monitor for a return to load conditions. In other situations, it is advantageous to just have a sensing section or just the resonant tank current sensor 2002 monitor for both conditions.

Resonant tank current sensor 2002 may be coupled to an LC section via a an unrectified transformer (e.g., a transformer that is not coupled with diodes or rectifiers) to sense a voltage or current between the capacitors $C_{R1}$ and $C_{R2}$ and the inductor $L_{r1}$. In other words, the primary side of unrectified transformer $T_{CS}$ can couple to a location referred to as node 420 in FIGS. 4-13. Resonant tank current sensor 2002 may be used to monitor a load power through the LC section and sense a current through the transformer $T_{CS}$ via a voltage measurement across $R_s$. In some embodiments, the sensed voltage might be offset ($V_{Offset} \neq 0V$). In some embodiments, a sense processing component 2004 might filter the sensed current and/or rectify and clamp the signal. Resonant tank current sensor 2002 may provide feedback to a controller (e.g., controller 410) to enable the controller to detect a light- or no-load condition and enter a standby state.

The secondary of the transformer $T_{CS}$ can be arranged in parallel with a resistor $R_S$ with the offset voltage $V_{Offset}$ being applied to one side of the resistor $R_S$. The secondary and the resistor $R_S$ can form a current loop.

Although the primary side of the transformer, $T_{CS}$, is shown between the capacitors, $C_{R1}$, $C_{R2}$, and the inductor $L_{r1}$, in FIGS. 19 and 20, in other embodiments this primary can be arranged anywhere where resonant tank current can be sensed. For instance, $T_{CS}$, can be arranged on the leads between $C_{R1}$, $C_{R2}$, or to the right of $L_{r1}$, or on the lower leg of the output bus 424 (e.g., coupled to the output from between the first switching section or from between the two switches $Q_1$ and $Q_2$).

FIG. 21 illustrates a voltage sensor 2102 that may be used in a sense section of an LLC power converter unit with a controller on a primary side of an isolation boundary, such as the LLC power converter units shown in FIGS. 4, 5, and 7-12. The sensor 2102 can be used in place of a sensing section such as sensing section 418 or can be used alongside a sensing section as previously described. In some topologies there are advantages to using the sensor 2102 to monitor for light- or no-load conditions and using a sense section to monitor for a return to the load state. In other situations, it is advantageous to just have a sensing section or just the sensor 2102 monitor for both conditions.

The sensor 2102 can include a sense processing component 2106 coupled a resistor $R_S$ to measure a voltage $V_{ISns}$, which is dependent on current and thus power and therefore useful to determine a light- or no-load state. Notably, $V_{ISns}$ is proportional to peak resonant tank current, $I_{PK}$, where the peak primary power is $0.5(Lr1)(I_{PK}^2)(f_{SW})$. Multiplication by efficiency, typically around 0.95, gives the output power. The resistor $R_S$ can be arranged between the switch $Q_2$ and node 422. Sensor 2102 may provide feedback to a primary-side controller (e.g., controller 410) to enable the controller to detect a light- or no-load condition and enter a standby state.

FIG. 22 illustrates a voltage sensor 2202 that may be used in a sense section of an LLC power converter unit with a controller on a primary side of an isolation boundary, such as the LLC power converter units shown in FIGS. 4, 5, and 7-12. The sensor 2202 can be used in place of a sensing section such as sensing section 418 or can be used alongside a sensing section as previously described. In some topologies there are advantages to using the sensor 2202 to monitor for light- or no-load conditions and using a sense section to monitor for a return to the load state. In other situations, it is advantageous to just have a sensing section or just the sensor 2202 monitor for both conditions.

The sensor 2202 can include a sense processing component 2206 coupled across a resistor $R_S$ on the negative input line to measure a voltage $V_{ISns}$, which is dependent on current and thus power and therefore useful to determine a light- or no-load state. Notably, $V_{ISns}$ is proportional to peak resonant tank current, $I_{PK}$, where the peak primary power is $0.5(Lr1)(I_{PK}^2)(f_{SW})$. Multiplication by efficiency, typically around 0.95, gives the output power. The resistor $R_S$ can be arranged between the negative side of the voltage input $V_{in}$ and the node 422. Sensor 2202 may provide feedback to a primary-side controller (e.g., controller 410) to enable the controller to detect a light- or no-load condition and enter a standby state.

Figure 23:
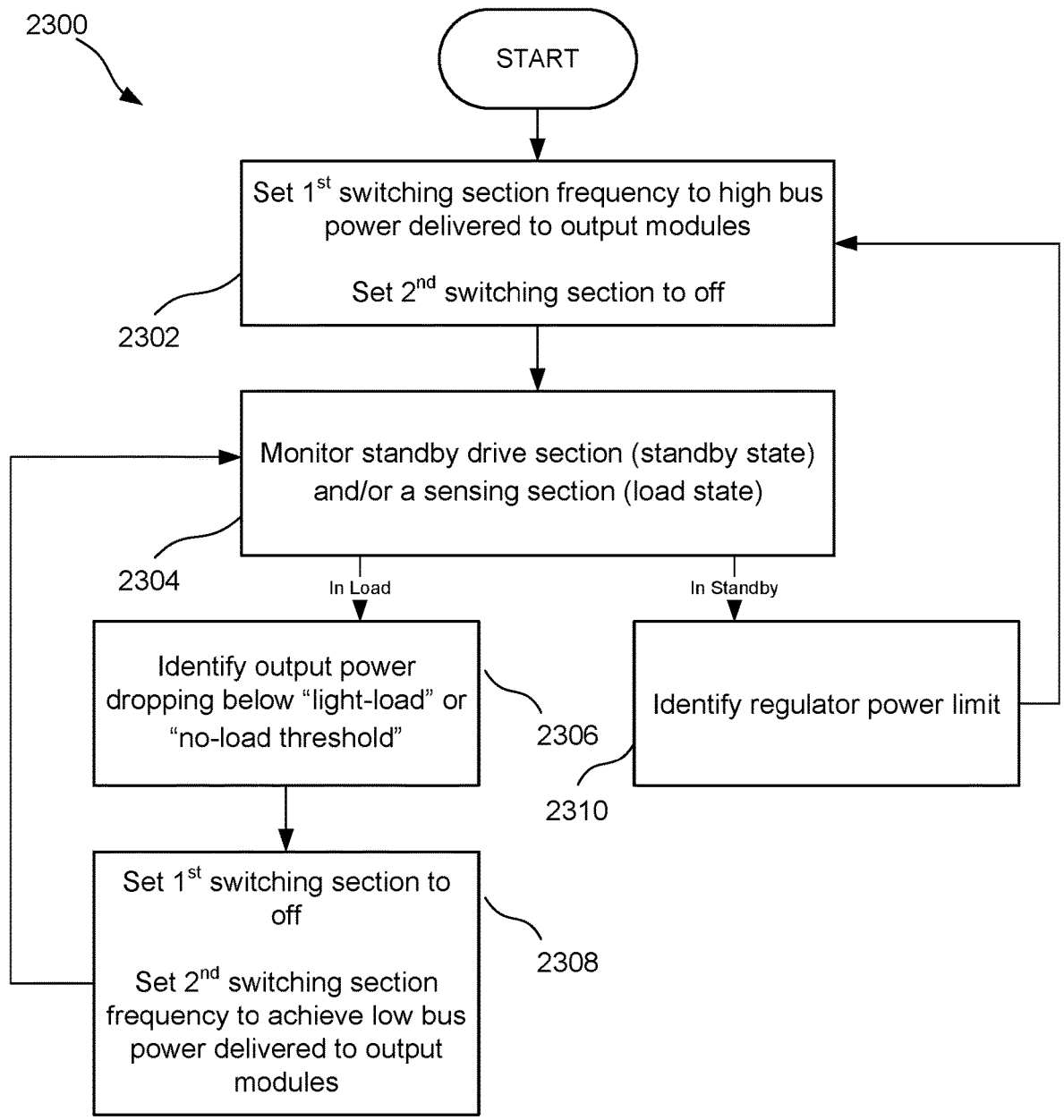
FIG. 23 illustrates a method that may be used to reduce an output voltage during no- or light-load operation.

FIG. 23 illustrates a method 2300 that may be used to reduce an output voltage during no- or light-load operation. Method 2300 may be performed by an LLC power converter unit, such as the LLC power converter units described in FIGS. 4-13. DC power may be provided via a voltage input (e.g., $V_{in}$ in FIGS. 4-13) to a first switching section that converts the DC power to a square wave that is filtered by an LLC section to form a sinusoidal AC wave on an output bus (e.g., 424). The output bus can be coupled via transformer to one or more output modules whose outputs can be coupled in any number of different series and/or parallel configurations to achieve a variety of custom outputs.

In a normal mode of operation, at 2302, the LLC power converter unit may set the switching frequency of switches in the first switching section (e.g., switches Q1, Q2) to deliver a high bus power on the output bus delivered to the one or more output modules. The LLC power converter unit may also set (or maintain) switches in a second switching section (e.g., switches Q3, Q4) to an off condition. In other words, the output bus 424 in FIGS. 4-13 can be powered by the input voltage $V_{in}$ as converted to a square wave via the first switching section (e.g., 402) and filtered or smoothed by the LC section 404.

At 2304, the LLC power converter unit may monitor an output power via a standby drive section (e.g., 412) in the standby state and/or a sensing section (e.g., at node 420 or 422) in the load state. These can reside on either or both of the primary side or the secondary side. In the load state, the LLC power converter unit may look for power to drop below a light-load or no-load threshold as indicated by voltage measurements at 420, 422 of the resonant tank circuit that indicate a sensed current. This current can be sensed on the primary or secondary side. Alternatively, output voltage, $V_{OA}$, rising above a threshold from one of the output modules, can also indicate a need to trigger the standby state. In the standby state, the LLC power converter unit may look for the regulator to reach its power limit, which is indicated by a drop in $V_{cc}$ as sensed by $V_{SnsPri}$ where a primary-side sense section is used, and $V_{SnsSec}$ where a secondary-side sense section is used. In the load state, $V_{SnsPri}$ can be used to represent the output voltage, $V_{OA}$, when in load mode, and thereby provide feedback to the controller for setting the switching frequency of the first switching section and thereby maintain a constant output bus voltage.

At 2306, the LLC power converter unit may identify that the resonant tank current has dropped below a "light-load threshold" or a "no-load threshold," indicating a no- or light-load condition (or that output voltage, $V_{OA}$, has dropped below a threshold). This identification can be performed via a sense section (e.g., 418) coupled to the resonant tank circuit (e.g., 18-20), via a sense section coupled to the first switching section (e.g., FIGS. 21-22), or via sensors on the output modules. In any of these cases, power, or a current that is dependent on power, can be measured and compared to a threshold to determine when light- or no-load conditions exist. For instance, primary resonant tank current as measured via a voltage at node 420 or 422 can be compared to a threshold to determine when to enter the standby state. When in the load state, the method 2300 can look for crossing of a light-load or no-load threshold. When in the standby state, the method 2300 can look for crossing of a load threshold (e.g., regulator power falling below a load threshold).

At 2308, in response to identifying that the output power has dropped below the "light-load threshold" or "no-load threshold," the LLC power converter unit may set switches in the first switching section to an off condition (i.e., stop switching the first switching section) and set the switching frequency of switches in the second switching section to achieve a low bus power delivered to the one or more output modules (i.e., begin switching the second switching section). This may also involve a start of power delivery to the second switching section (block 2308). For instance, in FIGS. 11 and 13 Q5 can be turned on when the second switching section ($Q_3$ and $Q_4$) begins switching to provide $V_{cc}$ to the second switching section ($Q_3$ and $Q_4$). However, in some embodiments, $V_{cc}$ may be provided to the second switching section for longer periods of time or all the time, but is only passed to the pair of push-pull transformer secondaries when the second switching section is turned on. Alternatively, the second switching section may be turned on for longer periods of time or all the time, but may only pass $V_{cc}$ in the form of a square wave when a light- or no-load condition is identified and $Q_5$ is turned on. However, this timing is implemented, the LLC power converter unit continues monitoring the output power as described with reference to 2304, and this monitoring can take place continually during the method 2300.

In the standby state, the method 2300 can monitor a regulator providing power to the standby drive section and determine when this regulator has reached its power limit (block 2304). This "load threshold" may be monitored via a falling $V_{SnsPri}$ where the standby drive section is on a primary side or a falling $V_{SnsSec}$ where the standby drive section is on a secondary side. When either of these measurements falls below the load threshold (Block 2310), the LLC power converter unit may switch back to a load mode by resuming operation of the first switching section and turning the second switching section off, as described with reference to 2302.

Figure 24:
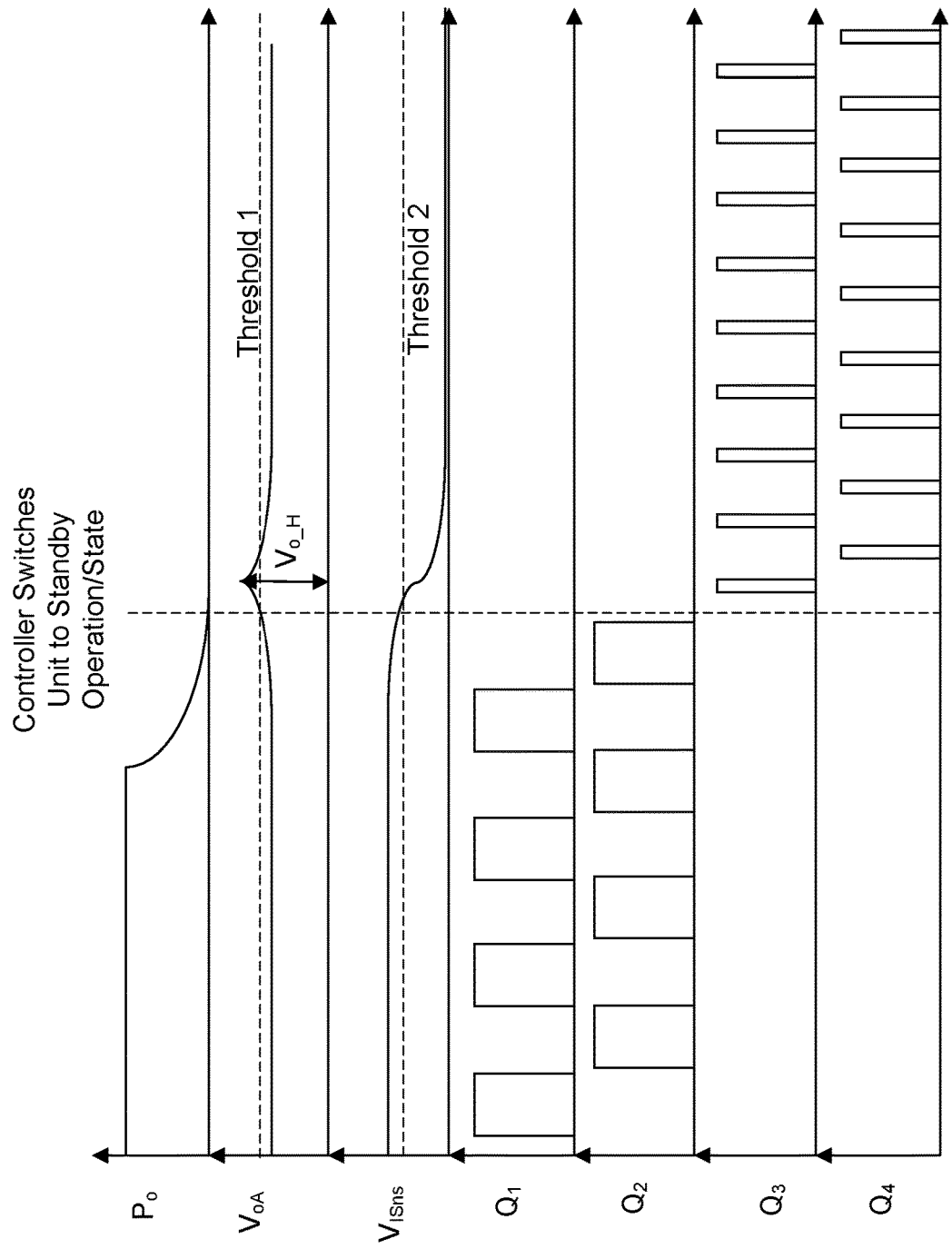
FIG. 24 illustrates voltage signals of a series resonant LLC power converter unit.

FIG. 24 illustrates a timing chart showing the transition to a standby state. The chart includes power, output voltage, $V_{oA}$, at one of the output modules, current sensing voltage, $V_{ISns}$, and switching states for $Q_1$, $Q_2$, $Q_3$, and $Q_4$ for an LLC power converter unit such as those described in FIGS. 4-13, 25, and 29. Power, $P_O$, may represent a power at an output of the LLC power converter unit, for instance, a sum of powers from the output modules (e.g., see Equation 1). $V_{oA}$ may represent an output voltage of the first output module (though this voltage will be similar to the voltages from each of the output modules). $V_{ISns}$ may represent a voltage sensed by a sense section (e.g., 1802, 1902, 2002, 2102, 2202) or a driver and sense assembly (e.g., 802) and indicative of current in the resonant tank. $Q_1$ and $Q_2$ may represent switch states of switches in the first switching section (e.g., 402) or voltage inputs to switches in the first switching section (e.g., gate drive signals). $Q_3$ and $Q_4$ may represent switch states of switches in the second switching section (e.g., 414) or voltage inputs to switches in the second switching section (e.g., gate drive signals). Similar characteristics can apply to full-bridge implementations.

When a light- or no-load condition begins, the power out $P_O$ quickly falls and the voltage on the output modules, such as $V_{oA}$ gradually rises. In one embodiment, a light- or no-load threshold 1 for output power, $V_{oA}$, from one of the output modules can be monitored relative to this voltage and if surpassed, the controller can put the system into a standby state and begin powering the output bus via a standby drive section. Alternatively, a current sense voltage, $V_{ISns}$, such as the voltage measured in FIGS. 18-22 can be monitored and the standby state triggered when this voltage falls below a light- or no-load threshold 2. This voltage $V_{ISns}$ is proportional to power. The vertical dashed line indicates a time at which $V_{oA}$ rises above threshold 2 or $V_{ISns}$ falls below threshold 2 in this example. At this time the controller can turn off the first switching section (i.e., $Q_1$ and $Q_2$ stop switching) and turn on the second switching section (i.e., $Q_3$ and $Q_4$ start switching and power is supplied to $Q_3$ and $Q_4$).

The on time of the switches in the second switching section can be selected so that power is provided to the parallel choke $L_P$ (or gapped transformer where the bias windings are added to a transformer) so that sufficient energy is stored that the maximum power drawn by the load can be provided in the standby state. Energy that is stored but not consumed by the load can optionally be circulated back to the input voltage $V_{in}$ through body diodes of the half-bridge FET's $Q_1$ and $Q_2$ (e.g., FIGS. 7-13).

After the second switching section (e.g., $Q_3$ and $Q_4$) is turned off, there is a resonant transfer of energy from the parallel choke/gapped transformer and the capacitance in parallel with it. This capacitance can include the parallel choke winding capacitance, the output rectifier capacitance (reflected through the transformer) and the capacitance of the half-bridge FET's $Q_1$ and $Q_2$ through the series choke $L_{r1}$. The resultant ringing voltage across the push-pull windings in the standby drive section has very low damping because of the highly non-linear capacitance of the FET's.

Turn on switching losses in the two switching sections can be minimized through zero voltage switching or at least by switching these pairs only when voltage across a pair is low (i.e., lower than a zero-voltage switching threshold).

Figure 25:
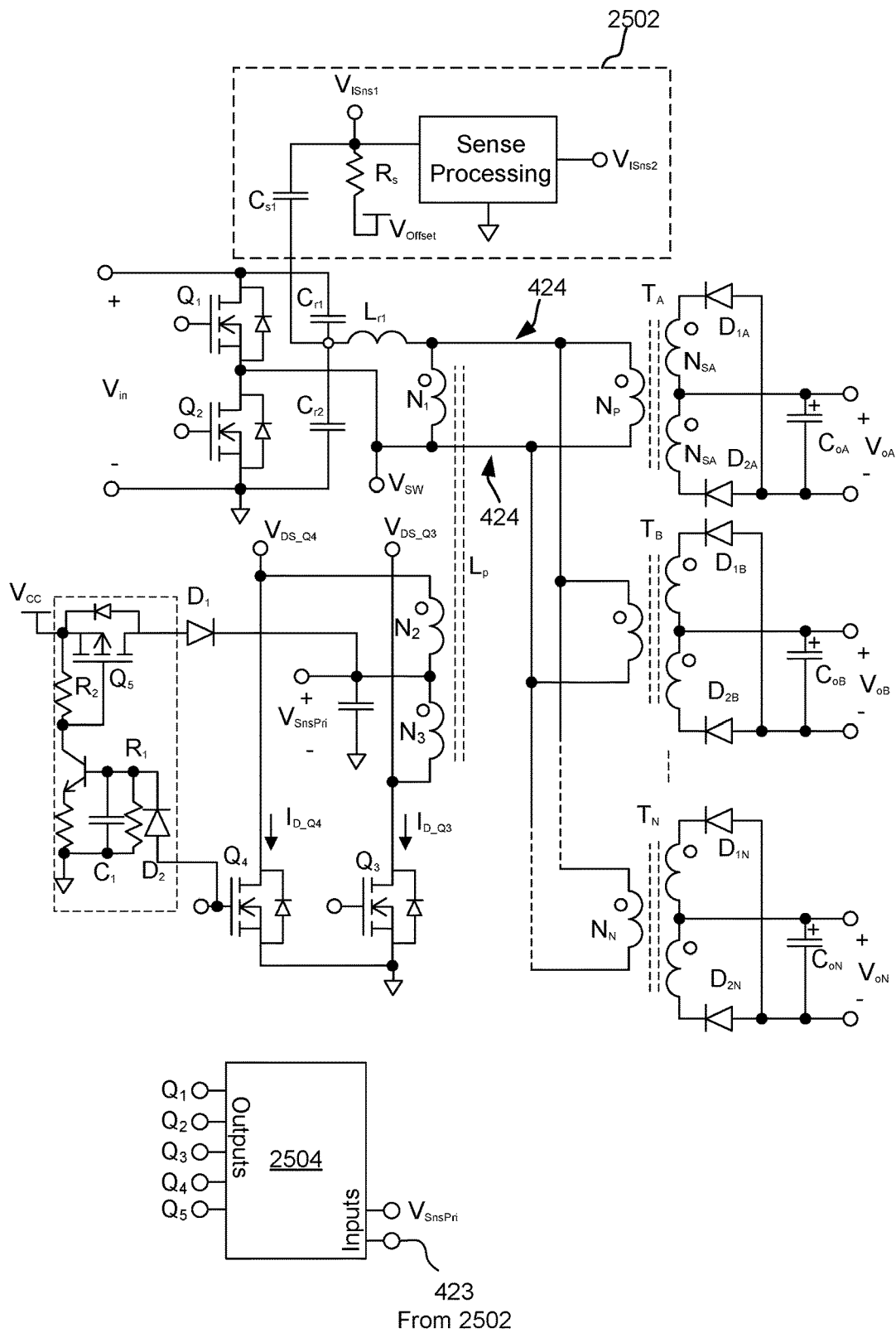
FIG. 25 illustrates an embodiment of a series resonant LLC power converter unit utilizing multiple sensing means to determine when to switch between a load and a standby state.

As mentioned earlier, in some embodiments it may be advantageous to use two different sensing means. For instance, where the controller is on the primary side it may be preferable to infer power in the load state by sensing resonant tank current by one of the methods of FIGS. 18-22, and to infer power in the standby state by sensing the output of the regulator 409 (e.g., the regulator in FIG. 29), represented by $V_{SnsPri}$ of FIG. 9 where $V_{cc}$ is the output of 409. If the power limit of 409 is set to the threshold for standby power, then detecting the regulator 409 output dropping below a threshold indicating the power limit has been exceeded would be a convenient trigger for leaving standby mode. FIG. 25 illustrates an example of an LLC power converter unit that uses two different sensing means. Like previous embodiments, the LLC power converter unit 2500 includes a first switching section comprising two switches $Q_1$ and $Q_2$ that transform a DC voltage input $V_{in}$ to a square wave that is then filtered in an LLC resonant tank comprising $C_{r1}$, $L_{r1}$, and the combination of $N_1$, $N_p$, $N_N$, and all other primaries in parallel with $N_1$ on the output bus 424. The primaries, other than $N_1$, can transfer power from the output bus 424 to corresponding secondaries whose outputs are rectified and provided as outputs $V_{oA}, V_{oB}, \ldots,$ and $V_{oN}$. N output modules can be implemented, where N is 1 to infinity, although only N=3 is illustrated. The primary winding $N_1$ can be coupled via a core or parallel choke $L_p$ to a pair of push-pull transformer secondaries $N_2$ that are part of a standby drive section on the primary side of the isolation boundary. The transformer formed from $N_1$, $L_p$, $N_2$ and $N_3$ can be configured both to sense voltage on the output bus 424 when the LLC power converter runs in load state as well as provide power to the output bus 424 when a controller 2504 selects to run the LLC power converter unit 2500 in a standby state. The standby drive section includes a second switching section comprising switches $Q_3$ and $Q_4$, which can be lower-power switches than $Q_1$ and $Q_2$ to allow power transfer from $V_{in}$ to the outputs $V_{oA}$-$V_{oN}$ via regulator 409 from $V_{in}$ to $V_{cc}$ and through $Q_3$ and $Q_4$ to $V_{oA}$-$V_{oN}$ thereby avoiding $Q_1$ and $Q_2$ which would deliver excessive output voltage due to the resonant action of $L_r$ with $C_{r1}$ and $C_{r2}$. While the controller 2504 is shown with primarily analogue components, these can be used in combination with a digital controller 2504, or the digital controller 2504 can be implemented instead of the analogue controls.

The LLC resonant converter unit 2500 includes two sensing means: a voltage measurement $V_{SnsPri}$ taken across a lower of the pair of push-pull transformer secondaries $N_3$ and a resonant tank current sensor 2502 drawing current via capacitive divider from a node between $C_{r1}$ and $L_{r1}$. Although a capacitive divider topology is shown for the resonant tank current sensor 2502, the transformer-based topologies shown in FIGS. 19 and 20 could also be used. Although not shown, both sensing means can provide feedback to the controller 2504.

In an alternative embodiment, in the load state, the controller 2504 can look to falling resonant tank current, as measured by resonant tank current sensor 2502, or any other resonant tank current sensing topology, such as, but not limited to, those shown in FIGS. 18-22, to determine when to switch to the standby state. When resonant tank current falls below a threshold, the controller 2504 can disengage the first switching section, $Q_1$, $Q_2$, engage the second switching section $Q_3$, $Q_4$, and begin providing power to the output bus 424 via $V_{cc}$ as regulated by the second switching section $Q_3$, $Q_4$ and inductively coupled into the output bus 424 via the pair of push-pull secondary windings $N_2$, $N_3$ and primary winding $N_1$.

Although not shown, in an embodiment, switch $Q_5$ can be controlled via an additional output of the controller 2504 rather than via analogue circuitry.

An optional feature shown in FIG. 25 is a means to ensure valley or zero-voltage switching of the second switching section (e.g., $Q_3$ and $Q_4$), which helps reduce losses. To do this it is helpful to monitor current and/or voltage of the second switching section, which can be accomplished via various means, but in this embodiment involves measuring current $I_{D\_Q3}$ into the drain of $Q_3$ and current $I_{D\_Q4}$ into the drain of $Q_4$ as well as measuring a voltage across both switches, $V_{DS\_Q3}$ and $V_{DS\_Q4}$. These voltages $V_{DS\_Q4}$ and $V_{DS\_Q3}$ can be ground referenced or referenced to a return or negative potential of the LLC resonant power converter 2500. Additionally or alternatively, a voltage $V_{SW}$ can be measured on the lower output bus leg from between the first switching section and the lower terminal of the first transformer primary $N_1$. This voltage $V_{SW}$ can be ground referenced or referenced to a return or negative potential of the LLC resonant power converter 250. To control valley switching or zero-voltage switching, one of the voltages $V_{DS\_Q4}$, $V_{DS\_Q3}$, or $V_{SW}$ can be monitored to ensure that voltage on the switches $Q_3$ and $Q_4$ is sufficiently low (valley switching) or zero (zero voltage switching) during switching. The inventor has discovered that monitoring $V_{SW}$ may result in the lowest noise floor of these three options.

Only one of the illustrated sensing means need be utilized in practice. All other aspects of FIG. 25 are similar to and as described relative to FIG. 9, but could be replaced by other alternative topologies discussed above or by more generalized topologies such as those of FIGS. 4-6.

Figure 26:
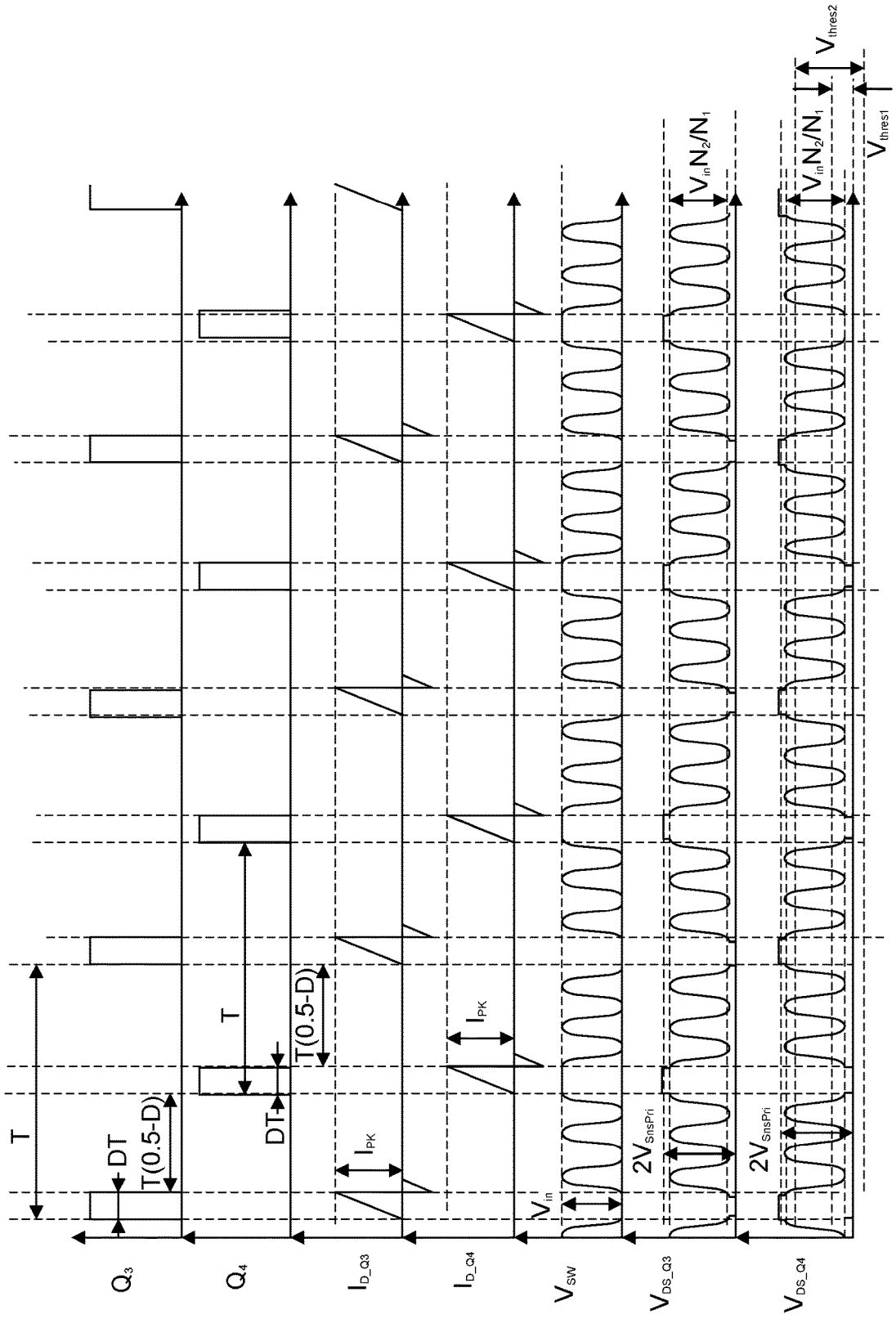
FIG. 26 illustrates a timing chart corresponding to the topology of FIG. 25 and relevant measurements for ensuring valley or zero-voltage switching.

FIG. 26 illustrates a timing chart corresponding to the topology of FIG. 25 and relevant measurements for ensuring valley or zero-voltage switching. FIG. 26 includes timing for the second switching section $Q_3$ and $Q_4$, as well as current and voltage measurements noted in FIG. 25 that can be used to monitor switch timing (e.g., $I_{D\_Q3}$, $I_{D\_Q4}$, $V_{DS\_Q3}$, $V_{DS\_Q4}$, or $V_{SW}$). As a reminder, valley or zero-voltage switching can be achieved by monitoring one or more of the following: $V_{DS\_Q4}$, $V_{DS\_Q3}$, or $V_{SW}$. Details of the timing chart will become more apparent when considered in combination with the method 2700 described relative to FIG. 27 below.

The switches $Q_3$ and $Q_4$ can be switched in a complementary push-pull fashion, i.e., a duty cycle, DT<50%, such that both switches are never on at the same time (i.e., there is some "dead" time between "on" times of each pair of switches). In other words, the time from the turn-off of $Q_3$ to the turn-on of $Q_4$, T(0.5-D) can be kept the same as the time from the turn-off of $Q_4$ to the turn-on of $Q_3$, thereby keeping the circuit balanced with the voltages across $C_{r1}$ and $C_{r2}$ equal.

Energy can be transferred from $V_{cc}$ to the parallel choke $L_P$ (or the gapped transformer) when $Q_3$ or $Q_4$ is turned on. The on-time can be selected so that sufficient energy is stored that the maximum power drawn during the standby state can be provided. The energy which is stored and not consumed by the load can be circulated back to $V_{in}$ through body diodes of the half-bridge FET's $Q_1$ and $Q_2$ (if implemented as FET's).

After $Q_3$ or $Q_4$ is turned off, there is a resonant transfer of energy from the parallel choke/gapped transformer and the capacitance in parallel with it. This capacitance includes the parallel choke winding capacitance, the output rectifier capacitance (reflected through the transformer) and the capacitance of the half-bridge FET's $Q_1$ and $Q_2$ through the series choke $L_{r1}$. The resultant ringing voltage across the push-pull windings has very low damping because of the highly non-linear capacitance of the FET's.

The turn on switching loss of $Q_3$ and $Q_4$ can be minimised by turning them on when the voltage across them is low.

By allowing multiple resonant cycles prior to the next switching event, the switching frequency can be kept low to minimise gate drive losses. By turning on $Q_3$ and $Q_4$ when the voltage across them is zero, the switching losses are minimized. However, at light load, the time between them being turned off and their voltage reaching zero is very short which would result in very high switching frequencies which would be counterproductive as the gate drive losses would then become high. It is possible to get both low gate drive losses and zero voltage switching by allowing several resonant cycles to take place between gate pulses. The low damping provided by the non-linear output capacitance of FET's makes this viable.

Figure 27:
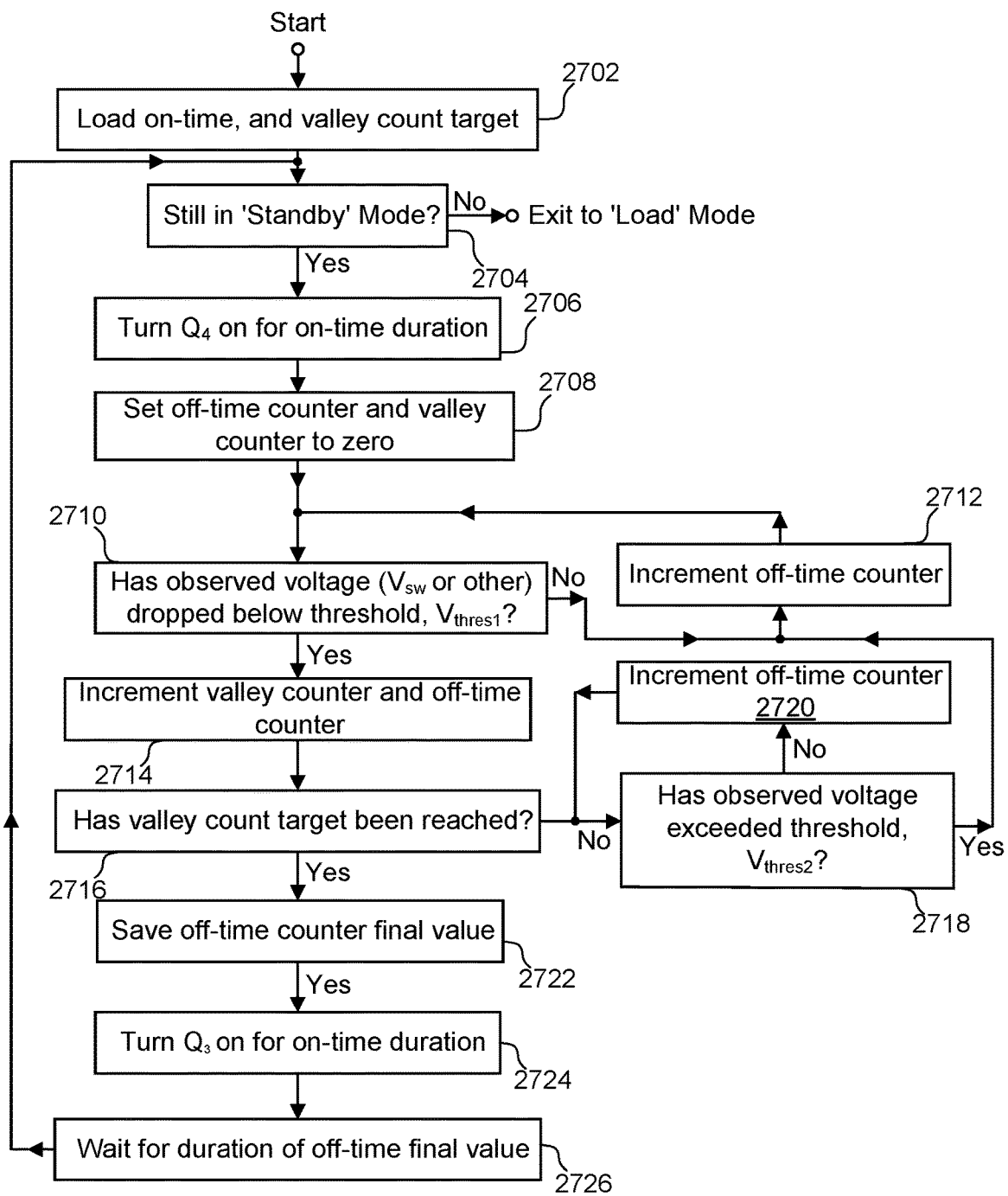
FIG. 27 illustrates an embodiment of a method of operating a series resonant LLC power in standby state.

FIG. 27 illustrates a method for implementing valley or zero-voltage switching of the second switching section. The method 2700 starts by loading an on-time and valley count target (Block 2702) and then checks to see if the LLC resonant converter unit is still in standby mode (Decision 2704). If not, then exit to load mode. If it is still in standby, then the method 2700 turns $Q_4$ on for the on-time duration (Block 2706), and then sets an off-time counter and valley counter to zero (Block 2708). The method 2700 then checks to see if the observed voltage ($V_{DS\_Q3}$, $V_{DS\_Q4}$, or $V_{SW}$) has dropped below a first threshold, $V_{thres1}$ (Decision 2710). If not, then the method 2700 increments the off-timer counter (Block 2712) and continues checking for the observed voltage to drop below the first threshold, $V_{thresh1}$. If the observed voltage does fall below the first threshold, $V_{thresh1}$, then the method 2700 increments the valley counter and off-time counter (Block 2714). The method 2700 then checks to see if the valley count target has been reached (Decision 2716), and if not, determines if the observed voltage exceeds a second threshold, $V_{thres2}$ (Decision 2718). If not, then the off-time counter is incremented (Block 2720) and the observed voltage is again compared to the second threshold, $V_{thres2}$, and this loop continues until the observed voltage exceeds the second threshold, $V_{thres2}$. The off-time counter can then be incremented (Block 2712) and the method can continue to check for the observed voltage to drop below the first threshold, $V_{thresh1}$ (Decision 2710). Once the valley count target is reached (Decision 2716), the method saves the off-time counter final value (Block 2722) and turns $Q_3$ on for the on-time duration (Block 2724). The method 2700 then waits for a duration of the off-time final value (Block 2726) and then turns $Q_4$ on for the on-time duration (Block 2706).

In an embodiment, the off-time could be clamped to a maximum level to prevent operation at audible frequency.

There may be benefits to changing the on-time duration and/or the valley counter based on operating conditions, e.g., for a modular power supply, the standby power drawn could be reduced by reducing the on-time if there is less than the maximum number of modules installed. This could be implemented in code or firmware.

The method 2700 is just one way to achieve valley switching or zero-voltage switching and other methods can also be implemented. For instance, a fixed on-time and fixed off-time for $Q_3$ and $Q_4$ could also be selected to achieve valley switching.

Figure 28:
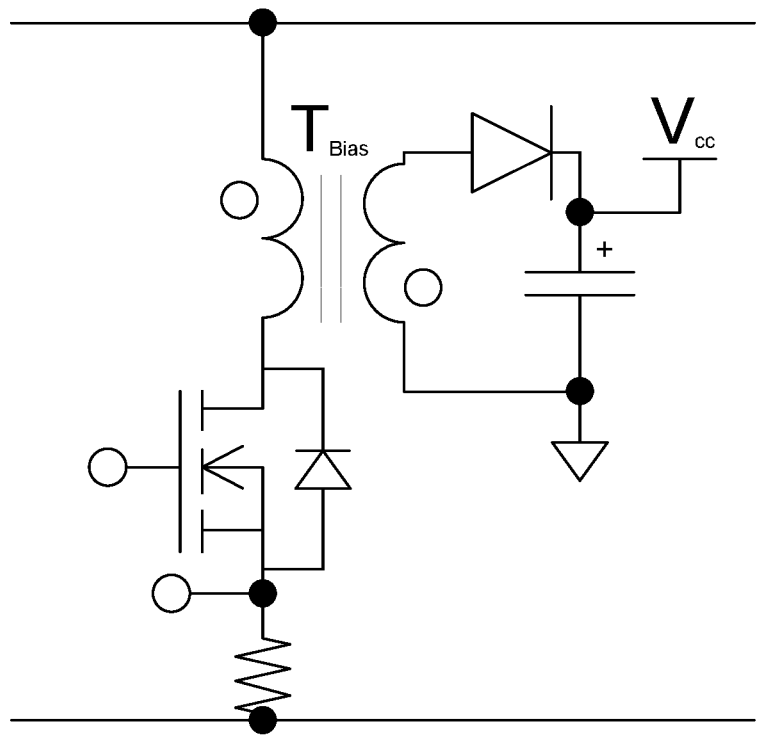
FIG. 28 provides details of one embodiment of a regulator that can be used in combination with the embodiments of series resonant LLC power converters disclosed herein.

FIG. 28 provides details of one embodiment of a regulator, such as the regulator 409 in FIG. 4.

FIG. 29 illustrates another embodiment of a series resonant LLC power converter unit having sensing means on a secondary side and a controller on the primary side and using one or more opto-couplers to communicate across the isolation boundary. Sensed voltage (e.g., $V_{oN}$) from one of the output modules on the secondary side is passed via optocouplers 2902 to a central controller 2904, which then passes data to a primary controller 2906 on the primary side via additional optocouplers 2908. In this way, the central controller 2904 is isolated from both the primary and secondary sides.

For modular products, see FIG. 29, where voltages (e.g., $V_{oA}$, $V_{oB}$, $V_{oC}$) and currents of the output modules can be monitored and communicated to a central controller that is isolated from both the output modules and the primaries. The isolated controller can communicate with the primaries and the output modules via opto-couplers or pulse transformers. In this way, the isolated controller can monitor output power of the system as:

$$P_o = V_{oA}I_{oA} + V_{oB}I_{oB} + \ldots V_{oN}I_{oN} \qquad \text{Equation 1}$$

Where $V_{OA}$, $V_{OB}$, $V_{OC}$ are the output voltages of the output modules and $I_{OA}$, $I_{OB}$, $I_{OC}$ are output currents of the output modules.

FIG. 29 shows (a) serial bi-directional opto-coupler communication between a module and a central controller isolated both from primary and secondary, (b) serial bi-directional communication between the isolated central controller and primary (c) a flyback bias converter providing isolated bias to the central controller, (d) the same flyback bias converter providing isolated bias to the central controller from an additional winding, and (e) the facility for the primary controller to adjust the level of the bias flyback output voltage thereby eliminating switch $Q_5$ of FIG. 9

The embodiment of FIG. 29 also shows a variation on the regulator 409 seen in previous figures. In particular, the regulator is implemented as a flyback converter providing isolated bias to the central controller 2904 via $V_{cc+}$ and $V_{cc-}$. The flyback converter takes power from $V_{in}$ and steps this voltage down via transformer. The secondary side of this transformer has two outputs: one provides $V_{cc+}$ and $V_{cc-}$, and the other is provided to the node between the pair of push-pull secondary windings $N_2$, $N_3$ that provide power to the output bus 424 during the standby state. Unlike previous embodiments of the flyback converter, this version does not use a switch to control regulator power to the node between the pair of push-pull secondary windings $N_2$, $N_3$. The primary controller 2906 can adjust the bias of the flyback converter output to remove the use of switch $Q_5$.

Although FIG. 29 shows a topology that is similar to FIGS. 4, 7-9, and 25, it will be appreciated by those of skill in the art that this topology could also be modified to fit the variations shown in FIGS. 5, 6, 10, 11, 12 and 13 without departing from the spirit or scope of this disclosure.

It should be noted that the inverted triangle symbols in many of the figures represent return lines or a negative side of the converter and not ground, although in some embodiments these can be replaced by ground.

In many of the disclosed embodiments herein, diodes have been shown as generalized rectifier devices. For instance, these could be implemented as FET's in many cases (i.e., synchronous rectification).

Many of the disclosed embodiments show modular output modules where the outputs can be coupled in a variety of series and/or parallel combinations to achieve customizable outputs for the converter. In these cases, the negative output legs can be independent or isolated. However, where the output modules are non-modular, the negative legs of all the output modules can be tied together (i.e., be at the same voltage).

Throughout this disclosure various sensing means have been described, but not always the connections back to the controller. This was done to simplify the drawings, but one of skill in the art will appreciate that these various sensing means all provide feedback to the controller, which can then determine whether to operate in the load state or the standby state.

This disclosure has used the terms standby state and light- or no-load state/mode interchangeably.

Figure 30:
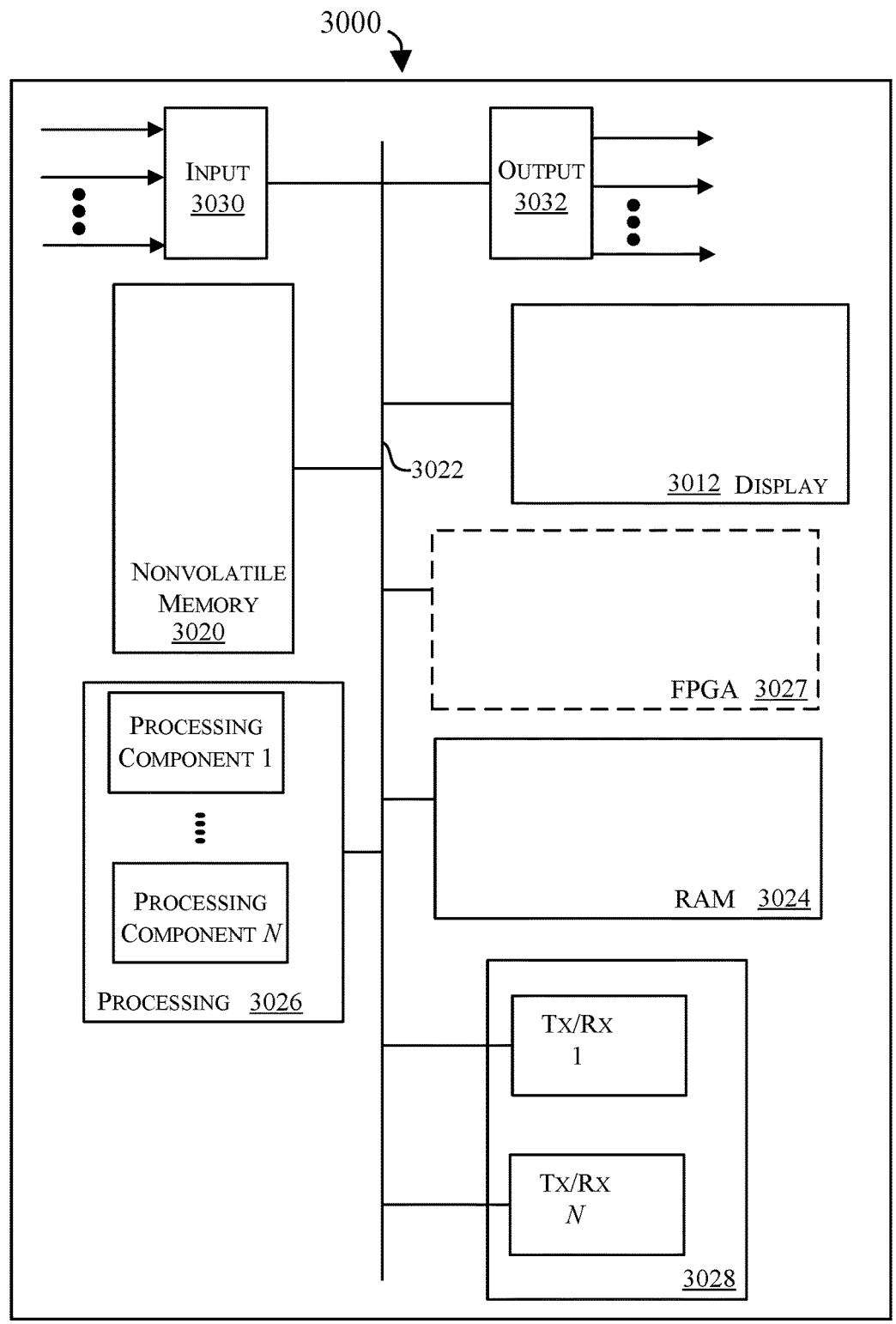
FIG. 30 shows a block diagram depicting physical components that may be utilized to realize the series resonant LLC power converter unit.

The methods described in connection with the embodiments disclosed herein may be embodied directly in hardware, in processor-executable code encoded in a non-transitory tangible processor readable storage medium, or in a combination of the two. Referring to FIG. 30 for example, shown is a block diagram depicting physical components that may be utilized to realize the controllers 410, 804, 904, 1010, 1104, 1210, 1304, 2504, and the controllers of FIG. 29 (and the controller for switching between a load and a standby state generally) according to an exemplary embodiment. As shown, in this embodiment a display portion 3012 and nonvolatile memory 3020 are coupled to a bus 3022 that is also coupled to random access memory ("RAM") 3024, a processing portion (which includes N processing components) 3026, an optional field programmable gate array (FPGA) 3027, and a transceiver component 3028 that includes N transceivers. Although the components depicted in FIG. 30 represent physical components, FIG. 30 is not intended to be a detailed hardware diagram; thus many of the components depicted in FIG. 30 may be realized by common constructs or distributed among additional physical components. Moreover, it is contemplated that other existing and yet-to-be developed physical components and architectures may be utilized to implement the functional components described with reference to FIG. 30.

This display portion 3012 generally operates to provide a user interface for a user, and in several implementations, the display is realized by a touchscreen display. In general, the nonvolatile memory 3020 is non-transitory memory that functions to store (e.g., persistently store) data and processor-executable code (including executable code that is associated with effectuating the methods described herein). In some embodiments for example, the nonvolatile memory 3020 includes bootloader code, operating system code, file system code, and non-transitory processor-executable code to facilitate the execution of a method described with reference to FIGS. 23 and 27 described further herein.

In many implementations, the nonvolatile memory 3020 is realized by flash memory (e.g., NAND or ONENAND memory), but it is contemplated that other memory types may be utilized as well. Although it may be possible to execute the code from the nonvolatile memory 3020, the executable code in the nonvolatile memory is typically loaded into RAM 3024 and executed by one or more of the N processing components in the processing portion 3026.

The N processing components in connection with RAM 3024 generally operate to execute the instructions stored in nonvolatile memory 3020 to enable detection of a light- or no-load condition and switching of power delivery from a first to a second switching section. For example, non-transitory, processor-executable code to effectuate the methods described with reference to FIGS. 23 and 27 may be persistently stored in nonvolatile memory 3020 and executed by the N processing components in connection with RAM 3024. As one of ordinarily skill in the art will appreciate, the processing portion 3026 may include a video processor, digital signal processor (DSP), micro-controller, graphics processing unit (GPU), or other hardware processing components or combinations of hardware and software processing components (e.g., an FPGA or an FPGA including digital logic processing portions).

In addition, or in the alternative, the processing portion 3026 may be configured to effectuate one or more aspects of the methodologies described herein (e.g., the methods described with reference to FIGS. 23 and 27). For example, non-transitory processor-readable instructions may be stored in the nonvolatile memory 3020 or in RAM 3024 and when executed on the processing portion 3026, cause the processing portion 3026 to perform methods for identifying light- or no-load conditions and switching between power delivery from a first switching section to power delivery from a second switching section. Alternatively, non-transitory FPGA-configuration-instructions may be persistently stored in nonvolatile memory 3020 and accessed by the processing portion 3026 (e.g., during boot up) to configure the hardware-configurable portions of the processing portion 3026 to effectuate the functions of the controllers 410, 804, 904, 1010, 1104, 1210, 1304, 2504, and the controllers of FIG. 29.

The input component 3030 operates to receive signals (e.g., $V_{SnsPri}$ in the sense section 418 and the driver and sense assembly 802, or resonant tank current at input 423) that are indicative of one or more aspects of regulator power or output module power. The signals received at the input component may include, for example, voltage and currents measured at different points in the LLC resonant converter. The output component generally operates to provide one or more analog or digital signals to effectuate an operational aspect of the controllers 410, 804, 904, 1010, 1104, 1210, 1304, 2504, and the controllers of FIG. 29. For example, the output portion 3032 may provide control of the first or second switching sections as described with reference to FIGS. 4-13.

The depicted transceiver component 3028 includes N transceiver chains, which may be used for communicating with external devices via wireless or wireline networks. Each of the N transceiver chains may represent a transceiver associated with a particular communication scheme (e.g., WiFi, Ethernet, Profibus, etc.).

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The terms and expressions employed herein are used as terms and expressions of description and not of limitation, and there is no intention, in the use of such terms and expressions, of excluding any equivalents of the features shown and described or portions thereof. Each of the various elements disclosed herein may be achieved in a variety of manners. This disclosure should be understood to encompass each such variation, be it a variation of an embodiment of any apparatus embodiment, a method or process embodiment, or even merely a variation of any element of these. Particularly, it should be understood that the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled.

As but one example, it should be understood that all action may be expressed as a means for taking that action or as an element which causes that action. Similarly, each physical element disclosed should be understood to encompass a disclosure of the action which that physical element facilitates. Regarding this last aspect, by way of example only, the disclosure of a "protrusion" should be understood to encompass disclosure of the act of "protruding"—whether explicitly discussed or not—and, conversely, were there only disclosure of the act of "protruding", such a disclosure should be understood to encompass disclosure of a "protrusion". Such changes and alternative terms are to be understood to be explicitly included in the description.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed:

1. A method of operating a series resonant LLC converter coupled via one or more transformers on an AC output bus to one or more output modules whose outputs are coupled to a load, the method comprising:
    delivering power to the AC output bus via a first switching section converting power from a high voltage input, the AC output bus configured to inductively deliver power to the one or more output modules;
    monitoring current in an LLC resonant tank coupled to the AC output bus, and when the current drops below a light- or no-load threshold, then
    switching the first switching section off, and
    delivering power to the AC output bus via a second switching section receiving power at a lower voltage than the high voltage input, and delivering power via inductive coupling with the AC output bus.

2. The method of claim 1, wherein switching the first switching section off comprises cutting off power delivery to the first switching section.

3. The method of claim 1, wherein switching the second switching section on comprises starting to switch switches in the second switching section.

4. The method of claim 1, wherein the current is monitored in a resonant tank of the series resonant LLC converter.

5. The method of claim 1, wherein the current is monitored on a low voltage rail of the high voltage input.

6. The method of claim 1, further comprising monitoring power delivered by a regulator to the second switching section, and when the regulator reaches a power limit, switching the second switching section off and switching the first switching section on.

7. The method of claim 1, wherein the secondary switching section provides power to a primary winding across the AC output bus via inductive coupling through a pair of push-pull transformer windings coupled to the second switching section.

8. The method of claim 7, wherein the primary winding coupled across the AC output bus is a primary of a transformer of one of the output modules.

9. The method of claim 7, wherein the primary winding coupled across the AC output bus is arranged in parallel on the AC output bus with primaries of transformers inductively coupling power into the one or more output modules.

10. A series resonant LLC converter configured to operate in a load state and a standby state, where the standby state provides lower power to an AC output bus than the load state is capable of, the series resonant LLC converter comprising:
    a voltage input;
    an LC section comprising a first capacitor and an inductor in series;
    an AC output bus coupled to the LC section and to one or more output modules;
    a primary winding coupled across the AC output bus in parallel to primary windings of the one or more output modules;
    a first switching section coupled between the voltage input and the LC section;
    a second voltage input;
    a second switching section inductively coupled to the primary winding and receiving power from the second voltage input, the second voltage input configured to deliver less power than the first voltage input;
    a controller configured to:
        monitor current in the LC section or voltage in one of the output modules; and
        when the current in the LC section falls below a light- or no-load threshold or the voltage in one of the output modules rises above a light- or no-load threshold, turn the first switching section off and turn the second switching section on.

11. The series resonant LLC converter of claim 10, wherein devices in the second switching section are lower power handling and higher frequency than those in the first switching section.

12. The series resonant LLC converter of claim 10, wherein the second voltage input is provided by a regulator coupled between the first voltage input and the second switching section.

13. The series resonant LLC converter of claim 12, wherein, when the first switching section is off and the second switching section is on, the controller is further configured to monitor the regulator and identify when it reaches its power limit, and then turn the second switching section off and turn the first switching section on.

14. The series resonant LLC converter of claim 13, wherein identifying when the regulator reaches its power limit is performed by sensing an output voltage of the regulator.

15. The series resonant LLC converter of claim 10, wherein the primary winding is arranged in parallel on the AC output bus with primary windings of output transformers coupled to the one or more output modules.

16. The series resonant LLC converter of claim 10, wherein the primary winding is part of an output transformer of one of the one or more output modules.

17. The series resonant LLC converter of claim 10, wherein the second switching section is arranged on a secondary side of an isolation boundary of the series resonant LLC converter.

18. The series resonant LLC converter of claim 10, wherein the LC section further comprises a second capacitor coupled in series with the first capacitor and the inductor coupled to a node between the first and second capacitors.

* * * * *

UNITED STATES PATENT AND TRADEMARK OFFICE
CERTIFICATE OF CORRECTION

| | | |
|---|---|---|
| PATENT NO. | : 11,594,948 B2 | Page 1 of 1 |
| APPLICATION NO. | : 17/171527 | |
| DATED | : February 28, 2023 | |
| INVENTOR(S) | : Richard Morrison et al. | |

It is certified that error appears in the above-identified patent and that said Letters Patent is hereby corrected as shown below:

On the Title Page

Item (73) Assignee, replace "Tecnologies" with "Technologies"

Signed and Sealed this
Twenty-first Day of January, 2025

Coke Morgan Stewart
*Acting Director of the United States Patent and Trademark Office*